US009596431B2

(12) United States Patent
Kato

(10) Patent No.: US 9,596,431 B2
(45) Date of Patent: Mar. 14, 2017

(54) TRANSMISSION SYSTEM AND PROGRAM

(71) Applicant: Yoshinaga Kato, Kanagawa (JP)

(72) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/442,889

(22) PCT Filed: Nov. 13, 2013

(86) PCT No.: PCT/JP2013/081223
§ 371 (c)(1),
(2) Date: May 14, 2015

(87) PCT Pub. No.: WO2014/077411
PCT Pub. Date: May 22, 2014

(65) Prior Publication Data
US 2015/0296176 A1 Oct. 15, 2015

(30) Foreign Application Priority Data

Nov. 15, 2012 (JP) ................................. 2012-250979
Mar. 26, 2013 (JP) ................................. 2013-064085
Jun. 27, 2013 (JP) ................................. 2013-135200

(51) Int. Cl.
H04N 7/15 (2006.01)
H04N 7/14 (2006.01)
(Continued)

(52) U.S. Cl.
CPC ........... *H04N 7/147* (2013.01); *G06F 3/1454* (2013.01); *G09G 5/003* (2013.01); *H04L 12/1827* (2013.01); *H04N 7/15* (2013.01)

(58) Field of Classification Search
CPC ........ H04N 7/147; H04N 7/15; G06F 3/1454; G09G 5/003; H04L 12/1827
(Continued)

(56) References Cited

U.S. PATENT DOCUMENTS 5,107,443 A    4/1992  Smith et al.
6,668,273 B1 * 12/2003 Rust ....................... G06Q 10/10
                                                      707/E17.111
(Continued)

FOREIGN PATENT DOCUMENTS

JP      H07-327219     12/1995
JP      H08-205116      8/1996
(Continued)

OTHER PUBLICATIONS

International Search Report Issued on Feb. 10, 2014 in PCT/JP2013/081223 filed on Nov. 13, 2013.
(Continued)

Primary Examiner — Stella Woo
(74) Attorney, Agent, or Firm — Oblon, McClelland, Maier & Neustadt, L.L.P.

(57) ABSTRACT

A recording medium stores a program which, when executed by a computer, causes the computer to perform a process, the computer connected to a transmission terminal connected to a display device and connected to a second transmission terminal via a network, the process including: displaying an area of a program component on a screen of a second display device connected to the computer; receiving selection of one of display data of a whole area of the screen and display data of the area of the program component; acquiring the display data of the whole area or the area; receiving resolution information indicating a resolution of the display device from the transmission terminal; determining a resolution of the display data based on the resolution information and second resolution information indicating a second display device resolution; and transmitting the display data with the determined resolution to the transmission terminal.

13 Claims, 47 Drawing Sheets

(51) Int. Cl.
*G06F 3/14* (2006.01)
*H04L 12/18* (2006.01)
*G09G 5/00* (2006.01)

(58) Field of Classification Search
USPC .......................... 348/14.01–14.16; 709/204; 370/260–261
See application file for complete search history.

(56) References Cited

U.S. PATENT DOCUMENTS

| | | | |
|---|---|---|---|
| 9,143,730 B2* | 9/2015 | Nagase | H04N 7/152 |
| 2005/0132299 A1 | 6/2005 | Jones et al. | |
| 2006/0085753 A1 | 4/2006 | Vance et al. | |
| 2006/0168533 A1 | 7/2006 | Yip et al. | |
| 2007/0239828 A1 | 10/2007 | Patton et al. | |
| 2008/0294992 A1 | 11/2008 | Liang et al. | |
| 2010/0262925 A1* | 10/2010 | Liu | G06Q 10/10 715/759 |
| 2011/0109716 A1* | 5/2011 | Choi | H04N 7/147 348/14.08 |
| 2011/0126130 A1 | 5/2011 | Lieb et al. | |
| 2012/0140021 A1 | 6/2012 | Tanaka et al. | |
| 2012/0290951 A1* | 11/2012 | Utsuki | H04L 67/02 715/753 |
| 2012/0303834 A1* | 11/2012 | Adam | H04L 65/4084 709/231 |
| 2013/0038676 A1 | 2/2013 | Tanaka et al. | |
| 2013/0055087 A1* | 2/2013 | Flint | G11B 27/034 715/723 |

FOREIGN PATENT DOCUMENTS

| | | |
|---|---|---|
| JP | H10-084541 | 3/1998 |
| JP | 2002-325239 | 11/2002 |
| JP | 2008-517525 | 5/2008 |
| JP | 2009-118310 | 5/2009 |
| JP | 2009-244363 | 10/2009 |
| JP | 2010-028541 | 2/2010 |
| JP | 2010-157005 | 7/2010 |
| JP | 2011-254453 | 12/2011 |
| JP | 2012-118751 | 6/2012 |
| JP | 2014-003448 | 1/2014 |
| WO | 2013/191190 A1 | 12/2013 |

OTHER PUBLICATIONS

Extended Search Report issued Mar. 17, 2016 in European Patent Application No. 13854892.0.

* cited by examiner

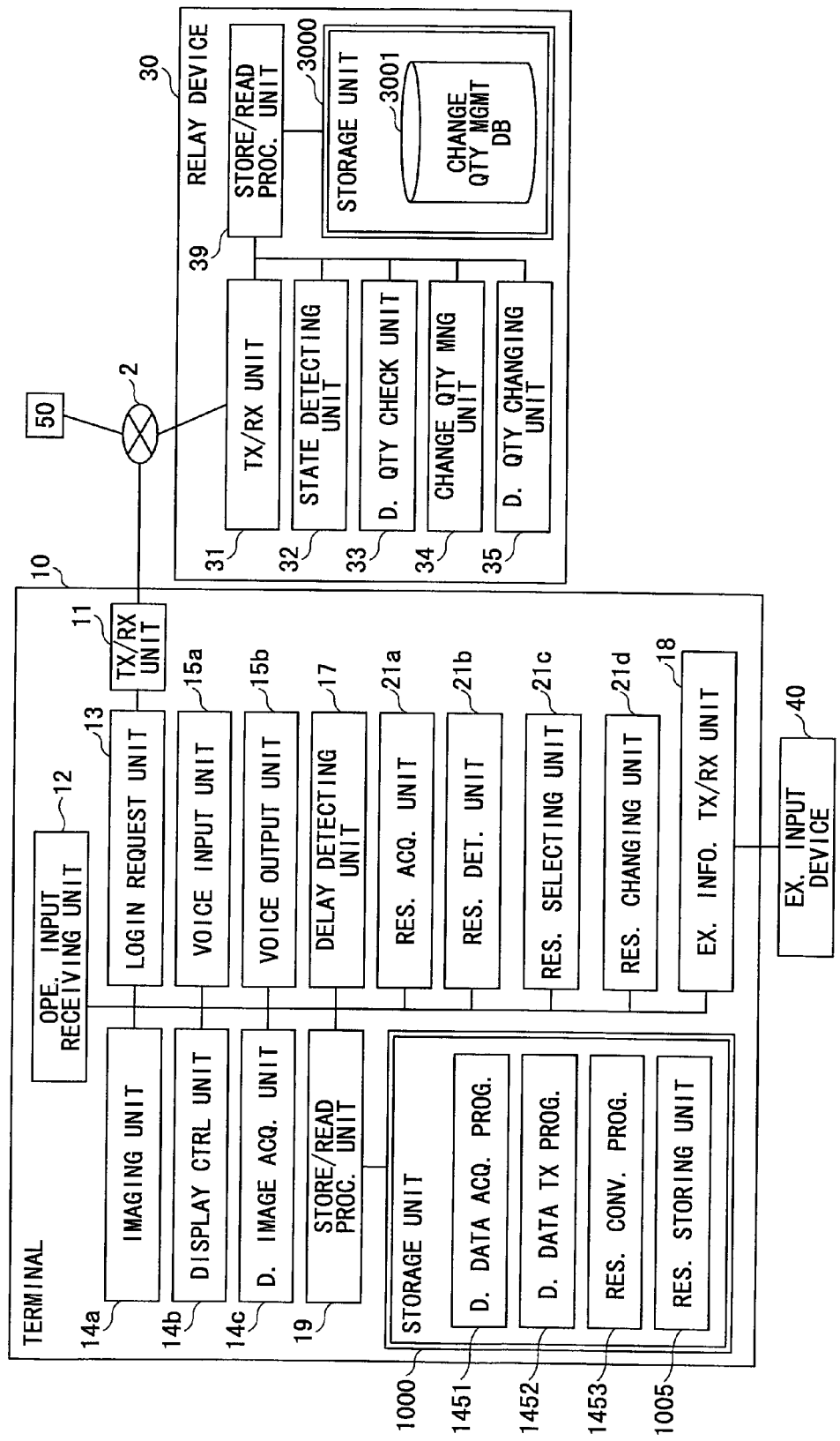

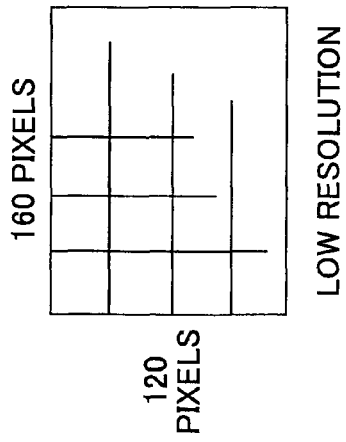
FIG.5A LOW RESOLUTION
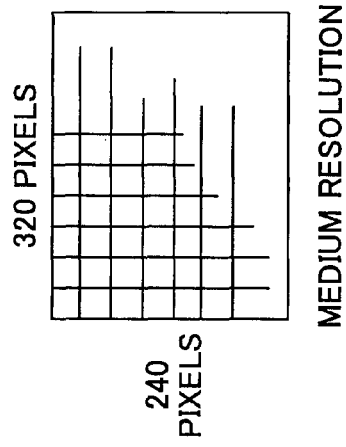
FIG.5B MEDIUM RESOLUTION
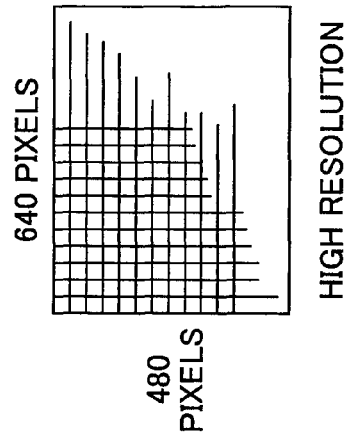
FIG.5C HIGH RESOLUTION

FIG.6

| IP ADDRESS OF RELAY DESTINATION TERMINAL | IMAGE QUALITY OF RELAYED IMAGE DATA |
|---|---|
| 1.3.2.4 | HIGH IMAGE QUALITY |
| 1.3.1.3 | LOW IMAGE QUALITY |
| 1.3.4.3 | MEDIUM IMAGE QUALITY |
| ... | ... |

| RELAY DEVICE ID | OPERATING STATE | DATE/TIME OF RECEPTION | IP ADDRESS OF RELAY DEVICE | MAX DATA TX SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

| TERMINAL ID | PASSWORD |
|---|---|
| 01aa | aaaa |
| 01ab | abab |
| 01ba | baba |
| ... | ... |

| TERMINAL ID | OPERATING STATE | DATE/TIME OF RECEPTION | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

| TERMINAL ID OF REQUEST SOURCE | TERMINAL ID OF DESTINATION |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

| SESSION ID | RELAY DEVICE ID | TERMINAL ID OF REQUEST SOURCE | TERMINAL ID OF DESTINATION | DELAY TIME (ms) | DATE/TIME OF RECEPTION OF DELAY INFO. |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

| DELAY TIME (ms) | IMAGE QUALITY OF IMAGE DATA |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPTED) |

FIG.14

| RESOLUTION (WIDTH) | RESOLUTION (HEIGHT) |
|---|---|
| 1024 | 768 |

4001T

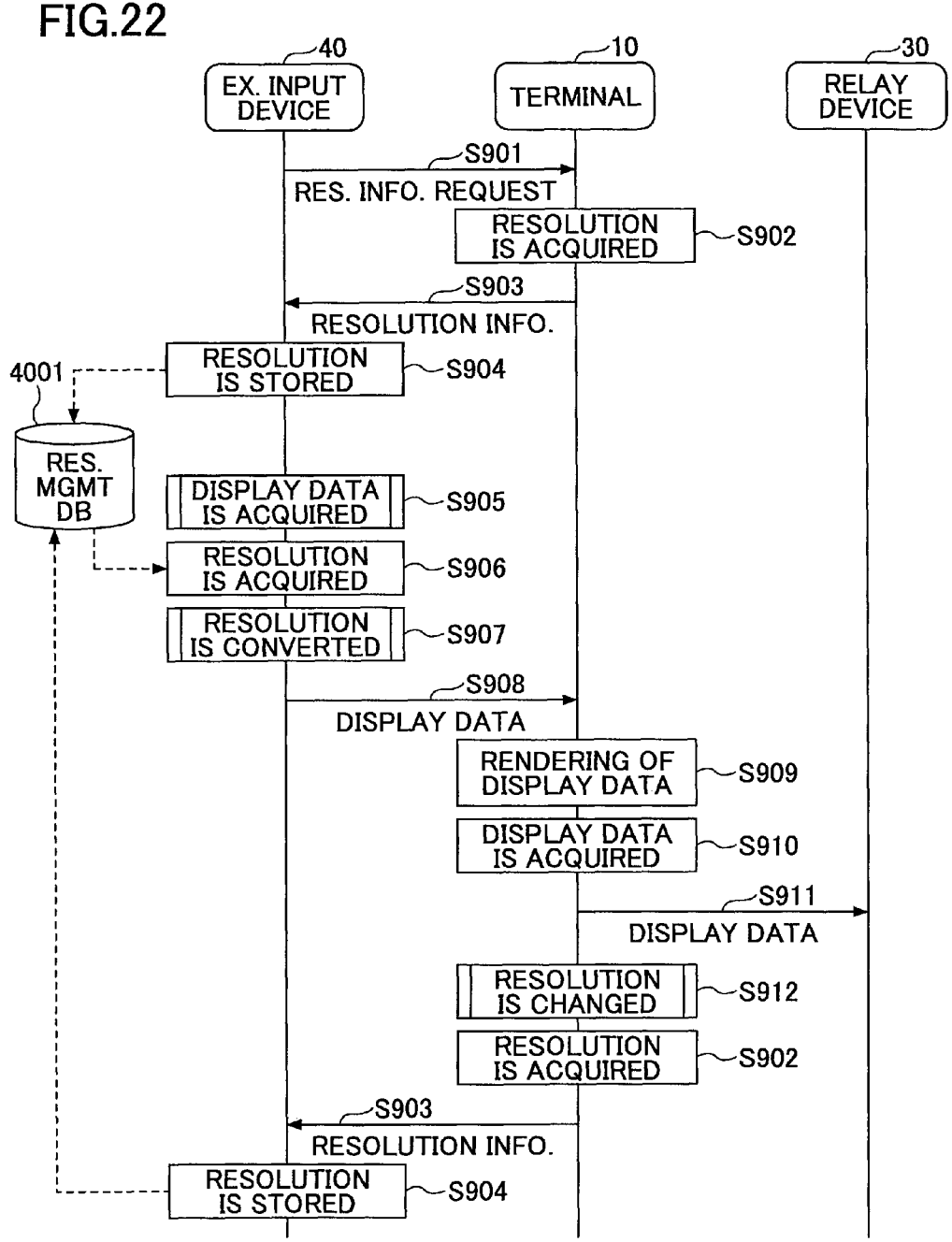

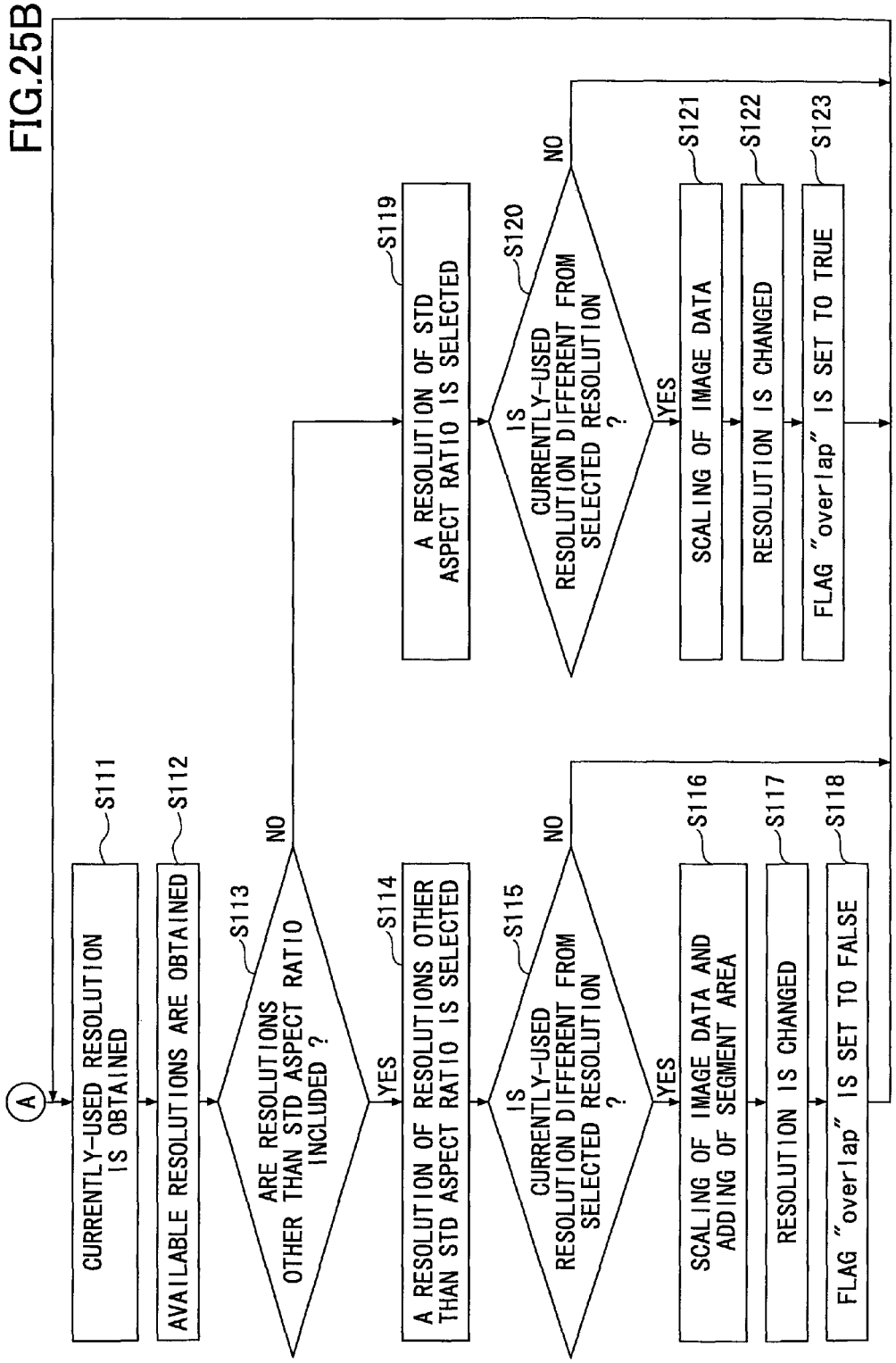

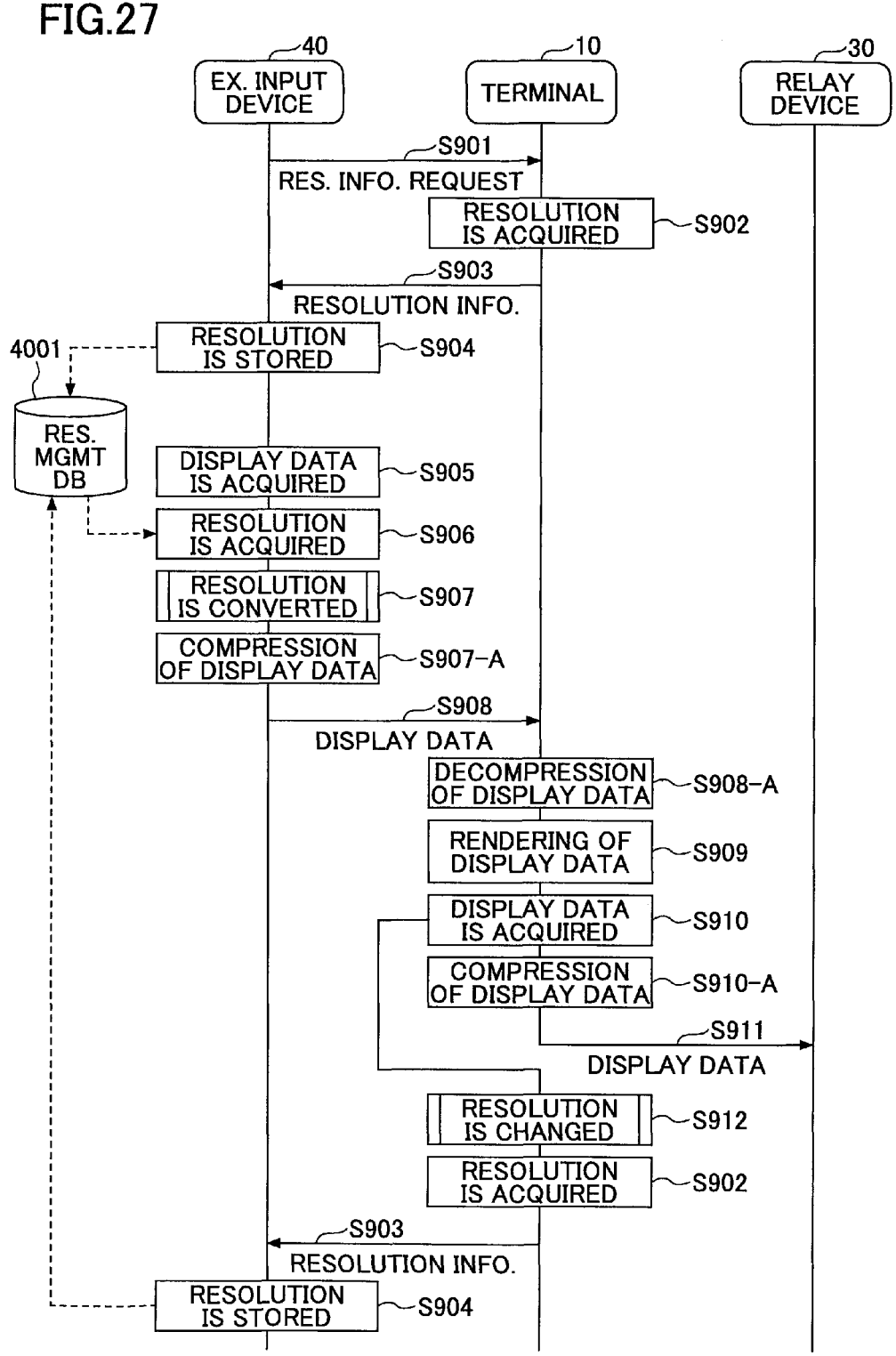

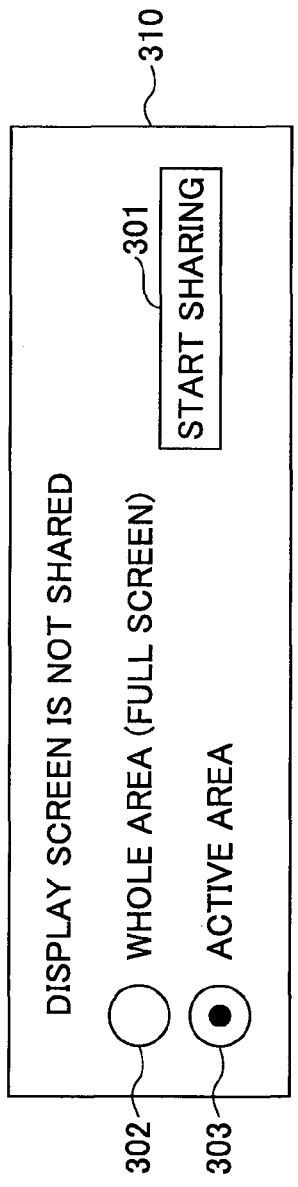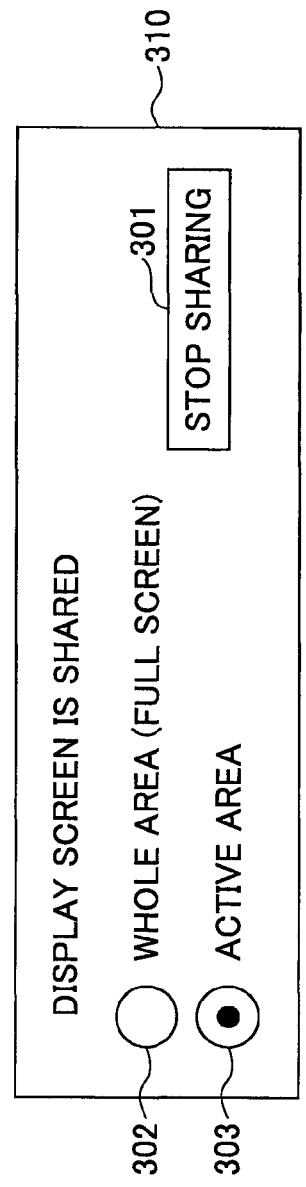
FIG.28B
FIG.28C

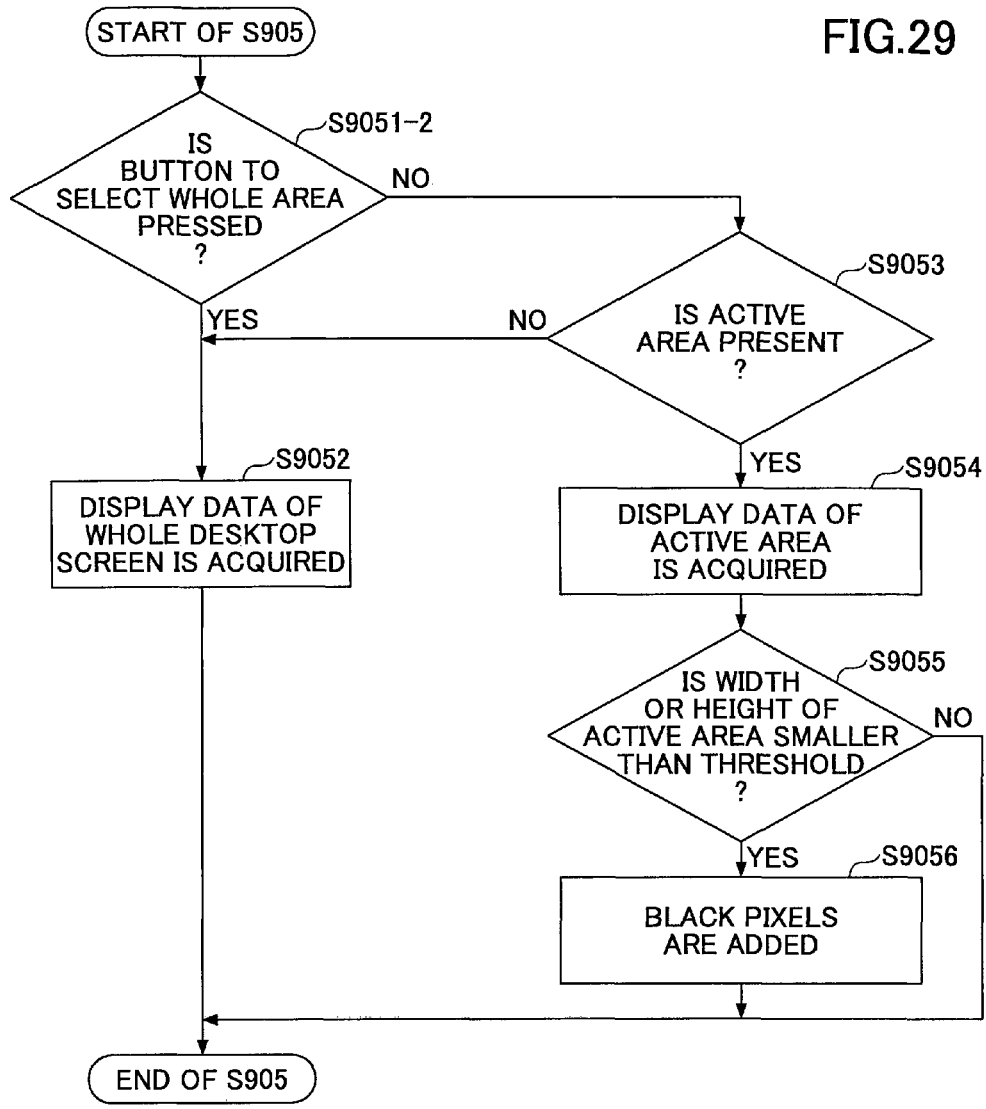

TRANSMISSION SYSTEM AND PROGRAM

TECHNICAL FIELD

The present invention relates to a program which is executed by a computer connected to a first transmission terminal which is connected to a display device and also connected to a second transmission terminal via a network to perform display data transmission to the second transmission terminal.

BACKGROUND ART

A transmission system to conduct videoconferences between remote places via a network, such as the Internet, is becoming increasingly popular. In this transmission system, a videoconference is conducted by exchanging image and audio data between two or more transmission terminals. With recent development of broadband environments, transmission and reception of high-quality image and audio data is enabled and a videoconference in appropriate conditions closely resembling reality may be conducted between the remote places.

There is a case in which, when conducting a videoconference using a transmission terminal, a person concerned as an attendant of the videoconference employs an external input device, such as a PC (personal computer), in addition to the transmission terminal connected to a display device and also connected to another transmission terminal via a network, an image, such as meeting documents, is displayed on a display of the external input device discussed with the partner of the videoconference. In such a case, according to the related art, the external input device has transmitted display data of the image, currently displayed on the display of the external input device, to the other transmission terminal of the communication partner via, the network.

The attendant of the videoconference may share with the communication partner not only the image data and the audio data exchanged between the transmission terminals but also the display data of the image currently displayed on the display of the external input device.

In a case of an external input device which is capable of performing multitask operations, two or more images of areas (windows) generated by different tasks may be simultaneously displayed on a display device. In this case, providing a user with a capability of selecting the display data of one of the two or more images to be transmitted to the other transmission terminal of the partner of the videoconference would be convenient for the user, and therefore a technology for allowing the user to select the display data of one of the images is proposed. For example, see Japanese Laid-Open Patent Publication No. 2011-254453.

FIG. 40 shows an example of a screen displayed on a display device of an external input device disclosed in Japanese Laid-Open Patent Publication No. 2011-254453. As shown in FIG. 40, according to Japanese Laid-Open Patent Publication No. 2011-254453, a user may select one of two areas (a) and (b) of the screen appearing on the display device with a mouse cursor (c) and share the display data of the selected area of the screen with a communication partner of the video conference on the other transmission terminal.

However, Japanese Laid-Open Patent Publication No. 2011-254453 is silent as to switching between a state in which display data of a whole screen area of the screen is shared and a state in which display data of a specific area of the screen is shared. Hence, there is a problem that the user is unable to switch from the state in which the display data of the specific area is shared to the state where the display data of the whole screen area is shared (or vice versa).

SUMMARY

In one aspect, the present invention provides a transmission system in which a user on a transmission terminal may select arbitrarily one of sharing of whole area display data and sharing of specific area display data such that the selected display data are shared with a communication partner of a videoconference on the other transmission terminal.

In one embodiment, the present invention provides a non-transitory computer-readable recording medium storing a program representing a sequence of instructions, the program which when executed by a computer, causes the computer to perform a process, the computer connected to a first transmission terminal which is connected to a first display device and connected to a second transmission terminal via a network, the process including: displaying an area of a program component on a screen of a second display device connected to the computer; receiving selection of at least one of display data displayed in a whole area on the screen of the second display device and display data displayed in the area of the program component on the screen as an operation target of a user; acquiring the display data of the whole area or the area indicated by the received selection; receiving first resolution information indicating a resolution of the first display device from the first transmission terminal; determining a resolution of the acquired display data based on the received first resolution information and second resolution information indicating a resolution of the second display device; and transmitting the acquired display data with the determined resolution to the first transmission terminal.

Other objects, features and advantages of embodiments will be apparent from the following detailed description when read in conjunction with the accompanying drawings.

BRIEF DESCRIPTION OF DRAWINGS

FIGS. 4A and 4B are block diagrams showing the functional configuration of a transmission terminal, a relay device, and a transmission management system which constitutes the transmission system according to the embodiment.

FIGS. 5A, 5B and 5C are diagrams showing image quality of image data.

FIG. 6 is a diagram showing an example of a change quality management table.

FIG. 7 is a diagram showing an example of a relay device management table.

FIG. 8 is a diagram showing an example of a terminal authentication management table.

FIG. 9 is a diagram showing an example of a terminal management table.

FIG. 10 is a diagram showing an example of a destination list management table.

FIG. 11 is a diagram showing an example of a session management table.

FIG. 12 is a diagram showing an example of a quality management table.

FIG. 14 is a diagram showing an example of a resolution management table.

FIG. 22 is a sequence diagram for explaining a process of resolution conversion performed by the external input device and resolution changing performed by the transmission terminal when a non-compressed form is used.

FIGS. 25A and 25B are a flowchart for explaining a process performed by the transmission terminal to control a resolution (including changing the resolution).

FIG. 27 is a sequence diagram for explaining a process of resolution conversion performed by the external input device and resolution changing performed by the transmission terminal when a compressed form is used.

FIGS. 28A, 28B and 28C are diagrams showing an example of a desktop screen displayed on an external input device.

FIG. 29 is a flowchart for explaining a process in which a display data acquiring unit acquires display data.

DESCRIPTION OF EMBODIMENTS

A description will be given of embodiments with reference to the accompanying drawings.

Figure 1:
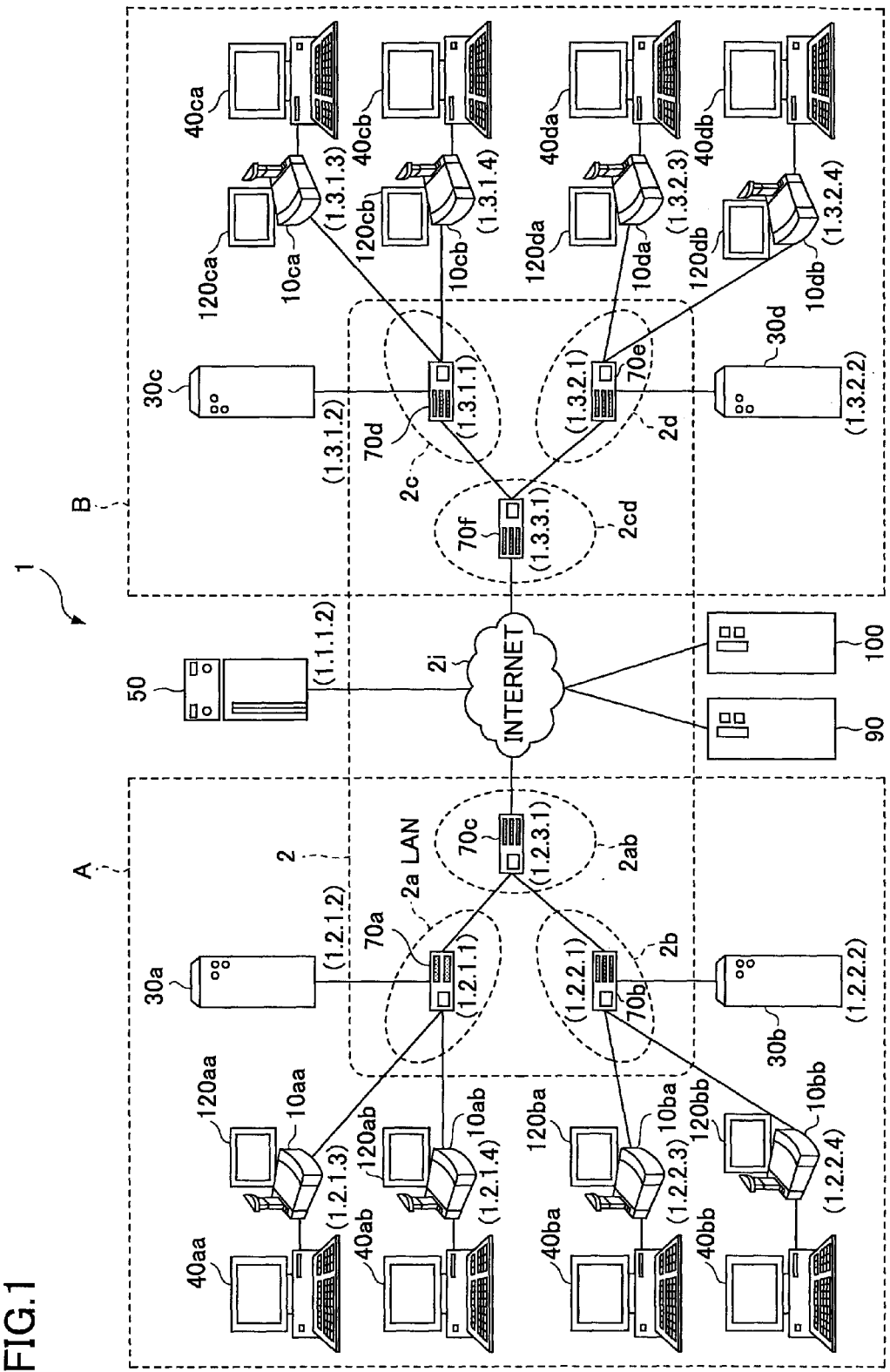
FIG. 1 is a diagram showing the overall configuration of a transmission system according to an embodiment.

FIG. 1 is a diagram showing the overall configuration of a transmission system 1 according to an embodiment. The overall configuration of the transmission system 1 according to the embodiment will be described with reference to FIG. 1.

There are various types of transmission systems. One example may be a data providing system. In the data providing system, content data are transmitted from one terminal to another terminal via a transmission management system in a one-way direction. Another example may be a communication system. In the communication system, information or emotional expressions are mutually communicated among two or more transmission terminals via the transmission management system. The communication system is utilized for mutually exchanging information or emotional expressions among the two or more communication terminals (i.e., the transmission terminals) via a communication management system (i.e., the transmission management system). Examples of the communication system include a videoconference system, a videophone system, an audio conference system, a voice-call system, or a personal computer screen sharing system.

The following embodiments describe the transmission system, the transmission management system, and the transmission terminal by conceptualizing the videoconference system as an example of the communication system, the videoconference management system as an example of the communication management system, and the videoconference terminal as an example of the communication terminal. That is, the transmission terminal and the transmission management system utilized in the embodiments may be applied not only to the videoconference system, but may also be applied to the communication system or the transmission system.

As shown in FIG. 1, the transmission system 1 includes two or more transmission terminals (10aa, 10ab, . . . , 10db), displays (120aa, 120ab, . . . , 120db) for the transmission terminals (10aa, 10ab, . . . , 10db), two or more external input devices (40aa, 40ab, 40db) respectively connected to the transmission terminals (10aa, 10ab, . . . , 10db), two or more relay devices (30a, 30b, 30c, 30d), a transmission management system 50, a program providing system 90, and a maintenance system 100.

Note that in this embodiment, any one of the transmission terminals (10aa, 10ab, . . . , 10db) may be referred to as "transmission terminal 10", any one of the displays (120aa, 120ab, . . . , 120db) may be referred to as "display 120", any one of the external input devices (40aa, 40ab, . . . , 40db) may be referred to as "external input device 40", and any one of the relay devices (30a, 30b, 30c, 30d) may be referred to as "relay device 30". The display 120 is an example of the display of the transmission terminal 10. Note that in the following, the transmission terminal and the transmission management system may also be simply referred to as the "terminal" and the "management system", respectively.

The transmission terminal 10 is configured to transmit and receive image data, voice data, etc. to and from another transmission terminal 10. Note that in this embodiment, a case in where the image data are moving-picture image data will be explained. However, the transmission terminal 10 may be configured to transmit and receive still-picture image data. Alternatively, the image data may include both moving-picture image data and still-picture image data. The relay device 30 is configured to relay the image data and the voice data among the transmission terminals 10. The transmission management system 50 is configured to manage the transmission terminal 10 and the relay device 30 in an integrated manner.

The external input device 40 is connected to the transmission terminal 10 and configured to transmit display data, representing an image displayed on a display ("display 216" in FIG. 3) of the external input device 40, to the transmission terminal 10 for displaying the image of the display data.

Routers (70a, 70b, . . . , 70f) shown in FIG. 1 are configured to select optimal paths for the image data and the voice data. Note that in this embodiment, any one of the routers (70a, 70b, . . . , 70f) may be referred to as "router 70". The program providing system 90 includes a not-illustrated hard disk (HD) configured to store programs for a terminal, with which the transmission terminal 10 may implement various functions or various units, and transmit the programs to the transmission terminal 10. The HD of the program providing system 90 is configured to further store programs for a relay device, with which the relay device 30 implements various functions or various units, and transmit the programs for the relay device to the relay device 30. In addition, the HD of the program providing system 90 is configured to store transmission management programs, with which the transmission management system 50 implements various functions or various units, and transmit the transmission management programs to the transmission management system 50.

As shown in FIG. 1, the transmission terminal 10aa, the transmission terminal 10ab, the relay device 30a, and the router 70a are connected via a LAN (local area network) 2a so that they may communicate with each other. The transmission terminal 10ba, the transmission terminal 10bb, the relay device 30b, and the router 70b are connected via a LAN 2b so that they may communicate with each other. The LAN 2a and the LAN 2b are connected by a dedicated line 2ab including a router 70c so that they communicate with each other, and the LAN 2a and the LAN 2b are set up in a predetermined area A. For example, the area A may be Japan, the LAN 2a may be set up in an office in Tokyo, and the LAN 2b may be set up in an office in Osaka.

Meanwhile, the transmission terminal 10ca, the transmission terminal 10cb, the relay device 30c, and the router 70d are connected via a LAN 2c so that they may communicate with each other. The transmission terminal 10da, the transmission terminal 10db, the relay device 30d, and the router 70e are connected via a LAN 2d so that they may communicate with each other. The LAN 2c and the LAN 2d are connected by a dedicated line including a router 70f so that they communicate with each other, and the LAN 2c and the LAN 2d are set up in predetermined area B. For example, the area B may be USA, the LAN 2c may be is set up in an office in New York, and the LAN 2d may be set up in an office in Washington, D.C. The area A and the area B are connected from the routers 70c and 70f via the Internet 2i so that the area A and the area B are mutually in communication via the Internet 2i.

The transmission management system 50 and the program providing system 90 are connected to the transmission terminal 10 and the relay device 30 via the Internet 2i so that they may communicate with each other. Alternatively, the transmission management system 50 and the program providing system 90 may be located in the area A or the area B, or may be located in an area other than the areas A and B.

Note that in this embodiment, a communication network 2 is made up of the LAN 2a, the LAN 2b, the dedicated line 2ab, the Internet 2i, the dedicated line 2cd, the LAN 2c, and the LAN 2d. In the communication network 2 of FIG. 1, the set of four numbers attached under each of the transmission terminal 10, the relay device 30, the transmission management system 50, the router 70, and the program providing system 90 simply indicates an IP address under the typical IPv4 (Internet Protocol version 4). For example, the IP address of the transmission terminal 10aa is "1.2.1.3" as shown in FIG. 1. Alternatively, the IP addresses under the IPv6 may be used instead of the IP addresses under the IPv4. However, in this embodiment, the IPv4 is used for simplifying the illustration.

[Hardware Configuration of Embodiment]

Next, the hardware configuration of the transmission system 1 according to the embodiment will be described.

Figure 2:
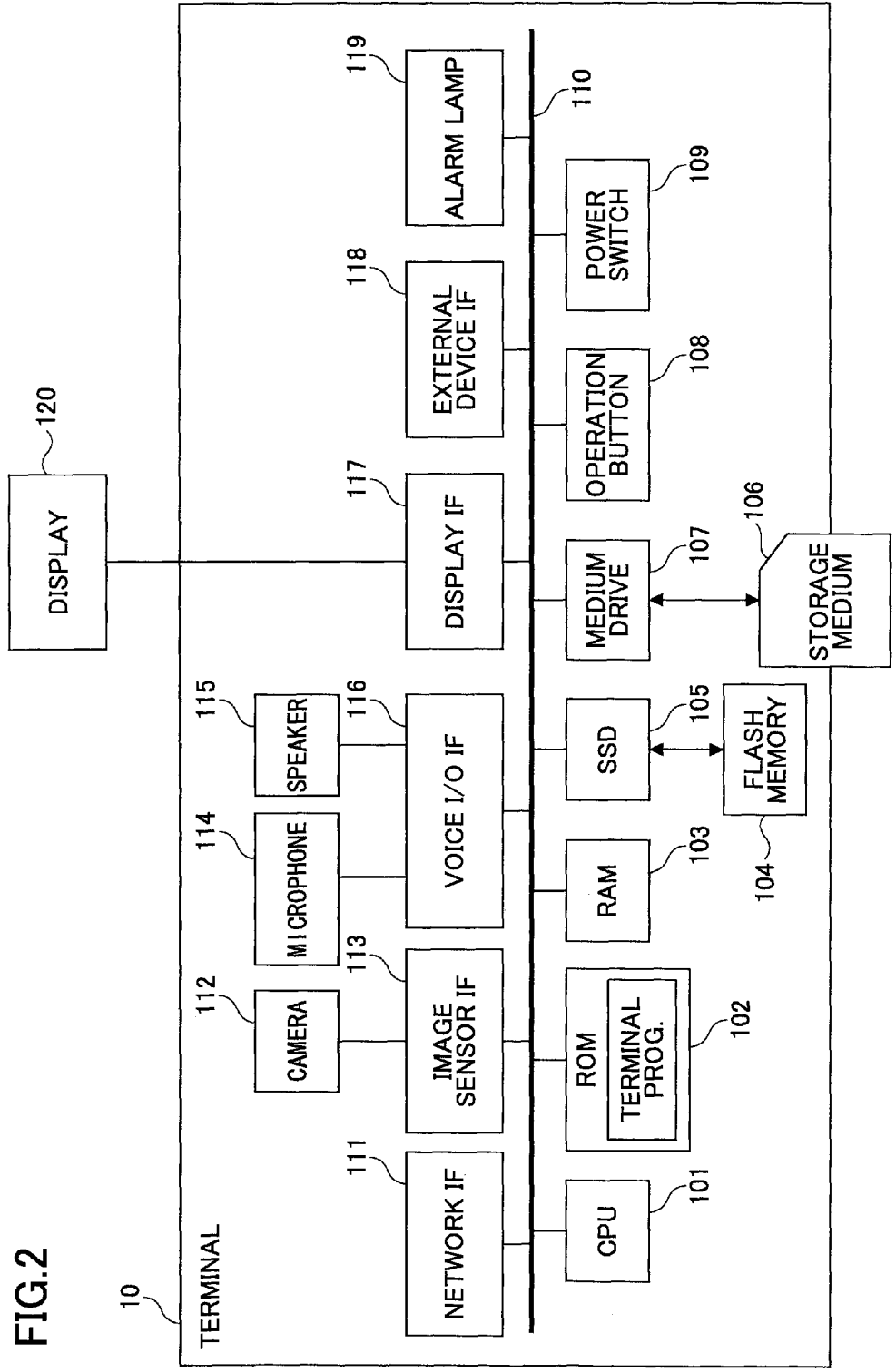
FIG. 2 is a diagram showing of the hardware configuration of a transmission terminal in the transmission system according to the embodiment.

FIG. 2 is a diagram showing the hardware configuration of the terminal (i.e., transmission terminal) 10 in the transmission system 1 according to the embodiment. As shown in FIG. 2, the terminal 10 includes a central processing unit (CPU) 101 configured to control overall operations of the terminal 10, a read-only memory (ROM) 102 storing programs for the terminal, a random access memory (RAM) 103 utilized as a work area of the CPU 101, a flash memory 104 configured to store various data such as image data or audio data, a solid state drive (SDD) 105 configured to control retrieval and writing (storing) of the various data in the flash memory 104 and the like based on the control of the CPU 101, a medium drive 107 configured to control retrieval and writing (storing) of data into a recording medium 106 such as a flash memory, an operation button 108 operated by a user for selecting an address of the terminal 10, a power switch 109 for switching ON/OFF of the power of the terminal 10, and a network IF (interface) 111 for transmitting data utilizing the communication network 2.

The terminal 10 further includes a camera 112 configured to image a subject based on the control of the CPU 101, an imaging device IF 113 configured to control driving of the camera 112, a microphone 114 configured to pick up audio sound, such as voice, sound or noise, a speaker 115 configured to output audio sound, a voice input/output IF 116 configured to provide an interface for the inputting/outputting of the audio sound from the microphone 114 and to the speaker 115, a display IF 117 configured to transmit image data to the external display 120 based on the control of the CPU 101, an external device IF 118 configured to connect various external devices to the connecting ports, an alarm lamp 119 configured to inform the user of various functional problems of the terminal 10, and a bus line 110 such as an address bus or a data bus for electrically connecting the elements and devices with one another shown in FIG. 2 via the bus line 110.

Note that the recording medium 106 is removable from the terminal 10. In addition, if the recording medium 106 is a non-volatile memory configured to retrieve or write data based on the control of the CPU 101, the recording medium 106 is not limited to the flash memory 104, and may be an electrically erasable and programmable ROM (EEPROM). The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD). A hard disk drive (HDD) may be used instead of the SSD 105.

The display 120 is a display unit formed of liquid crystal or an organic EL material configured to display images of the subject or icons for operating the terminal 10.

Further, the aforementioned programs for the terminal may be recorded in an installable format or in an executable format on a computer-readable recording medium such as the recording medium 106 to distribute such a recording medium.

The external device IF 118 may be connected via a universal serial bus (USB) with external devices such as the external camera, the external microphone, and the external speaker. On connecting the external camera to the external device IF 118 via the USB, the external camera is driven in priority to the built-in camera 112. Likewise, on connecting the external microphone or external speaker to the external device 118 via the USB, the external microphone or external speaker is driven in priority to the built-in microphone 114 or the built-in speaker 115. The transmission terminal 10 may be any of a PC, a smart phone, a tablet terminal, a mobile phone, etc.

Figure 3:
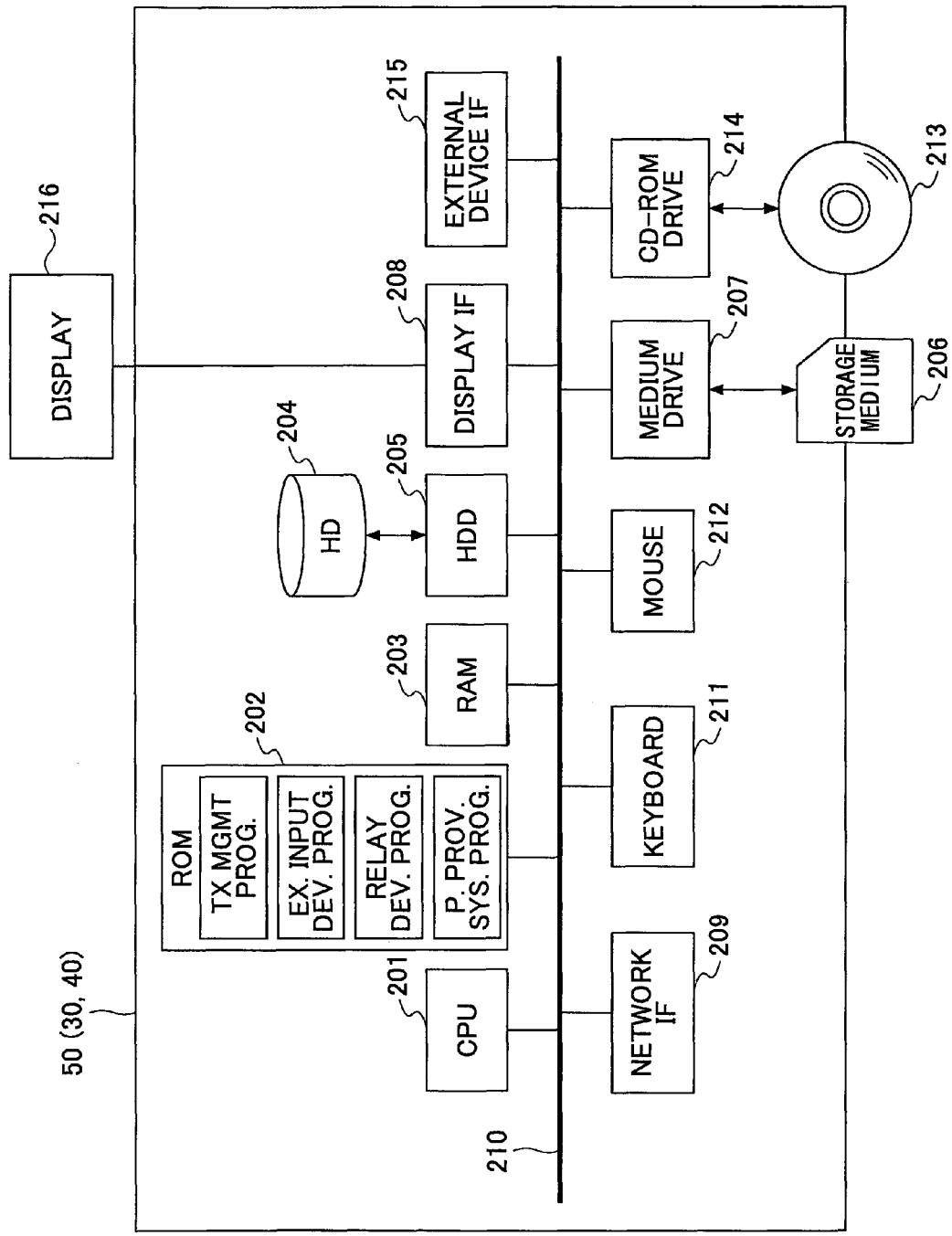
FIG. 3 is a diagram showing the hardware configuration of a transmission management system in the transmission system according to the embodiment.

FIG. 3 is a diagram showing the hardware configuration of the transmission management system 50 in the transmission system 1 according to the embodiment. As shown in FIG. 3, the transmission management system 50 includes a central processing unit (CPU) 201 configured to control overall operations of the management system 50, a read-only memory (ROM) 202 storing programs for the transmission management, a random access memory (RAM) 203 utilized as a work area of the CPU 201, a hard disk (HD) 204 configured to store various data, a hard disk drive (HDD) 205 configured to control retrieval and writing (storing) of the various data in the HD 204 based on the control of the CPU 201, a medium drive 207 configured to control retrieval and writing (storing) of data into a recording medium 206 such as a flash memory, a display IF 208 configured to display various information such as a cursor, menus, windows, characters and images, on a display 216, a network IF 209 for transmitting data utilizing the later-described communication network 2, a keyboard 211 including plural keys for inputting the characters, numerals, and various instructions, a mouse 212 for selecting or executing various instructions, selecting items to be processed, and moving the cursor, a CD-ROM drive 214 configured to control retrieval or writing of data in the compact disk read-only memory (CD-ROM) 213 as an example of a removable recording medium, an external device IF 215 configured to connect various external devices to the connecting ports, and a bus line 210 such as an address bus or a data bus for electrically connecting the elements and devices with one another illustrated in FIG. 3 via the bus line 210. The display 216 is an example of a display unit of the external input device 40.

Note that the aforementioned programs for the transmission management may be recorded in an installable format or in an executable format on a computer-readable recording medium such as the recording medium 206 or the CD-ROM 213 to distribute such a recording medium. The programs for the transmission management may be recorded on the HD 204.

Further, the external input device 40 includes a hardware configuration similar to that of the transmission management system, and the description of the hardware configuration of the external input device 40 is therefore omitted. Note that the ROM 202 stores programs for controlling the external input device 40. In this case, the programs for the external input device 40 may also be recorded in an installable format or in an executable format on a computer-readable recording medium such as the recording medium 206 or the CD-ROM 213 to distribute such a recording medium.

Further, the relay device 30 includes a hardware configuration similar to that of the management system 50, and the description of the hardware configuration of the relay device 30 is therefore omitted. Note that the ROM 202 stores programs for controlling the relay device 30. In this case, the programs for the relay device may also be recorded in an installable format or in an executable format on a computer-readable recording medium such as the recording medium 206 or the CD-ROM 213 to distribute such a recording medium.

Further, the program providing system 90 includes a hardware configuration similar to that of the management system 50, and the description of the hardware configuration of the program providing system 90 is therefore omitted. Note that the ROM 202 stores programs for controlling the program providing system 90. In this case, the programs for the program providing system 90 may also be recorded in an installable format or in an executable format on a computer-readable recording medium such as the recording medium 206 or the CD-ROM 213 to distribute such a recording medium.

Further, the maintenance system 100 includes a hardware configuration similar to that of the management system 50, and the description of the hardware configuration of the maintenance system 100 is therefore omitted. The maintenance system 100 is a computer configured to maintain or manage at least one of the terminal 10, the relay device 30, the management system 50, and the program supply system 90. For example, if the maintenance system 100 is domestically located while the terminal 10, the relay device 30, the management system 50 or the program supply system 90 is located abroad, the maintenance system 100 remotely maintains or manages at least one of the terminal 10, the relay device 30, the management system 50, and the program supply system 90 via the communication network 2.

Further, the maintenance system 100 may be arranged to maintain, without using the communication network 2, a model number, a production serial number, a sale place, maintenance inspection or failure history in at least one of the terminal 10, the relay device 30, the management system 50, and the program providing system 90.

Note that other examples of the aforementioned removable recording medium may include a compact disc recordable (CD-R), a digital versatile disk (DVD), and a Blu-ray Disc (BD).

[Functional Configuration of Embodiment]

Next, the functional configuration of the embodiment will be described with reference to FIGS. 4A to 14.

Figure 4A:
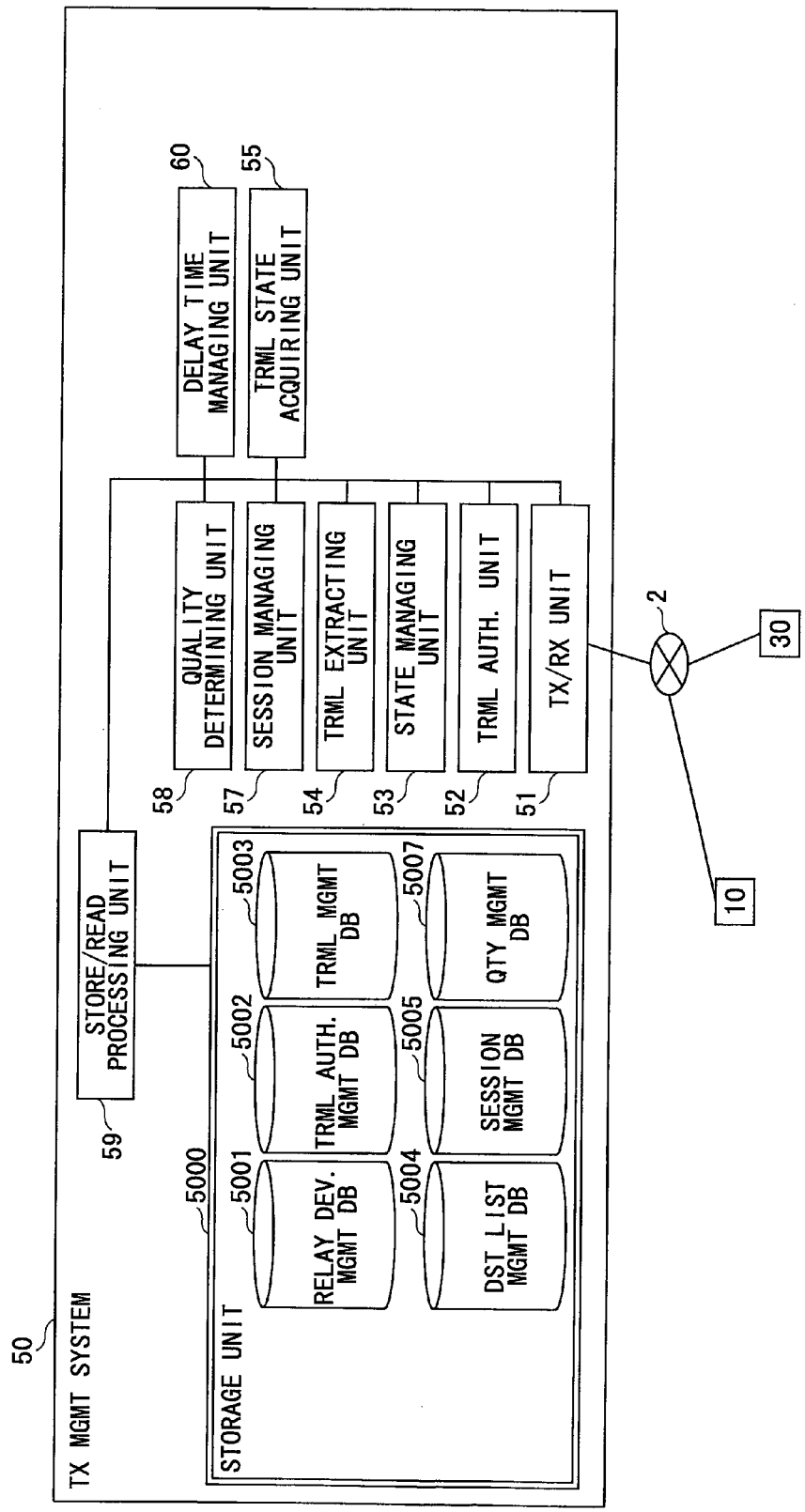

FIGS. 4A and 4B are block diagrams showing the functional configuration of the transmission terminal 10, the relay device 30, and the transmission management system 50 which constitute the transmission system 1 according to the embodiment. In the example shown in FIGS. 4A and 4B, the transmission terminal 10, the relay device 30, and the transmission management system 50 are connected via the communication network 2 so that they carry out data communications with one another via the communication network 2. The external input device 40 is connected to the transmission terminal 10 to transmit data to and receive data from the transmission terminal 10. Note that the program providing system 90 and the maintenance system 100 shown in FIG. 1 are not directly associated with videoconference communications and the illustration thereof will be omitted in FIGS. 4A and 4B.

Figure 13:
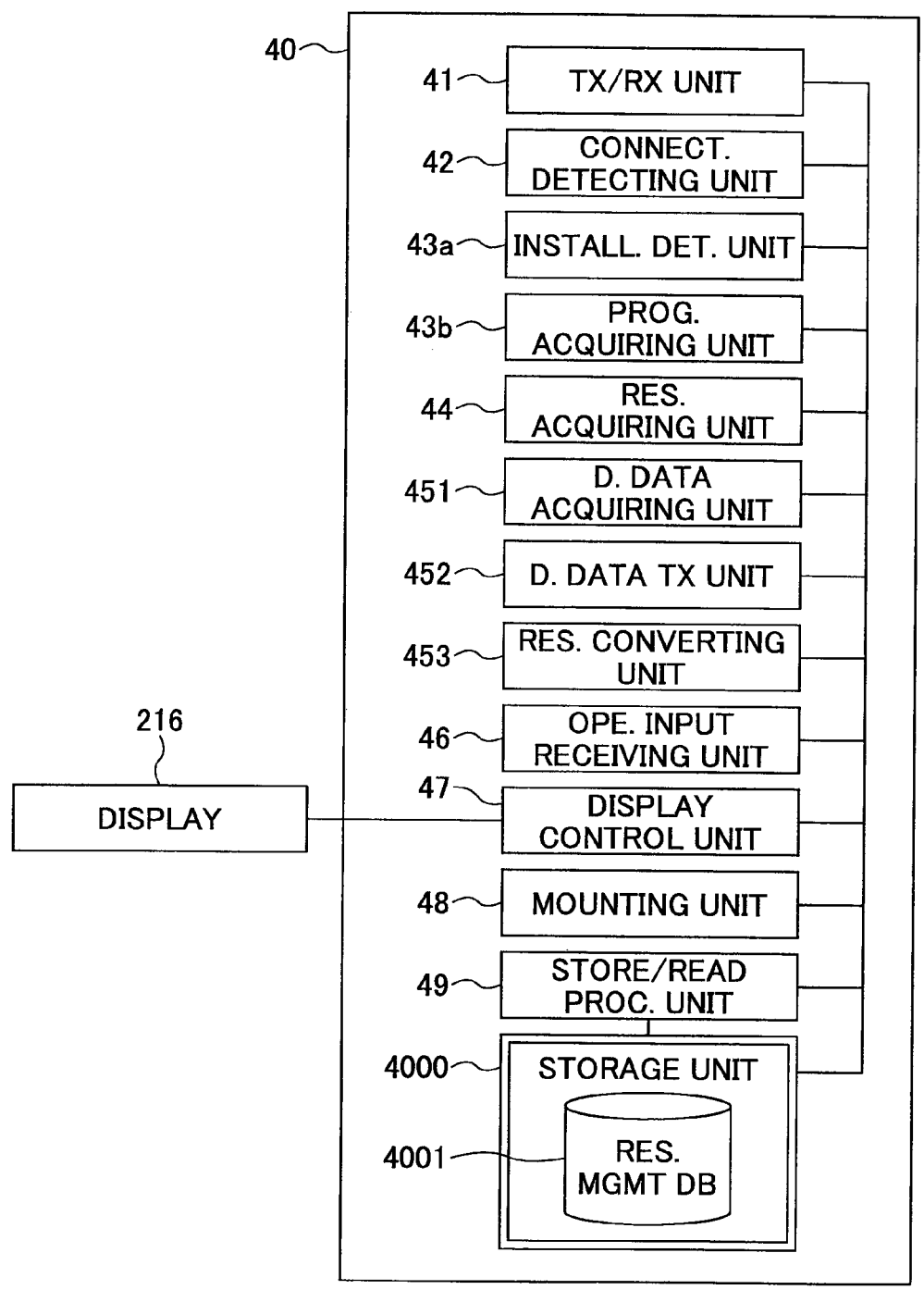
FIG. 13 is a block diagram showing the functional configuration of an external input device.

FIGS. 5A, 5B and 5C are diagrams showing image quality of image data. FIG. 6 is a diagram showing an example of a change quality management table 3001T. FIG. 7 is a diagram showing an example of a relay device management table 5001T. FIG. 8 is a diagram showing an example of a terminal authentication management table 5002T. FIG. 9 is a diagram showing an example of a terminal management table 5003T. FIG. 10 is a diagram showing an example of a destination list management table 5004T. FIG. 11 is a diagram showing an example of a session management table 5005T. FIG. 12 is a diagram showing an example of a quality management table 5007T. FIG. 13 is a block diagram showing the functional configuration of the external input device 40. FIG. 14 is a diagram showing an example of a resolution management table 4001T.

[Functional Configuration of Terminal]

As shown in FIG. 4B, the transmission terminal 10 includes a transmitting/receiving (TX/RX) unit 11, an operation input receiving unit 12, a login request unit 13, an imaging unit 14a, a display control unit 14b, a display image acquiring unit 14c, a voice input unit 15a, a voice output unit 15b, a delay detecting unit 17, an external information transmitting/receiving (TX/RX) unit 18, a store/read processing unit 19, a resolution acquiring unit 21a, a resolution determining unit 21b, a resolution selecting unit 21c, a resolution changing unit 21d. These units represent functions or units implemented by any of the elements and, devices shown in FIG. 2, which are activated by the instructions from the CPU 101 based on the programs stored in the ROM 102. Further, the transmission terminal 10 includes a storage unit 1000 formed of the SSD 105 shown in FIG. 2.

[Functional Units of Terminal]

Next, the functional units of the transmission terminal 10 will be described. The transmitting/receiving unit 11 of the terminal 10 is configured to transmit various data to and receive such data from other transmission terminals 10, the relay device 30 and the transmission management system 50 via the communication network 2. The function of the transmitting/receiving unit 11 may be implemented by the network IF 111 shown in FIG. 2. The operation input receiving unit 12 is configured to receive various inputs from a user. The function of the operation input receiving unit 12 may be implemented by the operation button 108 and the power switch 109 which are shown in FIG. 2. For example, when the user switches ON the power switch 109 shown in FIG. 2, the operation input receiving unit 12 (FIG. 4B) receives a power-ON signal to switch ON the power of the transmission terminal 10. Further, the operation input receiving unit 12 receives the resolution information indicating a resolution which is input by a user operation.

The login request unit 13 is configured to automatically transmit login request information, indicating that the user desires to login, and a current IP address of the terminal 10 as an IP address of a request source terminal from the transmitting/receiving unit 11 to the transmission management system 50 via the communication network 2 when the power-ON signal is received by the operation input receiving unit 12 as a trigger. The function of the login request unit 13 may be implemented by the instructions from the CPU 101 shown in FIG. 2.

The imaging unit 14a is configured to take an image of a subject and output image data of the subject. The function of the imaging unit 14a may be implemented by the camera 112 and the image sensor IF 113 shown in FIG. 2. The display control unit 14b is configured to perform rendering of image data and control the displaying of an image represented by the image data on the display 120. The function of the display control unit 14b may be implemented by the display IF 117 shown in FIG. 2. The display image acquiring unit 14c is configured to acquire image data representing an image currently displayed on the display 120. In this embodiment, data representing an image which is taken by the camera 112 will be referred to as "image data" and data representing an image currently displayed on the display 216 of the external input device 40 will be referred to as "display data". For example, the image data and the display data are in a form conforming to any of JPEG (Joint Photographic Experts Group), Bitmap, GDI (Graphics Device Interface), etc.

The voice input unit 15a is configured to input user's voice, convert the voice into an audio signal, and output audio data of the audio signal. The function of the voice input unit 15a may be implemented by the microphone 114 and the voice input/output IF 116 shown in FIG. 2. The voice output unit 15b is configured to convert the audio signal according to the voice data into voice and output the voice. The function of the voice output unit 15b may be implemented by the speaker 115 and the voice input/output IF 116 shown in FIG. 2.

The delay detecting unit 17 is configured to detect a delay time (ms) of image data or voice data transmitted from another transmission terminal 10 via the relay device 30. The function of the delay detecting unit 17 may be implemented by the instructions from the CPU 101 shown in FIG. 2. The external information transmitting/receiving unit 18 is configured to transmit data to and receive data from the external input device 40 via the external device IF 118 shown in FIG. 2. The store/read processing unit 19 is configured to store various data in a storage unit 1000 or read the various data stored in the storage unit 1000. The function of the store/read processing unit 19 may be implemented by the SSD 105 shown in FIG. 2.

The resolution acquiring unit 21a is configured to acquire resolutions which can be used by the display 120 connected to the transmission terminal 10. The resolution determining unit 21b is configured to determine whether a resolution other than a resolution of a standard aspect ratio used for transmission of image data is included in the resolutions acquired by the resolution acquiring unit 21a. The resolution selecting unit 21c is configured to select the resolution other than the resolution of the standard aspect ratio or the resolution of the standard aspect ratio from among the resolutions which can be used by the display 120 based on a result of the determination by the resolution determining unit 21b. The resolution changing unit 21d is configured to change the resolution of the display 120 to a resolution indicated by the resolution information received by the operation input receiving unit 12. In the following, the term "resolution" represents the number of pixels existing per unit area on a display screen and "resolution information" contains a resolution of a vertical direction and a resolution of a horizontal direction.

The storage unit 1000 stores a terminal ID (identifier) for identifying the transmission terminal 10, a password, a relay device ID for identifying the relay device 30 which transmits image data, voice data and various data, and an IP address of a destination terminal. Further, the storage unit 1000 stores the programs for the external input device (including a display data acquisition program 1451, a display data transmission program 1452, and a resolution conversion program 1453). By transmitting these programs to the external input device 40 and installing the programs in the external input device 40, the external input device 40 is provided with a display data acquiring unit 451, a display data transmitting unit 452 and a resolution converting unit 453, which will be described later. The storage unit 1000 includes a resolution storing unit 1005 which stores resolution information indicating a resolution of display data which is output or transmitted by the transmission terminal 10.

The external information transmitting/receiving unit 18 in the transmission terminal 10 according to the embodiment is an example of a resolution information transmitting unit and a display data receiving unit, and the display control unit 14b is an example of a display control unit.

Note that the terminal ID and the later-described relay-device ID in this embodiment individually indicate identification information formed of language, characters, and various symbols that uniquely identify the terminal 10 and the relay device 30, respectively. The terminal ID and the relay-device ID may be identification information formed of a combination of two or more of the language, characters, and various symbols. In the following, the terminal 10 as a request source terminal that requests initiation of a video-conference communication will be called a "request source terminal", and the terminal 10 as a destination terminal to which the request is sent will be called a "destination terminal".

[Functional Configuration of Relay Device]

Next, functions and units of the relay device 30 will be described. As shown in FIG. 4B, the relay device 30 includes a transmitting/receiving (TX/RX) unit 31, a state detecting unit 32, a data quality check unit 33, a changed quality managing unit 34, a data quality changing unit 35, and a store/read processing unit 39. These units represent functions and units implemented by any of the elements and devices shown in FIG. 3, which are activated by the instructions from the CPU 201 based on the programs stored in the ROM 202. Further, the relay device 30 includes a storage unit 3000 formed of any of the ROM 202, the RAM 203 and the HDD 205 which are shown in FIG. 3.

[Change Quality Management Table]

The storage unit 3000 includes a change quality management DB (database) 3001 formed of the change quality management table 3001T shown in FIG. 6. In the change quality management table, the IP addresses of the terminals 10 utilized as relay destination terminals are associated with image quality of the image data relayed by the respective relay devices 30.

Herein, the resolutions of the image data treated in the transmission system 1 according to the embodiment will be described. FIG. 5A shows a base image used as a low-resolution image formed of 160×120 pixels. FIG. 5B shows a medium-resolution image formed of 320×240 pixels. FIG. 5C shows a high-resolution image formed of 640×480 pixels. When the image data are relayed via a narrow-bandwidth path, the low-resolution image data used as the base image are relayed. When the image data are relayed via a relatively wide bandwidth path, the low-resolution image data used as the base image and the medium-resolution image data exhibiting medium image quality are relayed. When the image data are relayed via an extremely wide bandwidth path, the low-resolution image data used as the base image, the medium-resolution image data exhibiting the medium image quality, and the high-resolution image data exhibiting high image quality are relayed. As in the changed quality management table 3001T shown in FIG. 6, if, for example, the relay device 30 relays the image data to the destination terminal 10db having an IP address "1.3.2.4" (FIG. 1), the image quality of the image data relayed is "high image quality".

[Functional Units of Relay Device]

Next, functions and units of the relay device 30 will be described. Note that in the following description, the functions of the relay device 30 are illustrated in association with the main elements and devices for implementing the units of the relay device 30 shown in FIG. 3.

The transmitting/receiving unit 31 of the relay device 30 is configured to transmit various data to and receive such data from other transmission terminals 10, the relay devices 30, and the transmission management system 50 via the communication network 2. The function of the transmitting/receiving unit 31 may be implemented by the network IF 209 shown in FIG. 3. The state detecting unit 32 is configured to detect an operating state of the relay device 30 having the state detecting unit 32. The function of the state detecting unit 32 may be implemented by the instructions from the CPU 201 shown in FIG. 3. The operating state may be "ONLINE", "OFFLINE", "DURING CALL" or "FAILED".

The data quality check unit 33 is configured to search the change quality management table (FIG. 6) by the IP address of the destination terminal 10 as a search key and check the image quality for the relayed image data by extracting the image quality for the corresponding image data to be relayed. The function of the data quality check unit 33 may be implemented by the instructions from the CPU 201 shown in FIG. 3. The change quality managing unit 34 is configured to change content of the change quality management DB 3001 based on the later-described quality information which is transmitted from the transmission management system 50. The function of the change quality managing unit 34 may be implemented by the instructions from the CPU 201 shown in FIG. 3. For example, assume that while a videoconference is held between a request source terminal 10aa having a terminal ID "01aa" and a destination terminal 10db having a terminal ID "01db", another videoconference is initiated between a request source terminal bb and a destination terminal ca via the communication network 2. In this case, if the reception of the image data is delayed in the destination terminal 10db, the relay device 30 may need to degrade the image quality of the relayed image data from high image quality to medium image quality. In such a case, the content of the change quality management DB 3001 is changed such that the image quality of the image data relayed by the relay device 30 is degraded from the high image quality to the medium image quality.

The data quality changing unit 35 is configured to change the image quality of the image data sent from the request source terminal 10 based on the changed content of the change quality management DB 3001. The function of the data quality changing unit 35 may be implemented by the instructions from the CPU 201 shown in FIG. 3. The store/read processing unit 39 is configured to store various data in the storage unit 3000 and read the various data stored in the storage unit 3000. The function of the store/read processing unit 39 may be implemented by the HDD 205 shown in FIG. 3.

[Functional Configuration of Management System]

Next, functions and units of the transmission management system 50 will be described. As shown in FIG. 4A, the transmission management system 50 includes a transmitting/receiving (TX/RX) unit 51, a terminal authenticating unit 52, a state managing unit 53, a terminal extracting unit 54, a terminal state acquiring unit 55, a session managing unit 57, a quality determination unit 58, a store/read processing unit 59, and a delay time managing unit 60. These units represent functions and units implemented by any of the elements and devices shown in FIG. 3, which are activated by the instructions from the CPU 201 based on the programs stored in the ROM 202. Further, the transmission management system 50 includes a storage unit 5000 formed of the ROM 202, the RAM 203, or the HDD 205 shown in FIG. 3.

[Relay Device Management Table]

The storage unit 5000 includes a relay device management DB 5001 formed of the relay device management table 5001T shown in FIG. 7. In the relay device management table 5001T, relay device IDs of the relay devices 30 are associated with operating states of the relay devices 30, date/times of reception at which the state information indicating the operating states of the relay devices 30 is received by the transmission management system 50, IP addresses of the relay devices 30, and maximum data transmission speeds (Mbps) of the relay devices 30. For example, in the relay device management table 5001T shown in FIG. 7, the relay device 30a (FIG. 1) having the relay device ID "111a" is associated with the operating state "ONLINE", the time/date of reception "2009.11.10.13:00" at which the state information of the relay device 30a is received by the transmission management system 50, the IP address "1.2.1.2" of the relay device 30a, and the maximum data transmission speed "100 Mbps" of the relay device 30a.

[Terminal Authentication Management Table]

The storage unit 5000 includes a terminal authentication management DB 5002 formed of the terminal authentication management table 5002T shown in FIG. 8. In the terminal authentication management table 5002T, passwords are individually associated with the terminal IDs of the transmission terminals 10 managed by the transmission management system 50. For example, in the terminal authentication management table 5002T shown in FIG. 8, the terminal ID "01aa" of the terminal 10aa (FIG. 1) is associated with the password "aaaa".

[Terminal Management Table]

The storage unit 5000 includes a terminal management DB 5003 formed of the terminal management table 5003T shown in FIG. 9. In the terminal management table 5003T, the terminal IDs of the transmission terminals 10 are associated with operating states of the transmission terminals 10, date/times of reception at which the later-described login request information is received by the transmission management system 50, and IP addresses of the transmission terminals 10. For example, in the terminal management table 5003T shown in FIG. 9, the terminal ID "01aa" of the terminal 10aa (FIG. 1) is associated with the operating state "ONLINE" of the terminal 10aa, the date/time of reception "2009.11.10.13:40" at which the login request information is received by the management system 50, and the IP address "1.2.1.3." of the terminal 10aa.

[Destination List Management Table]

The storage unit 5000 includes a destination list management DB 5004 formed of the destination list management table 5004T shown in FIG. 10. In the destination list management table 5004T, terminal IDs of destination terminals 10 registered as destination candidate terminals 10 are associated with the terminal IDs of the request source terminal 10 that requests initiation of a videoconference communication. For example, in the destination list management table 5004T shown in FIG. 10, the terminal ID "01aa" of the request source terminal 10aa (FIG. 1) is associated with the terminal IDs of the destination candidate terminals 10 which the request source terminal 10aa is able to request initiation of the videoconference, including the transmission terminal 10ab having a terminal ID "01ab", the transmission terminal 10ba having a terminal ID "01ba", and the transmission terminal 10db having a terminal ID "01db". The destination candidate terminals 10 may be added or deleted based on the instructions from the request source terminal 10 to the transmission management system 50.

[Session Management Table]

The storage unit 5000 includes a session management DB 5005 formed of a session management table 5005T shown in FIG. 11. In the session management table 5005T, session IDs that identify sessions in which the communication data are transmitted and received between the terminals are associated with the relay device IDs of the relay devices 30 utilized for relaying the image data and the audio data, the terminal ID of the request source terminal 10, the terminal ID of the destination terminal 10, the delay time (ms) in receiving the image data by the destination terminal 10, and the date/time of reception at which the delay information indicating the delay time transmitted from the destination terminal 10 is received by the management system 50.

For example, in the session management table 5005T shown in FIG. 11, the relay device 30a (having the relay device ID "111a") selected for executing the session having the session ID "se1" and relaying image data and voice data is associated with the terminal ID "01aa" of the request source terminal 10aa (FIG. 1) that has a videoconference with the destination terminal 10db having the terminal ID "01db". Further, the session management table 5005T indicates that the relay device 30a relays the image data and the audio data between the request source terminal 10aa and the destination terminal 10db, and the delay time when the image data are received by the destination terminal 10db at the date/time of reception "2009.11.10. 14:00" is 200 (ms).

Note that when the videoconference is conducted between the two terminals 10, the date/time of reception of the delay information may be managed not based on the delay information received at the destination terminal 10 but based on the delay information transmitted from the request source terminal 10. However, when the videoconference is conducted among three or more transmission terminals 10, the date/time of reception of the delay information may be managed based on the delay information transmitted from the image data and voice data reception side transmission terminal 10.

[Quality Management Table]

The storage unit 5000 includes a quality management DB 5007 formed of the quality management table 5007T shown in FIG. 12. In the quality management table 5007T, the delay time (ms) in receiving the image data at the request source terminal 10 or the destination terminal 10 is associated with the image quality of the image data relayed by the relay device 30.

[Functional Units of Management System]

Next, functional units of the transmission management system 50 will be described. Note that in the following description, the functions of the management system 50 are illustrated in association with the main elements and devices for implementing the units of the management system 50 shown in FIG. 3.

The transmitting/receiving unit 51 (FIG. 4A) of the management system 50 is configured to transmit various data (information) to and receive such data from other transmission terminals 10, the relay devices 30, and other systems (i.e., the program providing system 90 and the maintenance system 100) via the communication network 2. The terminal authenticating unit 52 is configured to search the terminal authentication management table 5002T of the storage unit 5000 by a terminal ID and a password contained in the received login request information as search keys, and authenticate the corresponding terminal 10 based on whether the terminal ID and the password contained in the received login request are identical to those managed in the terminal authentication management table 5002T. The state managing unit 53 is configured to manage the terminal management table 5003T (FIG. 9) by associating the terminal ID of the request source terminal 10 that has requested for login with the operating state of the request source terminal 10, the date/time of reception of the login request information by the management system 50, and the IP address of the request source terminal 10.

The terminal extracting unit 54 is configured to search the destination list management table 5004T (FIG. 10) by the terminal ID of the request source terminal 10 that has requested for the login as a search key, and retrieve the terminal IDs of the destination candidate terminals 10 capable of communicating with the request source terminal 10. As a result, the terminal extracting unit 54 extracts the terminal IDs of the destination candidate terminals 10 capable of communicating with the request source terminal 10. Further, the terminal extracting unit 54 is configured to search the destination list management table (FIG. 10) by the terminal ID of the request source terminal 10 which has requested for the login as a search key, and extract terminal IDs of other request source terminals 10 that have registered the above terminal ID of the request source terminal 10 as a destination candidate terminal 10.

The terminal state acquiring unit 55 is configured to search the terminal management table 5003T (FIG. 9) by the terminal IDs of the destination candidate terminals 10 extracted by the terminal extracting unit 54 as search keys, and retrieve the operating states of the extracted destination candidate terminals 10 by the terminal IDs of the extracted destination candidate terminals 10. Thus, the terminal state acquiring unit 55 acquires the operating states of the destination candidate terminals 10 capable of communicating with the request source terminal 10 that has requested for the login. Further, the terminal state acquiring unit 55 is configured to search the terminal management table 5003T (FIG. 9) by the terminal IDs of the terminals 10 extracted by the terminal extracting unit 54 as search keys, and acquire the operating state of the request source terminal 10 that has requested for the login.

The session managing unit 57 is configured to store and manage, in the session management DB 5005 (the session management table 5005T of FIG. 11) of the storage unit 5000, the session IDs generated in association with the terminal ID of the request source terminal and the terminal ID of the destination terminal. Further, the session managing unit 57 is configured to store and manage the relay device ID of the relay device 30 in the session management table 5005T (FIG. 11).

The quality determination unit 58 is configured to search the quality management table 5007T (FIG. 12) by the delay time as a search key, extract the image quality of the corresponding image data, and determine the image quality of the image data relayed by the relay device 30. The store/read processing unit 59 is configured to store various data in the storage unit 5000 and retrieve various data from the storage unit 5000. The function of the store/read processing unit 59 may be implemented by the HDD 205 shown in FIG. 3. The delay time managing unit 60 is configured to search the terminal management table 5003T (FIG. 9) by the IP address of the destination terminal 10 as a search key, and extract the corresponding terminal ID. Further, the delay time managing unit 60 is configured to store the delay time indicated by the delay information in a delay time field of the record corresponding to the extracted terminal ID in the session management table 5005T (FIG. 11).

[Functional Configuration of External Input Device]

As shown in FIG. 13, the external input device 40 includes a transmitting/receiving unit 41, a connection detecting unit 42, an installation determining unit 43a, a program acquiring unit 43b, a resolution acquiring unit 44, a display data acquiring unit 451, a display data transmitting unit 452, a resolution converting unit 453, an operation input receiving unit 46, a display control unit 47, a mounting unit 48, and a store/read processing unit 49. These units represent functions and units implemented by any of the elements and devices shown in FIG. 3, which are activated by the instructions from the CPU 201 based on the programs stored in the ROM 202. Further, the display data acquiring unit 451, the display data transmitting unit 452, and the resolution converting unit 453 may be implemented by downloading the display data acquisition program 1451, the display data transmission program 1452, and the resolution conversion program 1453 from the storage unit 1000 (FIG. 4B) of the terminal 10 by the program acquiring unit 43b and installing these programs in the external input device 40. Further, the external input device 40 includes a storage unit 4000 formed of any of the ROM 202, the RAM 203, and the HDD 205 which are shown in FIG. 3. Although not illustrated in the drawings, the storage unit 4000 of the external input device 40 incorporates an operating system (OS), such as Windows®, the classic Mac® OS, Mac® OS X Lion, Mac® OS X, or the renamed OS X, and, when connected to another device, the CPU 201 of the external input device 40 is capable of executing the programs for the external input device 40 and the downloaded programs on the OS.

[Functional Units of External Input Device]

Next, functional units of the external input device 40 will be described.

The transmitting/receiving unit 41 (FIG. 13) is configured to transmit various data (information) to and receive such data from the transmission terminal 10. The function of the transmitting/receiving unit 41 may be implemented by the network IF 209 shown in FIG. 3. As information related to the embodiment, when a display resolution is changed in the transmission terminal 10, the transmitting/receiving unit 41 receives resolution information (first resolution information) indicating the changed resolution from the transmission terminal 10. The connection detecting unit 42 is configured to detect that the communication of various data between the external input device 40 and the transmission terminal 10 via the external device IF 215 shown in FIG. 3 is enabled.

The installation determining unit 43*a* is configured to determine whether the display data acquisition program 1451, the display data transmission program 1452, and the resolution conversion program 1453 are installed in the external input device 40 if the connection detecting unit 42 detects that the data communication between the external input device 40 and the transmission terminal 10 is enabled. The program acquiring unit 43*b* is configured to acquire the display data acquisition program 1451, the display data transmission program 1452, and the resolution conversion program 1453 from the storage unit 1000 (FIG. 4A) of the transmission terminal 10 if the installation determining unit 43*a* determines that the display data acquisition program 1451, the display data transmission program 1452, and the resolution conversion program 1453 are not installed in the external input device 40.

The resolution acquiring unit 44 is configured to acquire resolution information (second resolution information) indicating a resolution of the display 216 of the external input device 40. The operation input receiving unit 46 is configured to receive the information input by a user operation. The display control unit 47 is configured to display on the display 216 the image read by the later-described store/read processing unit 49. The mounting unit 48 is configured to mount the storage unit 1000 of the terminal 10 on the external input device 40. Thus, the external input device 40 is able to install the display data acquisition program 1451, the display data transmission program 1452, and the resolution conversion program 1453 in the external input device 40.

The display data acquiring unit 451 is configured to acquire display data indicating an image currently displayed on the display 216 of the external input device 40. The display data transmitting unit 452 is configured to transmit the display data acquired by the display data acquiring unit 451 to the transmission terminal 10. The resolution converting unit 453 is configured to determine a resolution of the display data to be transmitted from the external input device 40 to the transmission terminal 10, based on resolution information (first resolution information) of the display 120 of the transmission terminal 10 received from the transmission terminal 10 and stored in the storage unit 4000 of the external input device 40 and resolution information (second resolution information) of the display 216 of the external input device 40.

The store/read processing unit 49 is configured to store various data in the storage unit 4000 and read the various data from the storage unit 4000. The function of the store/read processing unit 49 may be implemented by the HDD 205 shown in FIG. 3.

The transmitting/receiving unit 41 in the external input device 40 according to the embodiment is an example of a resolution information receiving unit, the display data transmitting unit 452 is an example of an display data transmitting unit, the resolution converting unit 453 is an example of a resolution conversion unit, and the display control unit 47 is an example of a display control unit.

[Resolution Management Table]

The storage unit 4000 includes a resolution management DB 4001 formed of a resolution management table 4001T shown in FIG. 14. In the resolution management table 4001T, a resolution of the vertical direction (height direction) of the display 120 of the transmission terminal 10 and a resolution of the horizontal direction (width direction) which are indicated by the resolution information received from the transmission terminal 10 at the transmitting/receiving unit 41 are associated together and stored. For example, in the resolution management table 4001T shown in FIG. 14, the resolution (width direction) and the resolution (height direction) of the display 120 of the terminal 10 are 1024 and 768, respectively.

[Process/Operation of Embodiment]

Figure 15:
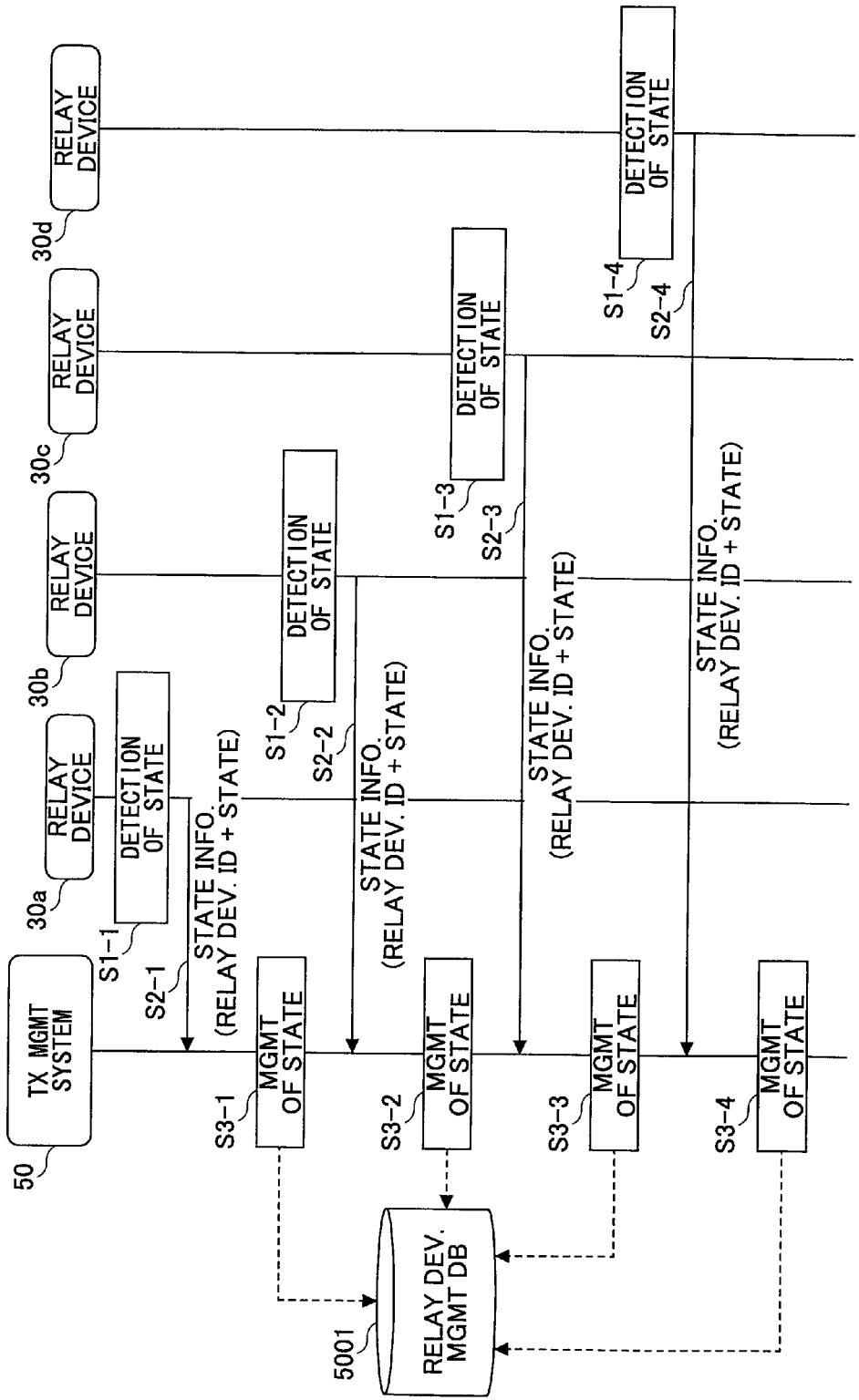
FIG. 15 is a sequence diagram for explaining a process performed to manage state information sent from relay devices to the transmission management system, the state information indicating respective operating states of the relay devices.
Figure 16:
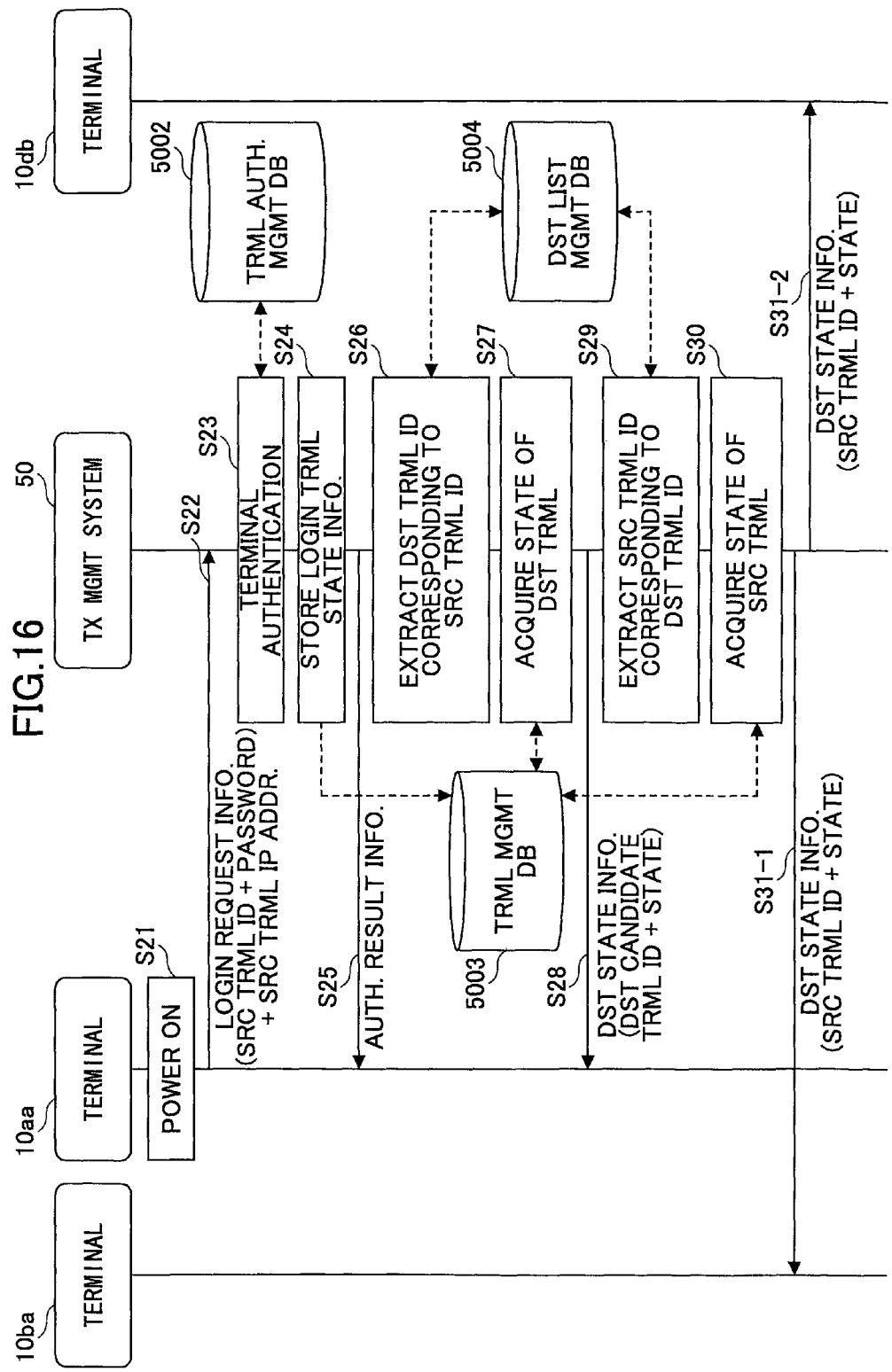
FIG. 16 is a sequence diagram for explaining a preparatory process performed before starting communication between the transmission terminals.
Figure 17:
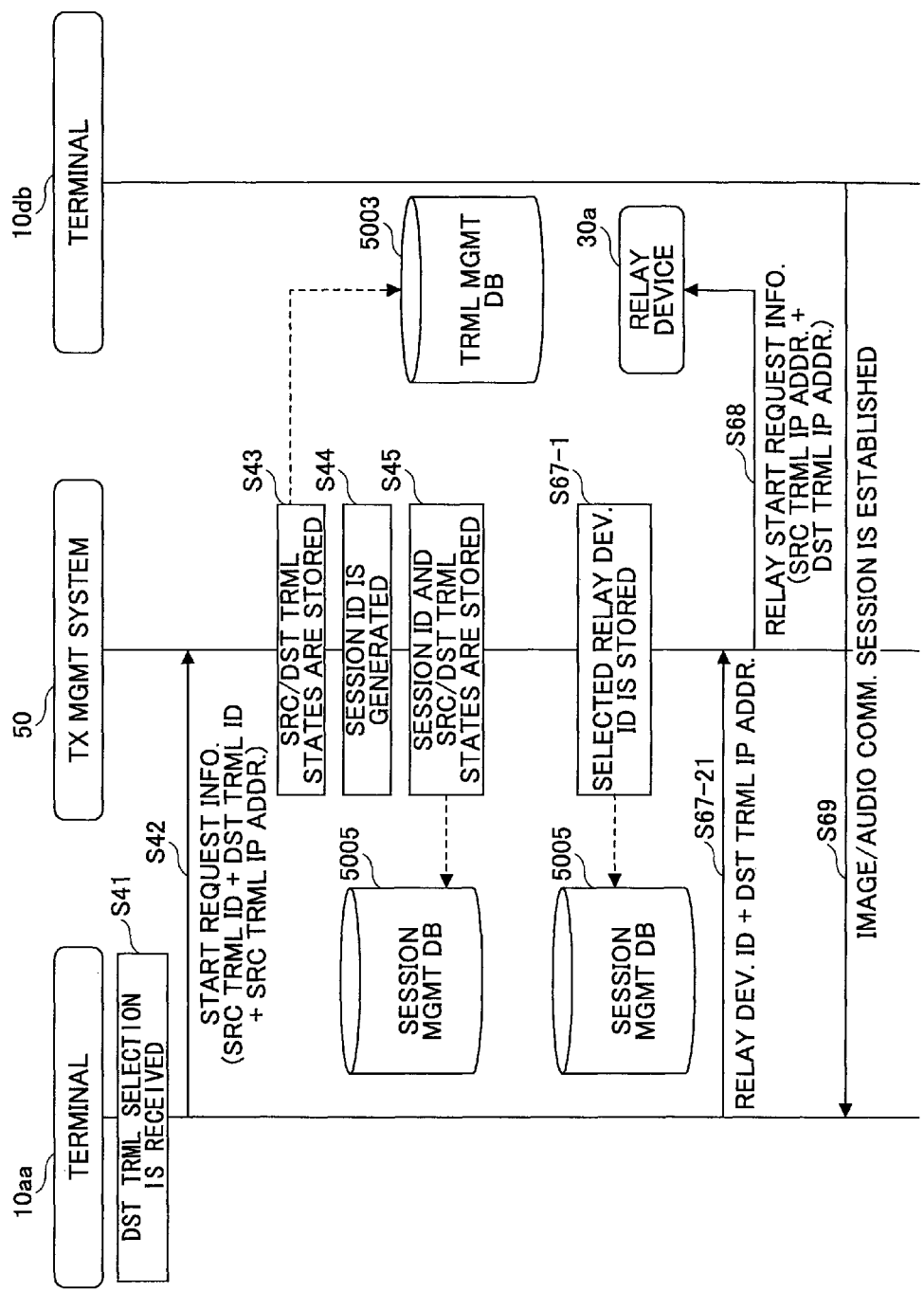
FIG. 17 is a sequence diagram for explaining a process performed by a transmission terminal to establish a session with another transmission terminal.
Figure 18:
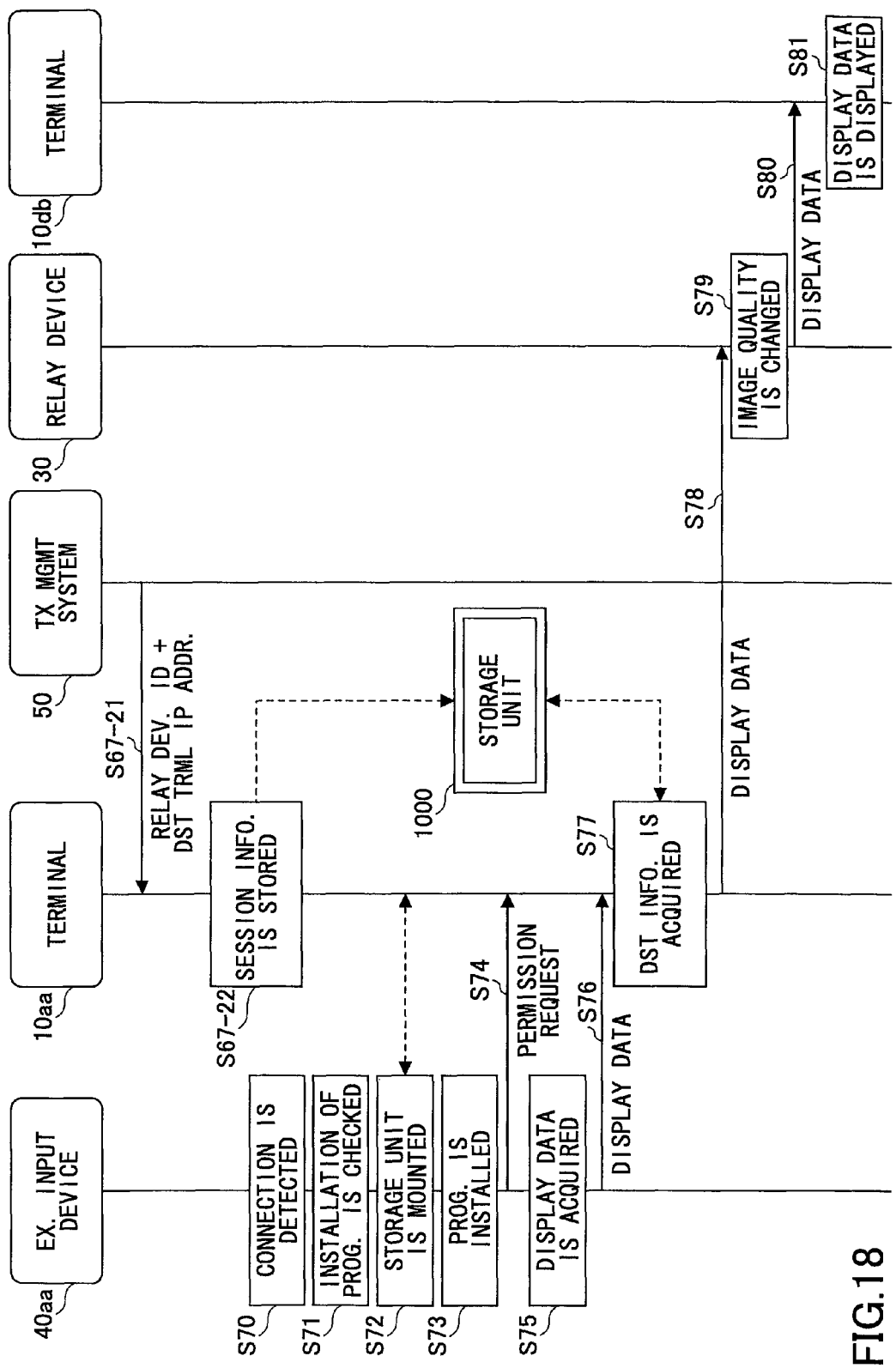
FIG. 18 is a sequence diagram for explaining a process performed to transmit display data from an external input device of a transmission terminal to another transmission terminal of a communication partner and display an image of the display data thereon.
Figure 19:
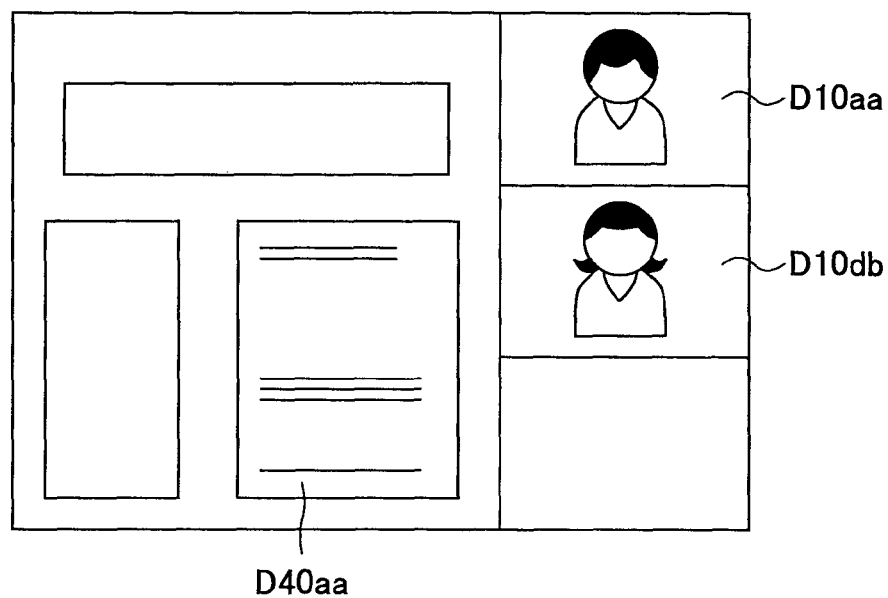
FIG. 19 is a diagram showing an example of display data displayed on a display.
Figure 20:
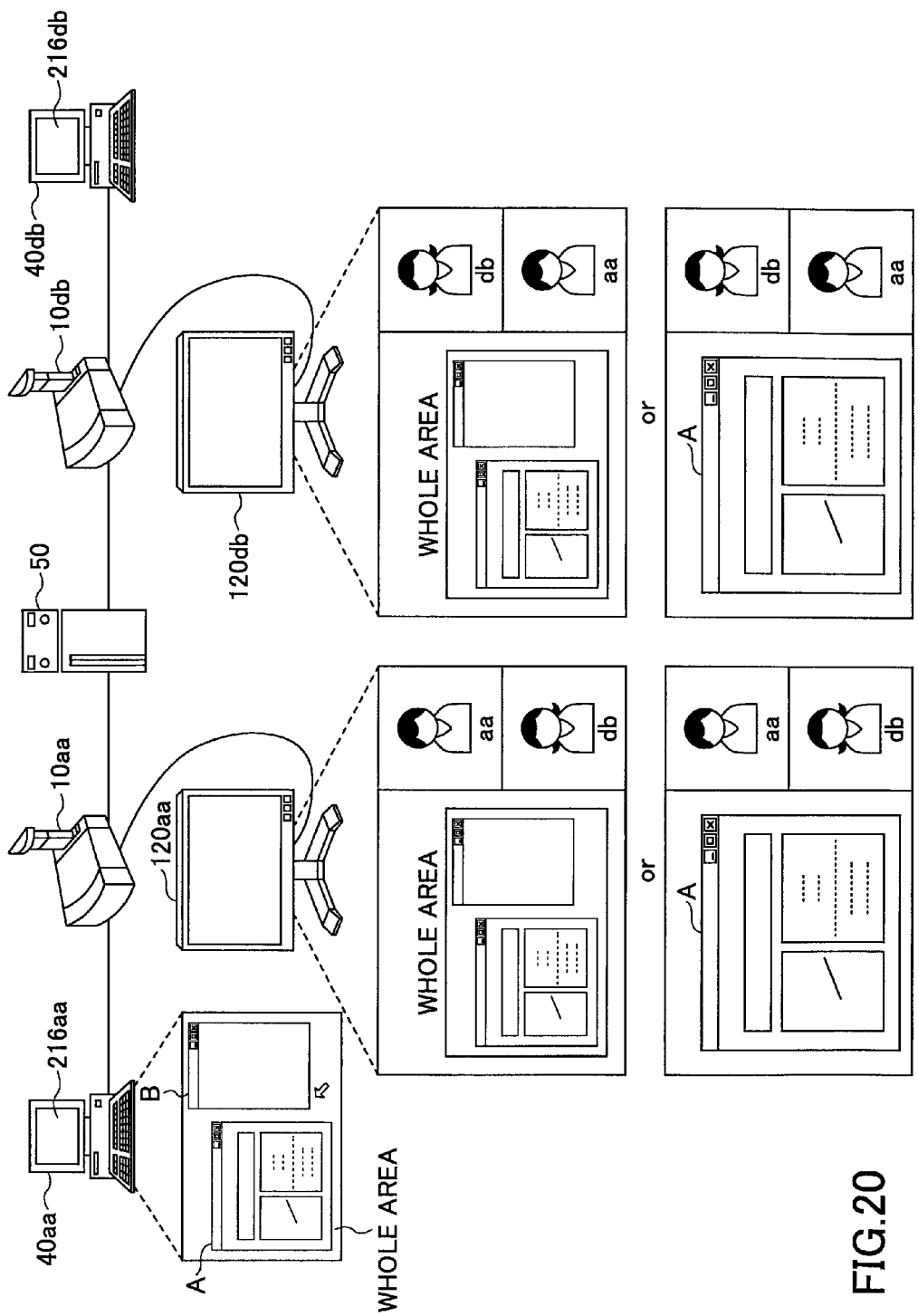
FIG. 20 is a diagram showing a screen displayed on a display of an external input device and screens displayed on the transmission terminals in the transmission system.

Next, processes performed by the transmission system 1 according to the embodiment will be described with reference to FIGS. 15-20. Note that FIG. 15 is a sequence diagram for explaining a process to manage state information sent from relay devices 30 to the transmission management system 50, the state information indicating respective operating states of the relay devices 30. FIG. 16 is a sequence diagram for explaining a preparatory process performed to start communication between the transmission terminals 10. FIG. 17 is a sequence diagram for explaining a process performed by a transmission terminal to establish a session with another transmission terminal. FIG. 18 is a sequence diagram for explaining a process performed to transmit display data from an external input device 40 of the transmission terminal to another transmission terminal of a communication partner and display an image of the display data thereon. FIG. 19 is a diagram showing an example of display data displayed on the display 120. FIG. 20 is a diagram showing a screen displayed on the display 216*aa* of the external input device 40*aa* and screens displayed on the transmission terminals 10*aa* and 10*db* in the transmission system 1.

With reference to FIG. 15, the process to manage the state information transmitted from the relay devices 30 to the management system 50 and indicating the operating states of the relay devices 30 will be described.

Each of the relay devices 30 (30*a*-30*d*) includes the state detecting unit 32 (FIG. 4B) which regularly detects the operating state of the relay device 30 (itself) (S1-1 to S1-4). The transmitting/receiving units 31 of the relay devices 30 regularly transmit a corresponding state information of the relay device itself to the management system 50 via the communication network 2 so that the management system 50 side may manage the operating states of the relay devices 30 in real time (step S2-1 to S2-4). The state information includes the relay device ID of the relay device 30 itself and the operating state detected by the state detecting unit 32 of the relay device 30 itself and associates it with the relay device ID. Note that in this embodiment, a case where the relay devices (30*a*, 30*b*, 30*d*) are running normally and in the state "ONLINE" is illustrated; however, the relay device 30*c* is operating but is in the state "OFFLINE" due to some kind of defect in the programs for executing the operation of the relay device 30*c*.

Next, in the management system 50, the transmitting/receiving unit 51 receives the state information sent from each of the relay devices 30*a*-30*d* and the store/read processing unit 59 stores each of the received state information in association with the corresponding relay device ID in the relay device management DB 5001 (the relay device management table 5001T of FIG. 7) of the storage unit 5000 (steps S3-1 to S3-4). Thus, the operating state "ONLINE", "OFFLINE" or "FAILED" is stored in the operating-state field of the relay device management table 5001T (FIG. 7) in association with the relay device ID for each of the relay devices 30. Simultaneously, the date/time of reception of the state information received by the management system 50 is also stored in association with the corresponding relay device ID in the relay device management table. Note that when the state information is not sent from the relay device 30, the operating state field and the receipt date/time field of the record in the relay device management table (FIG. 7)

may be blank, or the previous operating state and the previous receipt date/time may be present.

Next, a preparatory process performed before starting communication between the terminal 10aa and the terminal 10db will be described with reference to FIG. 16.

First, when the user of the terminal 10aa switches ON the power switch 109 (FIG. 2), the operation input receiving unit 12 (FIG. 4B) receives a power-ON signal to switch ON the power of the terminal 10aa (step S21).

On receiving the power-ON signal as a trigger, the login request unit 13 automatically transmits the login request information indicating the login request from the transmitting/receiving unit 11 to the management system 50 via the communication network 2 (step S22). This login request information includes a terminal ID and a password for identifying the terminal 10aa indicating its own terminal as the request source terminal. The terminal ID and the password are data that are read from the storage unit 1000 via the store/read processing unit 19 and then sent to the transmitting/receiving unit 11. Note that when the login request information is transmitted from the terminal 10aa to the management system 50, the receiver side management system 50 may detect the IP address of the transmitter side terminal 10aa.

Subsequently, the terminal authenticating unit 52 (FIG. 4A) of the management system 50 authenticates the terminal 10aa based on whether the terminal ID and the password contained in the login request information received via the transmitting/receiving unit 51 are identical to those managed in the terminal authentication management DB 5002 (step S23). In this case, the terminal authenticating unit 52 acquires the terminal ID and the password from the terminal authentication management DB 5002 of the storage unit 5000 by searching for the terminal ID and the password as search keys in the terminal authentication management table 5002T (FIG. 8).

When it is determined by the terminal authenticating unit 52 that the terminal ID and the password contained in the login request are identical to those managed in the terminal authentication management DB 5002 and the received login request comes from the terminal 10 having a valid access authorization, the state managing unit 53 stores the terminal ID of the terminal 10aa, the operating state, the date/time of reception of the login request information, and the IP address of the terminal 10aa in association with each other in the terminal management DB 5003 (the terminal management table 5003T of FIG. 9) (step S24). Thus, the operating state "ONLINE", the reception date/time "2009.11.10.13:40", and the terminal IP address "1.2.1.3" are managed in association with the terminal ID "01aa" in the terminal management table (FIG. 9).

Subsequently, the transmitting/receiving unit 51 of the management system 50 transmits authentication result information indicating authentication result obtained by the terminal authenticating unit 52 via the communication network 2 to the request source terminal 10aa that has sent the login request (step S25). In the following, the case where the terminal authenticating unit 52 has determined that the terminal 10aa has the valid access authorization will be further described.

The terminal extracting unit 54 of the management system 50 searches the destination list management table (FIG. 10) by the terminal ID "01aa" of the request source terminal 10aa as a search key, and extracts the terminal IDs of the destination candidate terminals 10 capable of communicating with the request source terminal 10aa (step S26). As a result, in this example, the terminal IDs "01ab", "01ba", "01db" of the destination candidate terminals 10ab, 10ba, 10db associated with the terminal ID "01aa" of the request source terminal 10aa are extracted.

Subsequently, the terminal state acquiring unit 55 searches the terminal management table 5003T (FIG. 9) by the terminal IDs ("01ab", "01ba", "01db") of the destination candidate terminals 10 extracted by the terminal extracting unit 54 as search keys, and retrieves the operating states of the destination candidate terminals (10ab, 10ba, 10db) by reading the operating states ("OFFLINE", "ONLINE", "ONLINE") corresponding to the terminal IDs extracted by the terminal extracting unit 54 (step S27).

Subsequently, the transmitting/receiving unit 51 transmits destination state information containing the terminal IDs ("01ab", "01ba", "01db") used as the search keys at step S27 and the operating states ("OFFLINE", "ONLINE", "ONLINE") of the corresponding destination candidate terminals (10ab, 10ba, 10db) to the request source terminal 10aa via the communication network 2 (step S28). Thus, the request source terminal 10aa may detect each of the current operating states ("OFFLINE", "ONLINE", "ONLINE") of the destination candidate terminals (10ab, 10ba, 10db) which are the candidate terminals for the destination terminal capable of communicating with the request source terminal 10aa.

Subsequently, the terminal extracting unit 54 of the management system 50 searches the destination list management table 5004T (FIG. 10) by the terminal ID "01aa" of the request source terminal 10aa that has sent the login request as a search key, and extracts terminal IDs of other request source terminals 10 which have been registered as the destination terminals 10 for the terminal ID "01aa" of the request source terminal 10aa (step S29). In the destination list management table 5004T shown in FIG. 10, the extracted terminal IDs of the other request source terminals 10 are "01ab", "01ba", and "01db".

Subsequently, the terminal state acquiring unit 55 of the management system 50 searches the terminal management table 5003T (FIG. 9) by the terminal ID "01aa" of the request source terminal 10aa that has sent the login request as a search key, and acquires the operating state of the request source terminal 10aa (step S30).

Subsequently, the transmitting/receiving unit 51 transmits destination state information containing the terminal ID "01aa" and the operating state "ONLINE" of the request source terminal 10aa acquired at step S30 to the terminals (10ba, 10db) the operating states of which are presented as "ONLINE" in the terminal management table 5003T (FIG. 9) among the terminals (10ab, 10ba, 10db) corresponding to the terminal IDs ("01ab", "01ba", "01db") extracted at step S29 (steps S31-1 and S31-2). Note that, when the transmitting/receiving unit 51 transmits the state information to the terminals (10ba, 10db), the transmitting/receiving unit 51 refers to the IP addresses of the terminals managed in the terminal management table 5003T (FIG. 9) based on the terminal IDs ("01ba", "01db"). Thus, the terminal ID "01aa" and the operating state "ONLINE" of the request source terminal 10aa may be transmitted to each of the other destination terminals (10db, 10ba) as the terminals capable of communicating with the request source terminal 10aa that has sent the login request.

In a similar manner as step S21, when a user of another terminal 10 switches ON the power switch 109 (FIG. 2), the operation input receiving unit 12 (FIG. 4B) receives a power-ON signal to switch ON the power of the other terminal 10, and the processes similar to the steps S22 through S31-1, 31-2 are subsequently performed. Thus, the description of the steps S22 through S31-1, 31-2 is omitted.

Next, with reference to FIG. 17, a process in which a transmission terminal establishes a session with another transmission terminal will be described. In this embodiment, the request source terminal 10aa is capable of communicating with at least one of the terminals 10ba and 10db the operating states of which are presented as "ONLINE" among the destination candidate terminals (10ab, 10ba, 10db) indicated by the destination state information received at step S28. In the following, a case where the user of the request source terminal 10aa selects the destination terminal 10db to initiate communication will be described.

Initially, when the user of the request source terminal 10aa presses the operation button 108 (FIG. 2) to select the terminal 10db, the operation input receiving unit 12 (FIG. 4B) receives the selection of the terminal 10db as the destination terminal (step S41). Next, the transmitting/receiving unit 11 of the terminal 10aa transmits start request information containing the terminal ID "01aa" of the request source terminal 10aa and the terminal ID "01db" of the destination terminal 10db and indicating the request for starting communication to the management system 50 (step S42). Thus, the transmitting/receiving unit 51 of the transmission management system 50 receives the start request information and detects the IP address "1.2.1.3" of the request source terminal 10aa that is a transmission source terminal.

Based on the terminal ID "01aa" of the request source terminal 10aa and the terminal ID "01db" of the destination terminal 10db contained in the received start request information, the state managing unit 53 changes the operating state fields of the records associated with the terminal IDs "01aa" and "01db" in the terminal management table 5003T (FIG. 9) of the terminal management DB 5003 to "BUSY", respectively (step S43). In this state, the request source terminal 10aa and the destination terminal 10db have not started communication but the operating states of these terminals are set to a busy state, and if other terminals 10 attempt to communicate with the request source terminal 10aa or the destination terminal 10db, a display or voice message indicating that the called terminal is in a busy state will be output.

The management system 50 generates a session ID used for execution of the session for selecting the relay device 30 (step S44). The session managing unit 57 stores the session ID "se1" generated at step S44, the terminal ID "01aa" of the request source terminal 10aa, and the terminal ID "01db" of the destination terminal 10db in the session management table 5005T (FIG. 11) of the session management DB 5005 in association with each other (step S45).

Although, after the step S45, the management system 50 performs processing of focusing the relay device 30 for relaying communication between the request source terminal 10aa and the destination terminal 10db based on the relay device management DB 5001 and the terminal management DB 5003, the processing performed by the management system 50 is not relevant to this embodiment and therefore the description thereof is omitted.

When the above processing is completed, the session managing unit 57 of the management system 50 stores the relay device ID "111a" of the finally selected relay device 30a in the relay device ID field of the record including the session ID "se1" in the session management table 5005T (FIG. 11) of the session management DB 5005 (step S67-1). The transmitting/receiving unit 51 transmits the IP address "1.3.2.4" of the destination terminal 10db and the relay device ID "111a" to the request source terminal 10aa (step S67-21).

The transmitting/receiving unit 51 of the management system 50 transmits relay start request information indicating a request for starting the relaying operation to the relay device 30a via the communication network 2 (step S68). The relay start request information contains the IP addresses ("1.2.1.3", "1.3.2.4") of the request source terminal 10aa and the destination terminal 10db, so that the relay device 30a may receive the IP addresses of the request source terminal 10aa and the destination terminal 10db for relaying the communication between the terminals 10aa and 10db. The relay device 30a establishes a session for communicating image data with three resolutions (low, medium and high resolutions) and voice data between the terminal 10aa and the terminal 10db (step S69). Thus, a videoconference between the terminals 10aa and 10db may be started. The image data with the three resolutions which are communicated between the terminals in this embodiment are an example. Alternatively, image data with four or more resolutions may be communicated between the terminals.

Each terminal 10 is capable of transmitting and receiving image data by using known moving image coding standard specifications, such as H.264 (H.264/AVC, MPEG4 part10, MPEG4 AVC), H.264/SVC, or MPEG2.

Next, a process performed, after the relay device 30 is determined, to transmit display data indicating an image displayed on the display 216 of the external input device 40 to another terminal 10, and display an image of the display data on the display 120 of the other terminal 10 will be described with reference to FIG. 18. In the following, a case where the display data indicating the image displayed on the external input device 40aa connected to the terminal 10aa are transmitted to and displayed on the destination terminal 10db will be described.

After the relay device 30 is determined as described above, the transmitting/receiving unit 11 of the terminal 10aa receives the IP address "1.3.2.4" of the destination terminal 10db and the relay device ID "111a" which are transmitted by the management system 50 at step S67-21. The store/read processing unit 19 of the terminal 10aa stores in the storage unit 1000 the relay device ID "111a" and the IP address "1.3.2.4" thus received (step S67-22).

When the external input device 40aa is connected to the terminal 10aa, the connection detecting unit 42 (FIG. 13) of the external input device 40aa detects the connection (step S70). When operation of the external input device 40aa is started, the display control unit 47 displays at least a screen including a whole area on the display 216.

After the connection detecting unit 42 detects the connection of the external input device 40aa and the terminal 10aa, the installation determining unit 43a determines whether the display data acquiring unit 451, the display data transmitting unit 452, and the resolution converting unit 453 are installed in the external input device 40aa (step S71). Specifically, the installation determining unit 43a determines whether the display data acquisition program 1451 (FIG. 4B), the display data transmission program 1452, and the resolution conversion program 1453 are installed in the external input device 40aa. When each program is installed, it is determined that the corresponding functional units are installed in the external input device 40aa.

On the other hand, when the installation determining unit 43a determines at step S71 that any of the display data acquiring unit 451, the display data transmitting unit 452 and the resolution converting unit 453 are not installed in the external input device 40*aa*, the mounting unit 48 mounts the storage unit 1000 of the terminal 10*aa* (step S72). Subsequently, the program acquiring unit 43*b* acquires and installs the program corresponding to the functional unit not installed in the external input device 40*aa*, from among the display data acquisition program 1451, the display data transmission program 1452, and the resolution conversion program 1453, stored in the storage unit 1000 of the terminal 10*aa* (step S73). As a result, the display data acquiring unit 451, the display data transmitting unit 452, and the resolution converting unit 453 are installed in the external input device 40*aa*. Alternatively, the display data acquisition program 1451, the display data transmission program 1452, and the resolution conversion program 1453 may be installed beforehand in the external input device 40*aa*.

After the processing of step S73 is completed, the transmitting/receiving unit 41 transmits information for requesting permission to execute the programs (i.e., permission to operate the display data acquiring unit 451, the display data transmitting unit 452, and the resolution converting unit 453) to the terminal 10*aa* (step S74). After the transmitting/receiving unit 41 receives information indicating the permission from the terminal 10*aa* in response to the request, the display data acquiring unit 451 acquires the display data indicating an image currently displayed on the display 216 (step S75).

Subsequently, the resolution converting unit 453 converts a first resolution of the display data acquired by the display data acquiring unit 451 into a second resolution, and the display data transmitting unit 452 transmits the display data with the second resolution to the external information transmitting/receiving unit 18 of the terminal 10*aa* (step S76). The process performed by the resolution converting unit 453 to convert the resolution of the display data will be described later. The process performed by the resolution converting unit 453 to convert the resolution of the display data differs from the process performed based on the operating state of the relay device 30 and the transmission speed between the terminal 10 and the relay device 30, and the conversion of the resolution of the display data does not depend on the operating state of the relay device 30 and the transmission speed between the terminal 10 and the relay device 30.

After the external information transmitting/receiving unit 18 of the request source terminal 10*aa* receives the display data from the external input device 40*aa*, the store/read processing unit 19 reads the IP address "1.3.2.4" of the destination terminal 10*db* and the relay device ID "111*a*" from the storage unit 1000 (step S77). The transmitting/receiving unit 11 transmits the display data with the converted resolution and the IP address "1.3.2.4" of the destination terminal 10*db* to the relay device 30 indicated by the relay device ID "111*a*" obtained at step S74 (step S78). After the display data and the IP address "1.3.2.4" sent by the terminal 10*aa* at step S78 are received, the relay device 30 changes the image quality of the display data based on the IP address "1.3.2.4" (step S79), and transmits the display data to the destination terminal 10*db* indicated by the IP address "1.3.2.4" (step S80).

After the transmitting/receiving unit 11 of the destination terminal 10*db* receives the display data from the relay device 30, the display control unit 14*b* displays the image indicated by the received display data on the display 120 (step S81).

FIG. 19 shows an example of the display data on the display 120 of the destination terminal 10*db*. In the example shown in FIG. 19, an image of display data D40*aa* on the display 216 of the external input device 40*aa* is displayed at a left portion of the display screen on the display 120, an image of display data D10*aa* obtained by the imaging unit 14*a* of the terminal 10*aa* and transmitted by the transmitting/receiving unit 11 is displayed at an upper right portion of the display screen on the display 120. Further, an image of display data D10*db* obtained by the imaging unit 14*a* of the terminal 10*db* is displayed at a lower right portion of the display screen on the display 120.

FIG. 20 is a diagram showing an example of a screen displayed on the display 216*aa* of the external input device 40*aa*, and screens displayed on the displays 120*aa*, 120*db* of the terminals 10*aa*, 10*db* in the overall transmission system 1. On the display 216*aa* of the external input device 40*aa*, the screen which the user of the terminal 10*aa* desires to share with the terminal 10*db* is displayed. In the following, the screens displayed on the displays 216*aa*, 216*db* of the external input devices 40*aa*, 40*db* will be called desktop screens. The desktop screen includes a whole area in which two or more areas may be arranged. In a certain case, a desktop screen including a whole area in which no area is arranged may be displayed. In FIG. 20, the desktop screen in which the whole area, including the area A and the area B, is displayed is illustrated as an example.

By performing the process of FIG. 18, when the terminal 10*aa* displays the image data and the display data on the display 120*aa*, the terminal 10*db* displays the image data and the display data on the display 120*db*. In the following, such a screen will be called a terminal screen. In the terminal screen in the middle portion of FIG. 20, an image of the whole area is displayed as the display data and images of users aa and db of the terminals 10*aa* and 10*db* are displayed as the image data. In the terminal screen of the lowermost portion of FIG. 20, an image of the area A is displayed as the display data and images of the users aa and db of the terminals 10*aa* and 10*db* are displayed as the image data.

Note that the whole area and the specific areas which the user db displays on the display 216*db* of the external input device 40*db* are displayed, and they are not affected by operation of the user aa. In this embodiment, the user may selectively display an arbitrary image of the whole area or the areas A and B on the display of the transmission terminal 10.

Embodiment 1

In this embodiment, the transmission system 1 in which the image of the whole area or arbitrary areas in the terminal screen may be selected and displayed when the user simply operates a pointing device (e.g., the mouse 212) of the external input device 40 will be described. In the following, the pointing device is implemented by the mouse 212. Alternatively, when a touch panel is utilized as the display 216, the pointing device may be implemented by a function to detect a position of a user's finger on the touch panel.

Figure 21A:
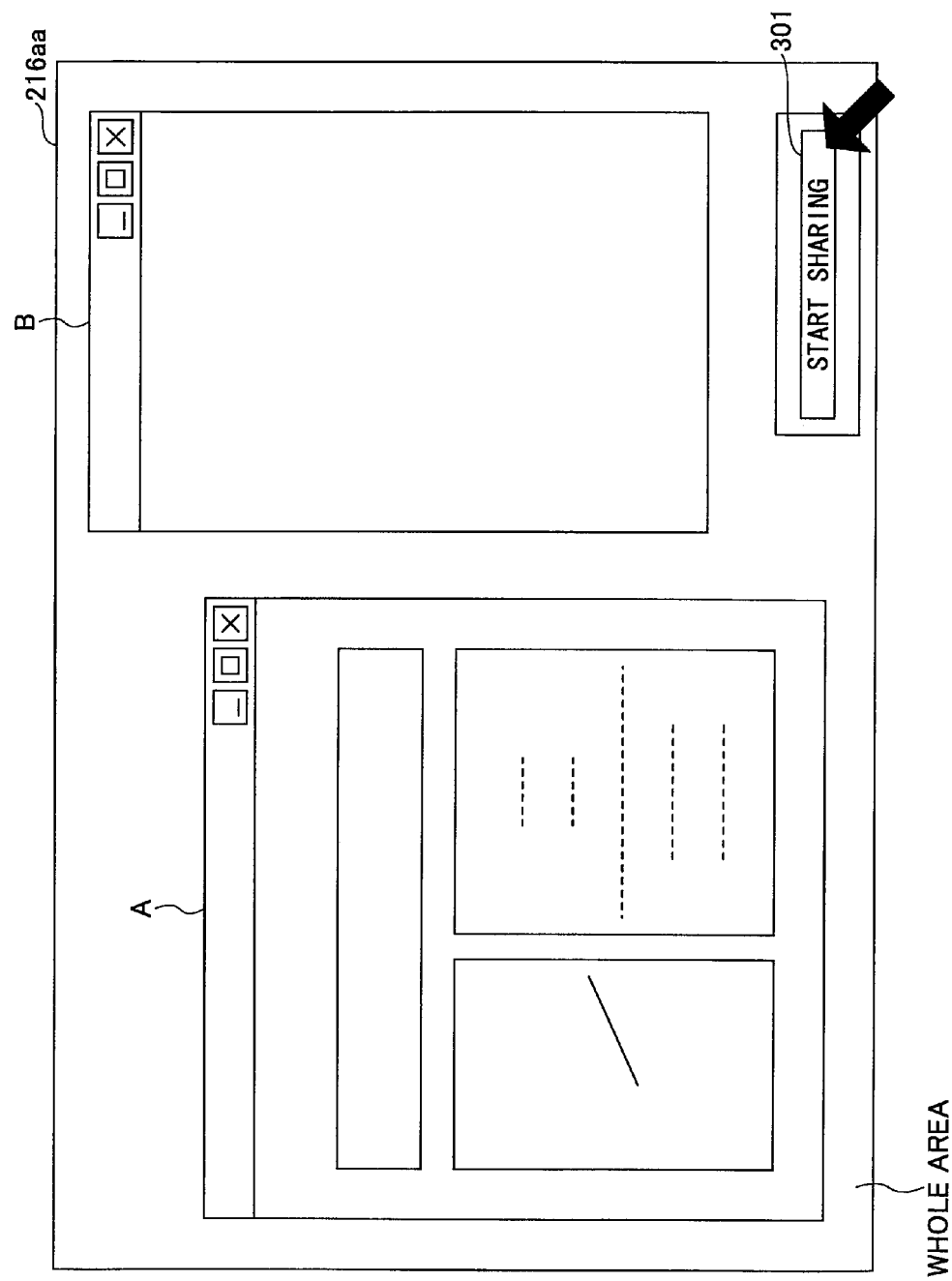
FIGS. 21A, 21B and 21C are diagrams showing an example of a desktop screen displayed on an external input device.

FIG. 21A is a diagram showing an example of a desktop screen currently displayed on the display 216*aa* of the external input device 40*aa*. The programs for the external input devices are installed in the external input device 40*aa*. For example, a share setting input button 301 is displayed at the lower right corner of the desktop screen by a predetermined operation performed by the user. For example, the predetermined operation may be to click or double-click an icon of the programs for the external input devices by the mouse, to place the mouse over the icon, etc.

Figure 21B:
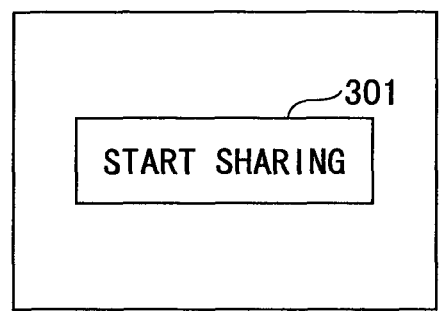
Figure 21C:
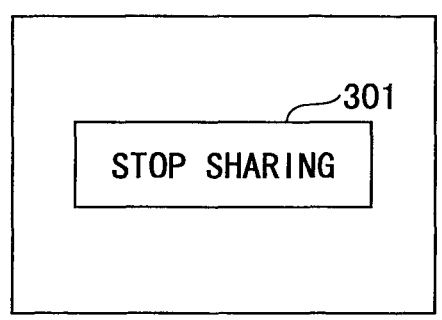

FIGS. 21B and 21C are diagrams showing examples of the share setting input button 301. Specifically, the share setting input button 301 displayed with the characters "start sharing" is shown in FIG. 21B, and the share setting input button 301 displayed with the characters "stop sharing" is shown in FIG. 21C.

If the user clicks the share setting input button 301 of FIG. 21B by the pointing device, sharing of the display data displayed on the display 216aa of the external input device 40aa is started. In the state where the display data displayed on the display 216aa of the external input device 40aa is shared, the share setting input button 301 of FIG. 21C is displayed. If the user clicks the share setting input button 301 of FIG. 21C by the pointing device, sharing the display data displayed on the display 216aa of the external input device 40aa with the terminal 10db is stopped. In this case, the display data are not transmitted to the terminal 10aa.

The operation input receiving unit 46 (FIG. 13) receives the user operation on the share setting input button 301. When the user clicks the share setting input button 301 displayed with "start sharing", the display data acquiring unit 451 acquires the display data corresponding to the area selected by the user.

In the transmission system 1 of this embodiment, the display data of the whole area or the specific area in the external input device 40 in which the share setting input button 301 displayed with "start sharing" clicked at the last are shared. Therefore, when the user db clicks the share setting input button 301 displayed with "start sharing" of FIG. 21B, sharing of the display data displayed on the display 216 of the external input device 40aa is automatically stopped even if the user aa does not click the share setting input button 301 with "stop sharing" of FIG. 21C.

[Operation Processes]

Figure 23:
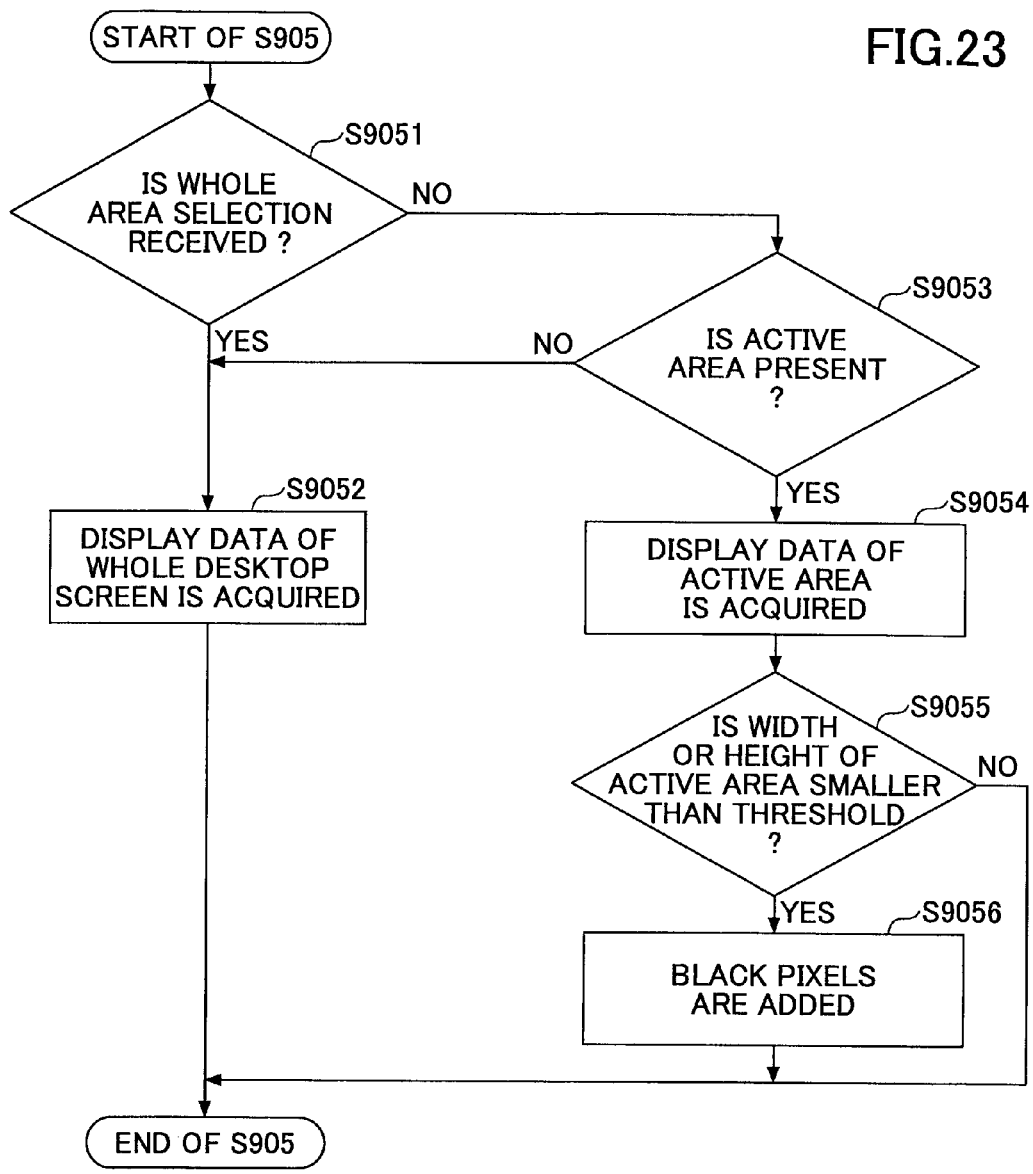
FIG. 23 is a flowchart for explaining a process in which a display data acquiring unit acquires whole area display data or specific area display data.
Figure 24:
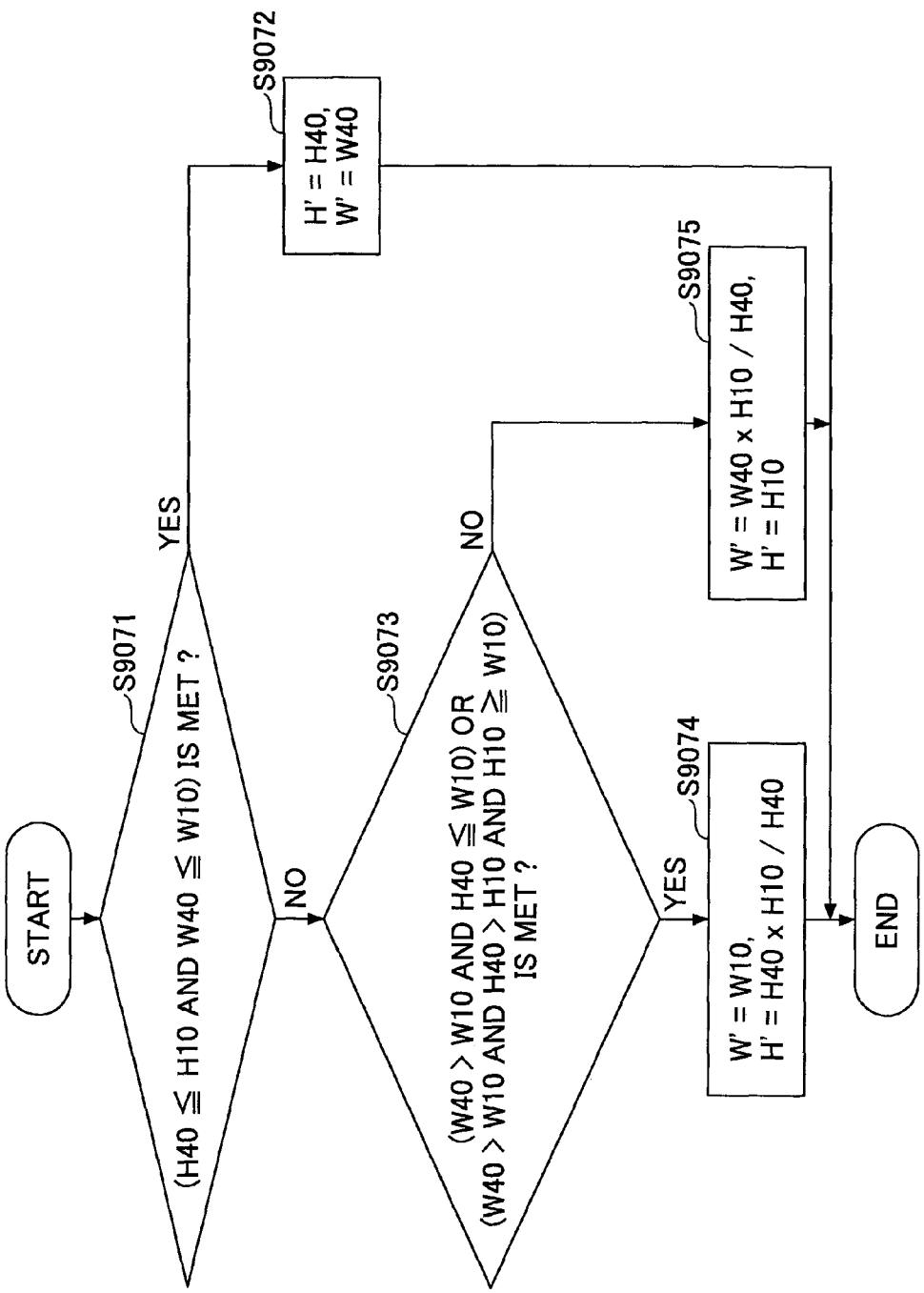
FIG. 24 is a flowchart for explaining a process to convert a resolution.
Figure 25A:
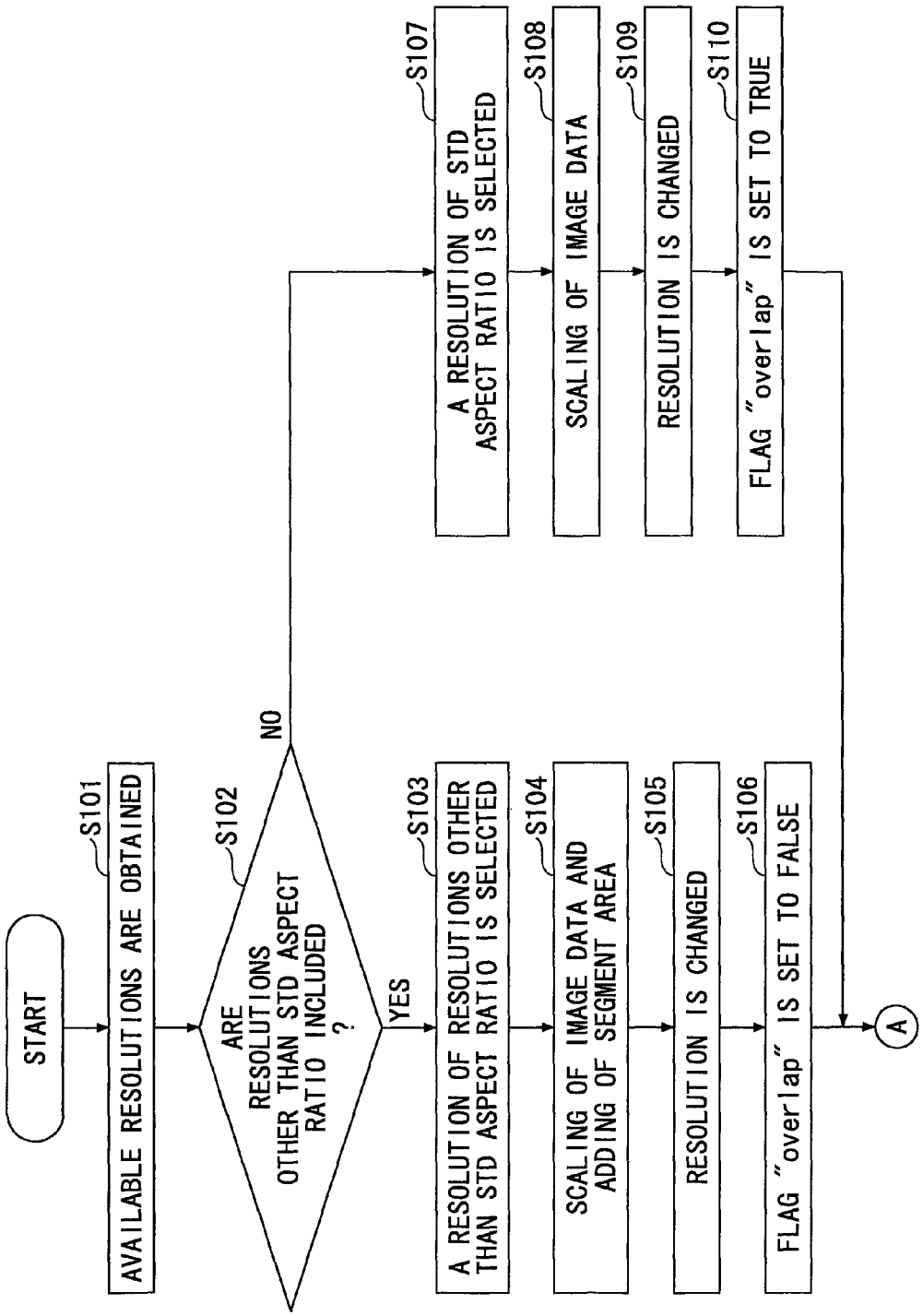
Figure 26A:
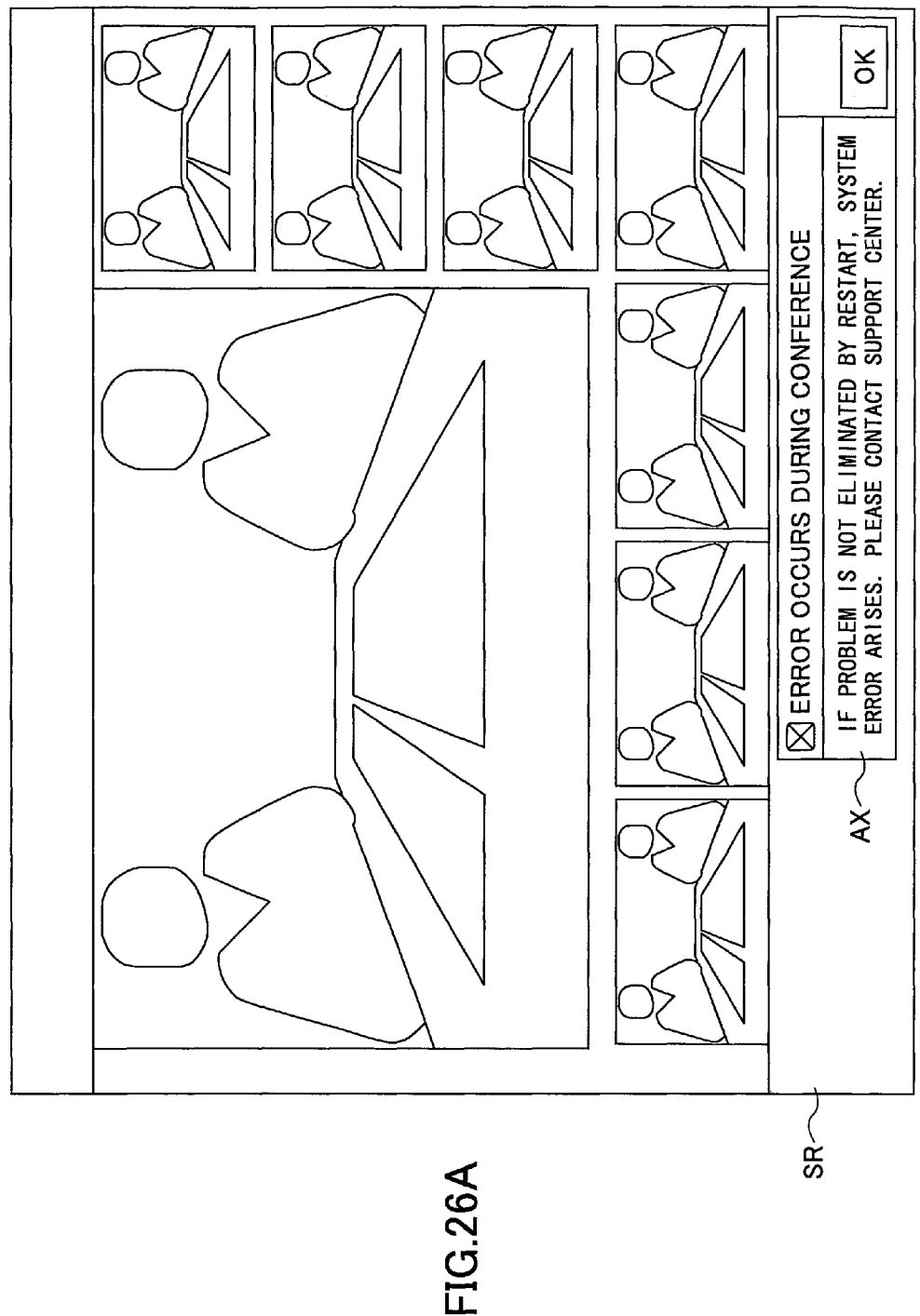
FIGS. 26A and 26B are diagrams for explaining a determination step at step S102 in the process of FIG. 25A.
Figure 26B:
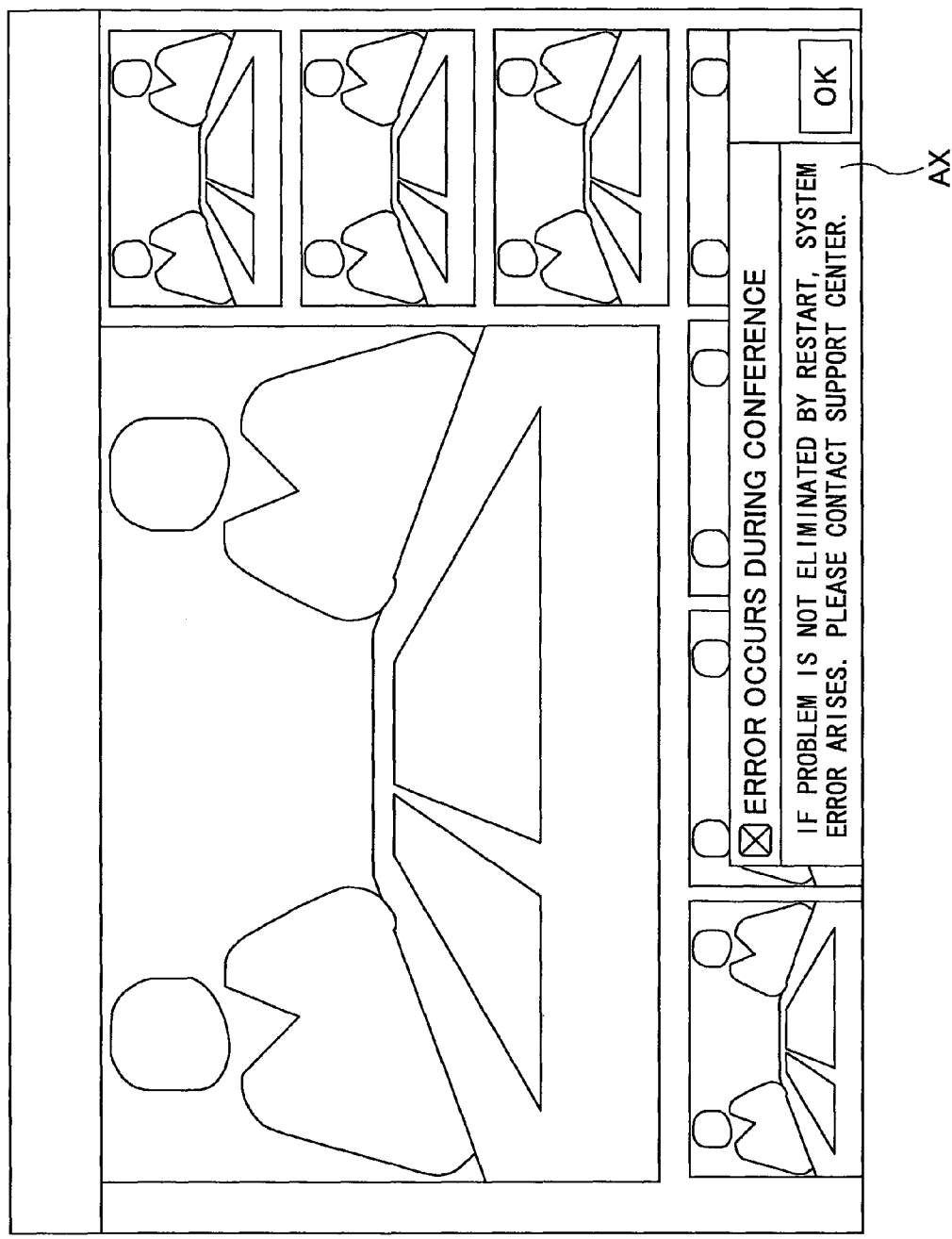

FIG. 22 is a sequence diagram for explaining a process of resolution conversion performed by the external input device 40 and resolution changing performed by the transmission terminal 10 when a non-compressed form is used. FIG. 23 is a flowchart for explaining a process in which the display data acquiring unit 451 acquires the whole area display data or the specific area display data. FIG. 24 is a flowchart for explaining a process to convert a resolution. FIGS. 25A and 25B are a flowchart for explaining a process performed by the terminal 10 to control the resolution control (including changing the resolution). FIGS. 26A and 26B are diagrams for explaining a determination step S102 in the process of FIG. 25A. FIG. 27 is a sequence diagram for explaining a process of resolution conversion by the external input device 40 and resolution changing by the terminal 10 when a compressed form is used.

Referring to the sequence diagram shown in FIG. 22, the process of resolution conversion of the display data to be transmitted to the terminal 10 by the external input device 40 based on the resolution of the display 120 of the terminal 10 and the resolution of the display 216 of the external input device 40. In the example of FIG. 22, a case where the display data are transmitted in a non-compressed form is described.

As shown in FIG. 22, first, the transmitting/receiving unit 41 of the external input device 40 transmits a request of resolution information regarding the display 120 to the terminal 10 (step S901). The resolution acquiring unit 21a of the terminal 10 acquires the resolution information indicating a resolution of the display 120 of the terminal 10 stored in the resolution storing unit 1005 (step S902). After the resolution acquiring unit 21a acquires the resolution information at step S902, the external information transmitting/receiving unit 18 transmits the acquired resolution information to the external input device 40 (step S903).

In the external input device 40, after the transmitting/receiving unit 41 receives the resolution information regarding the display 120 of the terminal 10, the store/read processing unit 49 stores the received resolution information in the resolution management table 4001T of the resolution management DB 4001 (step S904).

Note that, although the resolution information regarding the display 120 of the terminal 10 is acquired at step S902, it is preferred to give priority to a resolution according to a mode specified by a user and consider the resolution as the resolution information regarding the display 120. For example, the mode may include a current mode, a high mode (640×360), a medium mode (320×180), and a low mode (192×108). If it is detected that the transmission of the display data is overloaded, the user may promote the transmission of the display data by changing the mode suitably. Namely, when the bandwidth is narrow, the user may select the transmission of the display data with a lower resolution rather than the resolution of the display 120, so as to prevent the transmission of the display data from being overloaded.

Subsequently, the display data acquiring unit 451 of the external input device 40 acquires the display data indicating an image which is displayed on the display 216 by the display control unit 47 (step S905).

Referring to FIG. 23, the process of step S905 in which the display data acquiring unit 451 acquires the display data will be described. It is assumed that the share setting input button 301 shown in FIG. 21B is already clicked by the user aa.

In the process shown in FIG. 23, first, the operation input receiving unit 46 detects whether selection of the whole area is received (S9051). To select the whole area, the user aa clicks a portion other than a desktop screen area by the pointing device. The OS (operating system) detects a position of the clicked portion. In this embodiment, the OS which is operating on the external input device 40 treats each of the specific areas and the whole area as one area, and regards the clicking the portion other than the desktop screen area as selection of the whole area. Namely, the whole desktop screen is treated as one area (the whole area and the specific areas are treated separately). In the OS, an API (application programming interface) which enables selection of the whole area indicating the whole display screen (desktop screen) is defined. Therefore, when the user aa selects the whole area by the pointing device, the operation input receiving unit 46 may detect selection of the whole area through the API, so that the whole area may be shared as the display data. An intuitive switching operation may be performed by the user. According to a certain OS, the area may be referred to as an object (processing object), and the OS manages a position of the object and an attribute value of the object and detects whether the object is an operation target. Such areas and objects are equivalent to program components.

When the selection of the whole area is received (YES in S9051), the display data acquiring unit 451 acquires the display data of the whole desktop screen displayed on the display 216 (S9052), and the process of FIG. 23 is terminated.

When the selection of the whole area is not received (NO in S9051), the display data acquiring unit 451 determines whether an active area is present (S9053). For example, the function of the OS is used for this determination. In a case where the Windows® API is utilized, a handle of an active area is acquired, and if the value of the handle is not NULL, it is determined that an active area is present. The active area represents an area which is input by a user or currently set to an, operation target. In the case of Windows® or Mac® OS, the active area is called an active window.

When the user aa closes the active area and there is no active area (NO in S9053), the process progresses to step S9052. In step S9052, the display data acquiring unit 451 acquires the display data of the whole desktop screen. When the active area is present (YES in S9053), the display data acquiring unit 451 acquires the display data of the area which is active among the display data displayed on the display 216 by the display control unit (S9054). This area is specified by the handle of the active area acquired at step S9053, and the display data acquiring unit 451 may retrieve the display data of the area to be acquired.

Next, the display data acquiring unit 451 determines whether a width or a height of the area of the acquired display date is smaller than a threshold (S9055). It is assumed that the threshold for the width is equal to 128 pixels and the threshold for the height is equal to 36 pixels. This determination is made to prevent the processing load of a scaling process for resolution conversion from being increased. The display data of an area too small does not have meaningful content. By determining the minimum size of the area for scaling, the load of the CPU when the rendering of the display data is performed on the terminal 10aa may be reduced.

When the width or the height of the active area is smaller than the threshold (YES in S9055), black pixels are added to the display data by the display data acquiring unit 451 until the size of the current display data is equal to the threshold width×the threshold height (e.g., 128×36 pixels) (S9056), and the process of FIG. 23 is terminated.

The black pixels are arranged as follows. First, an area having a size of the threshold width by the threshold height is prepared, and the current display data are arranged so that the position of the upper left corner of the current display data is in agreement with the position of the upper left corner of the prepared area. The pixels within the area of the threshold width by the threshold height in which the current display data are not arranged are replaced with black pixels. Alternatively, the current display data may be arranged at any of other three corners (the lower left corner, the upper right corner, the lower right corner), or in the center position of the area of the threshold width by the threshold height. The pixels to be added may not be black pixels. Pixels of a different color may be added instead of black pixels.

Referring back to FIG. 22, the resolution acquiring unit 44 acquires the resolution information of the display 216 (step S906). The resolution converting unit 453 determines the resolution of the display data to be transmitted to the terminal 10, based on the resolution which is stored in the resolution management DB 4001 and indicated by the resolution information of the display 120 of the terminal 10 and the resolution which is indicated by the resolution information of the display 216 of the external input device 40 and acquired at step S906 (step S907).

Next, the resolution conversion process performed by the resolution converting unit 453 at step S907 will be described with reference to FIG. 24.

It is assumed that a resolution of a vertical direction (height (H) direction) and a resolution of a horizontal direction (width (W) direction) included in the resolution information of the display 216 of the external input device 40 acquired at step S906 are set to "H40" and "W40", respectively. Similarly, it is assumed that a resolution of the vertical direction (height (H) direction) and a resolution of the horizontal direction (width (W) direction) included in the resolution information of the display 120 of the terminal 10 stored in the resolution management DB 4001 are set to "H10" and "W10", respectively. Based on these resolutions H40, W40, H10 and W10, the resolution converting unit 453 determines a resolution "H'" of the vertical direction of the display data and a resolution "W'" of the horizontal direction of the display data.

In the process of FIG. 24, first, the resolution converting unit 453 determines whether the condition of (H40≤H10 and W40≤W10) is met (step S9071). When it is determined that the condition of (H40≤H10 and W40≤W10) is met (YES in step S9071), the resolution converting unit 453 determines the resolution H' of the vertical direction and the resolution W' of the horizontal direction of the display data as H'=H40 and W'=W40, respectively (step S9072). In this case, the resolution of the display data remains unchanged.

On the other hand, when the condition of (H40≤H10 and W40≤W10) is not met (NO in step S9071), the resolution converting unit 453 determines whether the condition of (W40>W10 and H40≤H10) or (W40>W10, H40>H10 and H10≥W10) is met (step S9073). When the condition of (W40>W10 and H40≤H10) or (W40>W10, H40>H10 and H10≥W10) is met (YES in step S9073), the resolution converting unit 453 determines the resolution W' of the horizontal direction and the resolution H' of the vertical direction of the display data as W'=W10, H'=H40*W10/W40, respectively (step S9074). W10/W40 represents a compression ratio of the width (W) direction.

On the other hand, when it is determined that the condition of (W40>W10 and H40≤H10) or (W40>W10, H40>H10, and H10≥W10) is not met (NO in step S9073), the resolution converting unit 453 determines the resolution W' of the horizontal direction and the resolution H' of the vertical direction of the display data as W'=W40*H10/H40 and H'=H10, respectively (step S9075). H10/H40 represents a compression ratio of the height (H) direction.

For example, in the case where it is determined at step S9073 that the condition of (W40>W10, H40>H10 and H10≥W10) is not met, the resolution of the vertical direction of the display 216 of the external input device 40 is greater than the resolution of the vertical direction of the display 120 of the terminal 10, and the resolution of the horizontal direction of the display 216 of the external input device 40 is equal to or smaller than the resolution of the horizontal direction of the display 120 of the terminal 10 (H40>H10 and W40≤W10). Or in the case where it is determined at step S9073 that the condition of (W40>W10, H40>H10 and H10≥W10) is not met, the resolution of the horizontal direction and the resolution of the vertical direction of the display 216 of the external input device 40 are greater than the resolution of the horizontal direction and the resolution of the vertical direction of the display 120 of the terminal 10, respectively, and the resolution of the vertical direction of the display 120 of the terminal 10 is smaller than the resolution of the horizontal direction thereof (W40>W10, H40>H10 and H10<W10).

Namely, when the resolution of the vertical direction of display 216 of the external input device 40 is smaller than the resolution of the vertical direction of the display 120 of the terminal 10, the resolution converting unit 453 at step S907 converts the resolution of the vertical direction of the display data into the resolution of the vertical direction of the display 120 of the terminal 10 (H'=H10). Further, the resolution converting unit 453 at step S907 converts the resolution of the horizontal direction of the display data such that an aspect ratio of the display data is equal to an aspect ratio of the resolution of the display 120 of the terminal 10 (W=W40*H10/H40).

When the resolution of the horizontal direction of the display 120 of the terminal 10 is smaller than the resolution of the horizontal direction of the display 216 of the external input device 40, the resolution converting unit 453 at step S907 converts the resolution of the horizontal direction of the display data into the resolution of the horizontal direction of the display 120 of the terminal 10 (W'=W10). Further, the resolution converting unit 453 at step S907 converts the resolution of the vertical direction of the display data such that an aspect ratio of the display data is equal to an aspect ratio of the display 120 of the terminal 10 (H'=H40*W10/W40).

Referring back to FIG. 22, after the resolution of the display data is converted by the resolution converting unit 453, the display data transmitting unit 452 transmits the display data with the converted resolution to the terminal 10 (step S908).

After the external information transmitting/receiving unit 18 of the terminal 10 receives the display data from the external input device (step S908), the display control unit 14b performs the rendering of the received display data and displays an image of the display data on the display 120 (step S909). The display image acquiring unit 14c acquires the data which indicate the image displayed on the display 120 by the display control unit 14b at step S909 (step S910). The transmitting/receiving unit 11 transmits the image data acquired by the image acquiring unit 14c to the relay device 30 (step S911).

When the display data with the unchanged resolution is received (in the case of S9072), the display control unit 47 performs the rendering of the received display data by changing the received resolution to the resolution used for the display data on the display 120, with the ratio of the width to the height of the display data maintained.

For example, when the full screen displaying of the display data is performed with the resolution of the display 120, the rendering of the display data is performed as follows.

$$Wr=Wt, Hr=Hs*Wt/Ws \text{ (if } Wt/Ws<Ht/Hs)$$

$$Hr=Ws*Ht/Hs, Hr=Ht \text{ (else)}$$

where Wr and Hr represent the width and the height after the rendering respectively, Ws and Hs represent the width and the height of the received display data respectively, and Wt and Ht the width and the height of the display respectively.

After the operation input receiving unit 12 receives the resolution information, the resolution changing unit 21d changes the resolution of the display 120 of the terminal 10 (step S912). This process of resolution changing is performed by a process of resolution changing of steps S105 S109, S117, S122 in the process of FIGS. 25A and 25B.

After the resolution is changed, the resolution acquiring unit 21a acquires the resolution information indicating the changed resolution (step S902). The external information transmitting/receiving unit 18 transmits the resolution information to the external input device 40 (step S903). After this, the process which is the same as the process performed at the above step S904 and subsequent steps is performed, and the explanation thereof is omitted.

Next, with reference to FIGS. 25A and 25B, the process of resolution control (including resolution changing) performed by the terminal 10 will be described.

As shown in FIG. 25A, when the process is started by reception of a power-ON signal in the terminal 10, the resolution acquiring unit 21a (FIG. 4B) accesses the display 120 to acquire available resolutions which can be displayed on the display 120 (step S101).

Subsequently, the resolution determining unit 21b determines whether resolutions other than a standard aspect ratio (e.g., 16:9, and its corresponding resolution: 1280×720) used for communication of the image data between the terminal 10 and the relay device 30 are included in the acquired resolutions which can be displayed on the display 120 (step S102). This determination is made because there may be a case where the user desires to select a resolution other than the standard aspect ratio, if possible, and add a segment area for presenting supplementary information. FIG. 26A shows an example of a screen in such a case. In the example shown in FIG. 26A, a segment area SR is added to the bottom of the screen, and supplementary information AX (including an error message and an operation button) is displayed in the segment area SR.

On the other hand, FIG. 26B shows another example. In the example shown in FIG. 26B, a segment area is not added but the supplementary information AX (including the error message and the operation button) is inserted in a bottom portion of the screen, and the screen with the inserted supplementary information AX is displayed.

When the resolutions other than the standard aspect ratio are included (YES in step S102), the resolution selecting unit 21c selects a resolution from among the resolutions other than the standard aspect ratio according to predetermined criteria (step S103). The predetermined criteria used at step S103 may select the highest resolution (or with the maximum width and the maximum height), to select a resolution corresponding to a specific aspect ratio (e.g., 8:5), to select a resolution suitable for a character size, the number of characters, etc. of the supplementary information, or to cause a user to define a specific resolution (e.g., WXGA (1280×800) or XGA (1024×768)) to be selected by the resolution selecting unit 21c. Any of the criteria may be used.

Subsequently, an image processing unit (not shown) which is provided as a function of the display control unit 14b adds a segment area and expands or contracts the image data internally generated at the standard aspect ratio to meet the selected resolution (step S104). Specifically, the image processing unit performs the following process. First, the image data before conversion are expanded or contracted symmetrically to be in agreement with the width after conversion. When the width before conversion is the same the width after conversion, expansion or contraction of the image data is not performed (expansion ratio or contraction ratio is set to 1). Next, a height of the image data after expansion or contraction is checked and a segment area is added to the image data after the expansion or contraction to meet the height after the expansion or contraction. In the example shown in FIG. 26A, the segment area SR is added to the bottom of the screen. Note that the location to which the segment area is added is not limited to the bottom of the screen. Alternatively, the segment area may be added to a top portion of the screen, or segment areas with a half height may be added to the top and bottom of the screen, respectively.

Subsequently, the resolution changing unit 21d changes the resolution of the display 120 to the selected resolution (step S105). As a result, the image of the display data is displayed on the display 120 with the changed resolution.

Subsequently, a flag setting unit (not shown) which is a function of the display control unit 14b sets the flag "overlap" to the value "false" (step S106). This flag "overlap" is accessed when the display control unit 14b detects an error and performs display control of supplementary information different from the currently displayed image data. The flag "overlap" is set to the value "true" when the supplementary information overlapping the image data is displayed (the case of FIG. 26B), and set to the value "false" when the supplementary information not overlapping the image data is displayed (the case of FIG. 26A).

On the other hand, when the resolutions other than the standard aspect ratio are not included (NO in step S102), the resolution selecting unit 21c selects a resolution of the standard aspect ratio according to predetermined criteria (step S107). The predetermined criteria are the same as those used at step S103.

Subsequently, an image processing unit (not shown) which is a function of the display control unit 14b expands or contracts the image data internally generated at the standard aspect ratio to meet the selected resolution (step S108). In this case, expansion or contraction of the image data at the same aspect ratio is performed, a blank area is not generated in both the width direction and the height direction of the image data, and a segment area is not added (see the example of FIG. 26B).

Subsequently, the resolution changing unit 21d changes the resolution of the display 120 to the selected resolution (step S109). As a result, the image of the display data is displayed on the display 120 with the changed resolution.

Subsequently, the flag setting unit (not shown) which is the function of the display control unit 14b sets the flag "overlap" to the value "true" (step S110).

The foregoing process shown in FIG. 25A is an initialization process performed upon receiving the power-ON signal in the terminal 10. After this, a loop process shown in FIG. 25B may be performed when the display 120 is exchanged after the reception of the power-ON signal.

As shown in FIG. 25B, the resolution acquiring unit 21a accesses the display 120 to acquire the currently used resolution of the display 120 (step S111). Subsequently, the resolution acquiring unit 21a accesses the display 120 to acquire the available resolutions which can be displayed on the display 120 (step S112).

Subsequently, the resolution determining unit 21b determines whether resolutions other than the standard aspect ratio (e.g., 16:9) used for communication of the image data between the terminal 10 and the relay device 30 are included in the acquired resolutions (step S113). When the resolutions other than the standard aspect ratio are included (YES in step S113), the resolution selecting unit 21c selects a resolution from among the resolutions other than the standard aspect ratio according to the predetermined criteria (step S114). The predetermined criteria are the same as those used at step S103.

Subsequently, the resolution determining unit 21b determines whether the currently used resolution is different from the selected resolution (step S115). When the currently used resolution is different from the selected resolution (YES in step S115), the image processing unit (not shown) which is a function of the display control unit 14b adds a segment area and expands or contracts the image data internally generated at the standard aspect ratio to meet the selected resolution (step S116).

Subsequently, the resolution changing unit 21d changes the resolution of the display 120 to the selected resolution (step S117). As a result, the image of the display data is displayed on the display 120 with the changed resolution.

Subsequently, the flag setting unit (not shown) which is a function of the display control unit 14b sets the flag "overlap" to the value "false" (step S118). On the other hand, when the currently used resolution is the same as the selected resolution (NO in step S115), the processing of steps S116-S118 is not performed. This is because the resolution changing is not required.

On the other hand, when the resolutions other than the standard aspect ratio are not included (NO in step S113), the resolution selecting unit 21c selects a resolution of the standard aspect ratio according to the predetermined criteria (step S119). The predetermined criteria are the same as those used at step S103.

Subsequently, the resolution determining unit 21b determines whether the currently used resolution is different from the selected resolution (step S120). When the currently used resolution is different from the selected resolution (YES in step S120), the image processing unit (not shown) which is a function of the display control unit 14b expands or contracts the image data internally generated at the standard aspect ratio to meet the selected resolution (step S121).

Subsequently, the resolution changing unit 21d changes the resolution of the display 120 to the selected resolution (step S122). As a result, the image of the display data is displayed on the display 120 with the changed resolution.

Subsequently, the flag setting unit (not shown) which is a function of the display control unit 14b sets the flag "overlap" to the value "true" (step S123).

On the other hand, when the currently used resolution is the same as the selected resolution (NO in step S120), the processing of steps S121-S123 is not performed. This is because the resolution changing is not required.

The foregoing process is repeatedly performed while the program is operating. Therefore, even if the display 120 is exchanged with another display 120 with a different resolution, the process of FIG. 25B is continuously performed. The repeated process is equivalent to a process to regularly monitor a change of the resolution of the display 120. This process may be performed by using the known event handling program in the programs of Windows®. In this case, the program may be registered upon starting the process, such that an event notification may be performed when a change of the resolution of the display 120 is detected due to the connection of the terminal 10 to another display 120. Thereafter, each time the notification of this event takes place, the process starting from step S111 of FIG. 25B may be performed by the display control unit 14b.

[Modification of Embodiment 1]

In the embodiment of FIG. 22, the case where the external input device 40 transmits the display data in a non-compressed form (a bitmap form) to the terminal 10 and the terminal 10 further transmits the display data in the non-compressed form to the relay device 30 has been described. The invention is not limited to the transmission of the display data in the non-compressed form. Alternatively, the external input device 40 may be configured to transmit the display data in a compressed form, such as JPEG or GIF.

In the following, a process performed in a case of using a compressed form will be described with reference to FIG. 27. The flowchart shown in FIG. 27 differ from the flowchart shown in FIG. 22 in that processing (steps S907-A, S908-A, S910-A) related to compression of display data and decompression of the display data is added. Other steps in the process of FIG. 27 different from the newly added steps are essentially the same as corresponding steps in the process of FIG. 22, and the explanation thereof is omitted.

In the process of FIG. 27, after the resolution converting unit 453 of the external input device 40 performs resolution conversion of the display data at step S907, the display data acquiring unit 451 performs compression (encoding) processing of the display data (step S907-A). In this embodiment, the display data acquiring unit 451 performs the compression processing.

In the terminal 10, after the external information transmitting/receiving unit 18 receives the compressed display data with the converted resolution from the external input device 40 at step S908, the display image acquiring unit 14c performs the decompression (decoding) of the compressed display data received (step S908-A). In this embodiment, the display image acquiring unit 14c performs the decompression of the compressed display data.

Subsequently, after the display control unit 14b performs the rendering of the display data after the decompression (decoding) and displays the image of the display data on the display 120 at step S909, the display image acquiring unit 14c acquires the display data indicating the image currently displayed on the display 120 (step S910). The acquired display data (in the non-compressed form) are provided to each of the resolution changing unit 21d and the display image acquiring unit 14c. The display image acquiring unit 14c performs predetermined compression (encoding) on the acquired display data (step S910-A). The transmitting/receiving unit 11 transmits the compressed display data obtained by the display image acquiring unit 14c to the relay device 30 via the communication network 2 at step S911.

The compressed display data are received by another transmission terminal 10 (FIG. 1) through the relay device 30. In the terminal 10 which has received the compressed display data, the display control unit 14b performs the decompression (decoding) of the compressed display data, performs the rendering of the display data, and displays the image of the display data on the display 120. Thus, the display data may be shared by the destination terminal 10 and the request source terminal 10.

On the other hand, the display data acquired by the display image acquiring unit 14c at step S910 are provided to the resolution changing unit 21d, and the resolution changing unit 21d performs the resolution changing at step S912. After this, the process which is the same as the process shown in FIG. 25A is performed, and the explanation thereof is omitted.

As described above, the display data which are transformed in the compressed form are transmitted from the external input device 40 to the terminals 10 through the relay device 30 (the source terminal 10→the relay device 30→the destination terminal 10), and the capacity of data transmission can be reduced to be smaller than that in the case (FIG. 22) where the display data in the non-compressed form (bitmap form) are used, and the communication load can be reduced.

As described above, in the transmission system according to the embodiment, if the whole area is selected by the mouse and the display data of the whole area can be shared with the terminal of a communication partner of a videoconference, and if the whole screen is not selected, the display data of the active area can be shared with the terminal of the communication partner of the videoconference. Therefore, one of the whole screen and some specific areas can be arbitrarily selected and the display data of the selected area can be shared by the terminals.

Embodiment 2

In this embodiment, the transmission system 1 in which the image of the whole area or arbitrary areas in the terminal screen may be selected and displayed when the user operates a viewing-area selection menu displayed on the display 216 of the external input device 40 will be described.

Figure 28A:
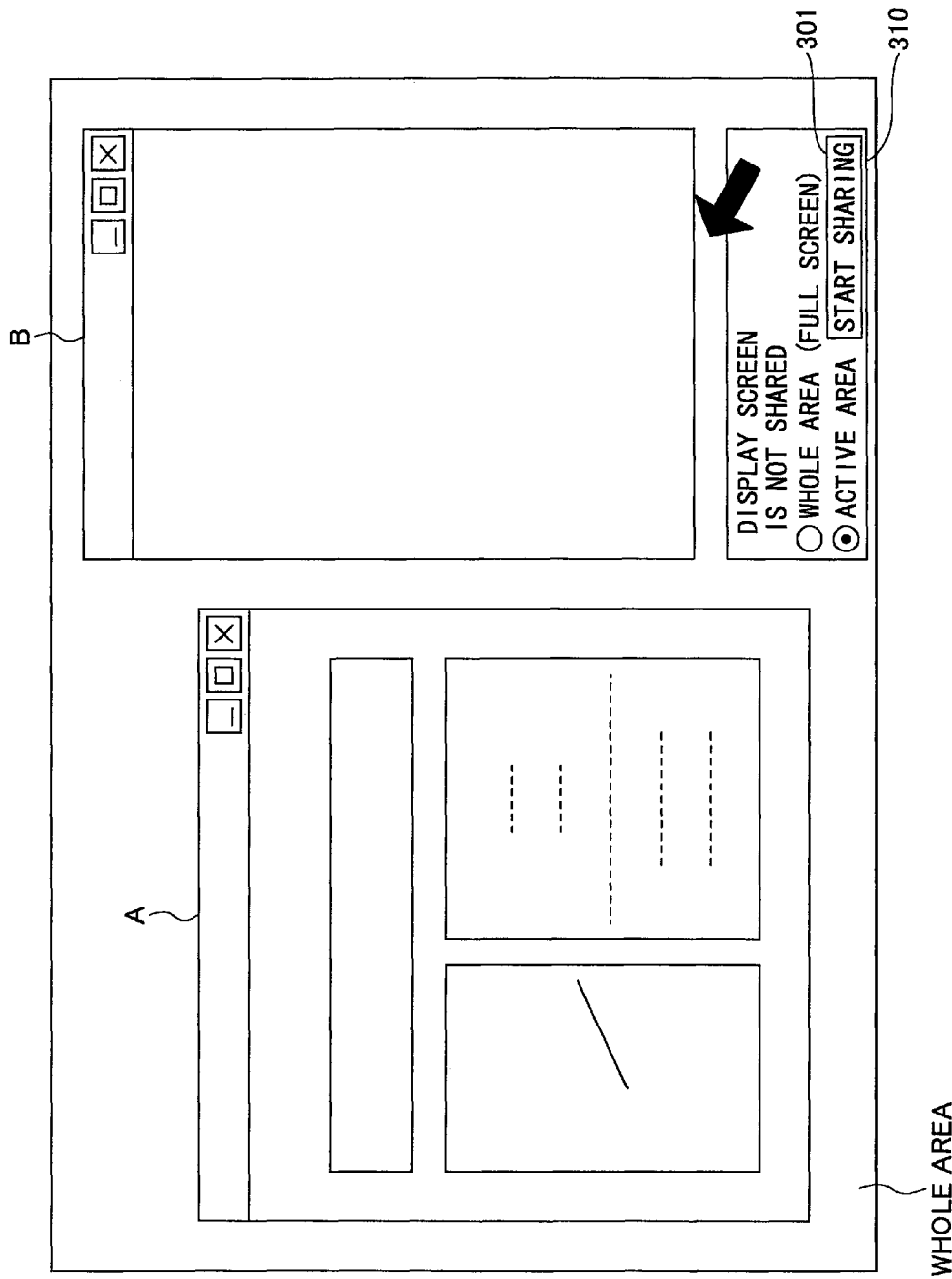

FIGS. 28A, 28B and 28C are diagrams showing an example of a desktop screen displayed on the external input device 40aa similar to FIGS. 21A, 21B and 21C of Embodiment 1. FIG. 28A shows an example of the desktop screen displayed on the display 216aa of the external input device 40aa. In the example of FIG. 28A, a viewing-area selection menu 310 (display data transmission permission menu) is displayed at a lower right corner of the desktop screen.

FIGS. 28B and 28C show examples of the viewing-area selection menu 310. Specifically, the share setting input button 301 displayed with the characters "start sharing" is shown in FIG. 28B, and the share setting input button 301 displayed with the characters "stop sharing" is shown in FIG. 28C. The function of the share setting input button 301 is the same as that of Embodiment 1.

As shown in FIGS. 28B and 28C, two radio buttons 302 and 303 are displayed in addition to the share setting input button 301. The radio button 302 is to select the "whole area (full screen)", and the radio button 303 is to select the "active area". The radio buttons 302 and 303 are provided for the user to select one of display data of the whole area and display data of the active area. When the user selects one of the radio buttons 302 and 303, the operation input receiving unit 46 receives the selection of the one of the radio buttons 302 and 303.

When the "start sharing" is selected by the share setting input button 301 (or when the display data are shared), the shared display data displayed on the display 120 of the terminal 10aa are alternately switched between the display data of the whole area and the display data of the active area each time one of the radio buttons 302 and 303 selected by the user is changed to the other.

When the "start sharing" is not selected by the share setting input button 301 (or when the display data are not shared), sharing of the display data of the selected one of the radio buttons 302 and 303 is started if the user clicks the share setting input button 301 "start sharing".

The operation processes of this embodiment are essentially the same as those of FIGS. 22-30 of Embodiment 1 except for the process of the display data acquiring unit of this embodiment partially differing from the process of FIG. 23 of Embodiment 1. FIG. 29 is a flowchart for explaining the process in which the display data acquiring unit 451 acquires display data.

In the process shown in FIG. 29, the operation input receiving unit 46 detects whether the user has selected the whole area by the radio button 302 (S9051-2).

When the user has selected the whole area by the radio button 302 (YES in S9051-2), the display data acquiring unit 451 acquires the display data of the whole desktop screen displayed on the display 216 as the display data to be transmitted to the terminal 10 (S9052), and the process of FIG. 29 is terminated.

When the user has not selected the whole area by the radio button 302 (NO in S9051-2) (i.e., when the user has selected an active area by the radio button 303), the display data acquiring unit 451 determines whether the active area is present (S9053). The determination method may be the same as that of Embodiment 1.

When the user aa closes the active area and there is no active area (NO in S9053), the process progresses to step S9052. In step S9052, the display data acquiring unit 451 acquires the display data of the whole desktop screen. When the active area is present (YES in S9053), the display data acquiring unit 451 acquires the display data of the area which is active among the display data displayed on the display 216 by the display control unit (S9054). Subsequent steps in the process of FIG. 29 may be the same as corresponding steps of Embodiment 1.

According to this embodiment, even when the OS does not support treating the whole desktop screen as one area, the user is enabled to select the whole area by using the viewing-area selection menu 310.

Embodiment 3

In Embodiments 1 and 2, when the display data acquiring unit 451 acquires the display data of the whole area or the active area, there is a problem in that a mouse cursor is not displayed on the display 216.

This problem may arise in a case where a Print Screen button of the keyboard is used in acquiring the display data. The mouse cursor is not incorporated even if the Print Screen button is pressed. For this reason, it is preferred to configure the display data acquiring unit 451 to incorporate the mouse cursor in the display data, when the mouse cursor points to the whole area or the active area.

Figure 30A:
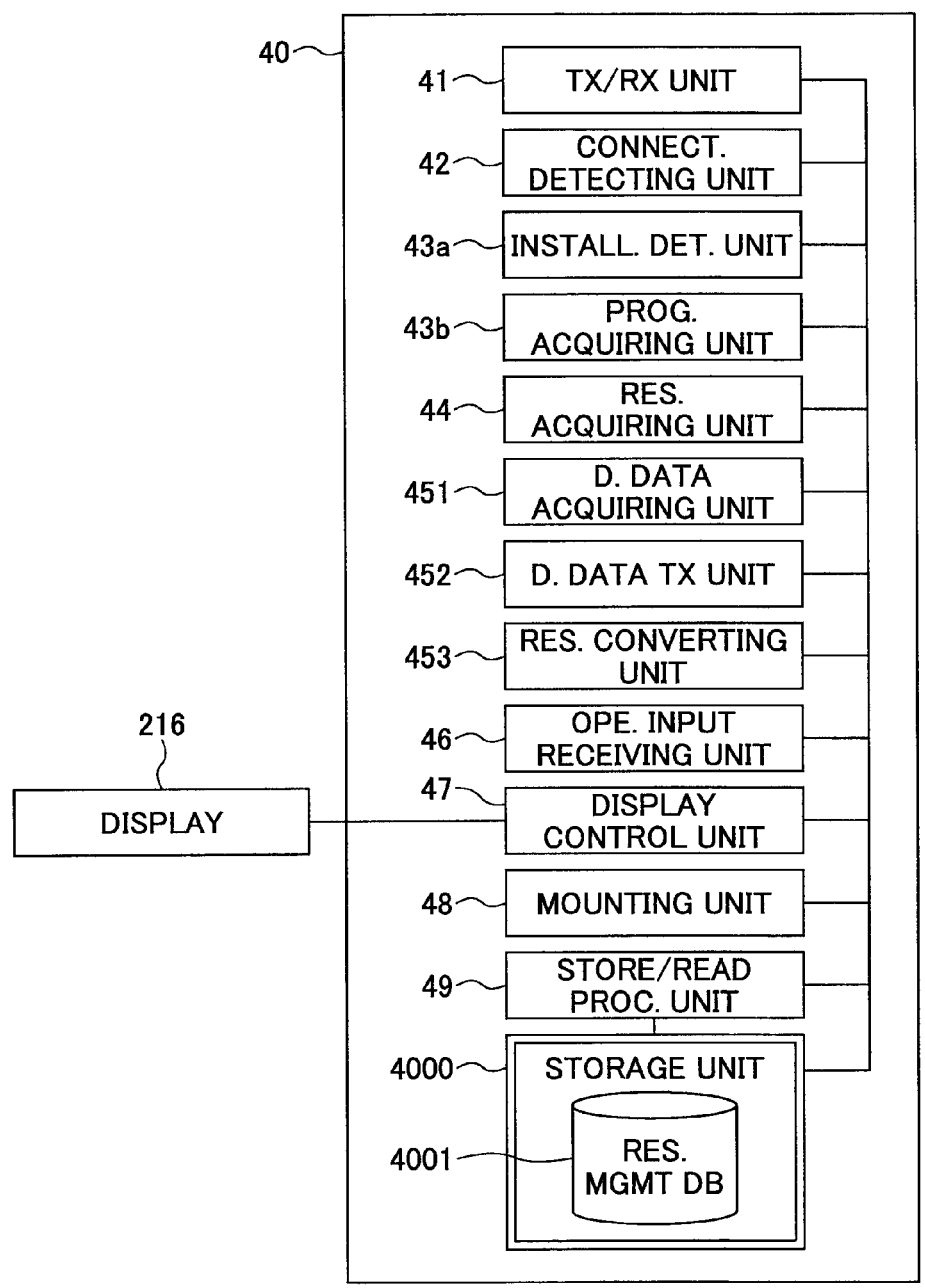
FIGS. 30A and 30B are block diagrams showing the functional configuration of an external input device.
Figure 30B:
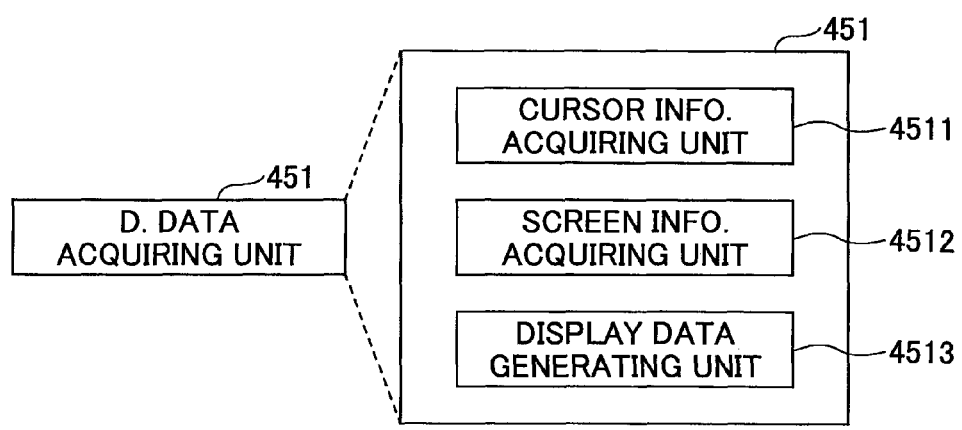

FIG. 30A is a block diagram showing the functional configuration of the external input device of this embodiment. The functional configuration of FIG. 30A is similar to that of FIG. 13. FIG. 30B is a block diagram showing the functional configuration of the display data acquiring unit 451 of this embodiment.

As shown in FIG. 30B, the display data acquiring unit 451 includes a cursor information acquiring unit 4511, a screen information acquiring unit 4512, and a display data generating unit 4513. The screen information acquiring unit 4512 is configured to acquire the display data displayed on the display 216 of the external input device 40. The cursor information acquiring unit 4511 acquires cursor information including a position of the mouse cursor, an icon of the mouse cursor, etc. The cursor information may include coordinate data of the mouse cursor in the screen and an icon of the mouse cursor. The coordinate data of the mouse cursor may be acquired by querying the OS by a predetermined command. Similarly, the icon of the mouse cursor may be acquired from the OS. Alternatively, a known icon of the mouse cursor may be included beforehand as image data.

The display data generating unit 4513 is configured to incorporate the mouse cursor icon in the display data. Because the external input device 40 transmits the display data to the terminal 10, the user may detect the position where the mouse cursor specifies the display data in the screen.

The method for incorporating the mouse cursor icon differs for a case where the whole area is designated as the display data and a case where the active area is designated as the display data.

Figure 31:
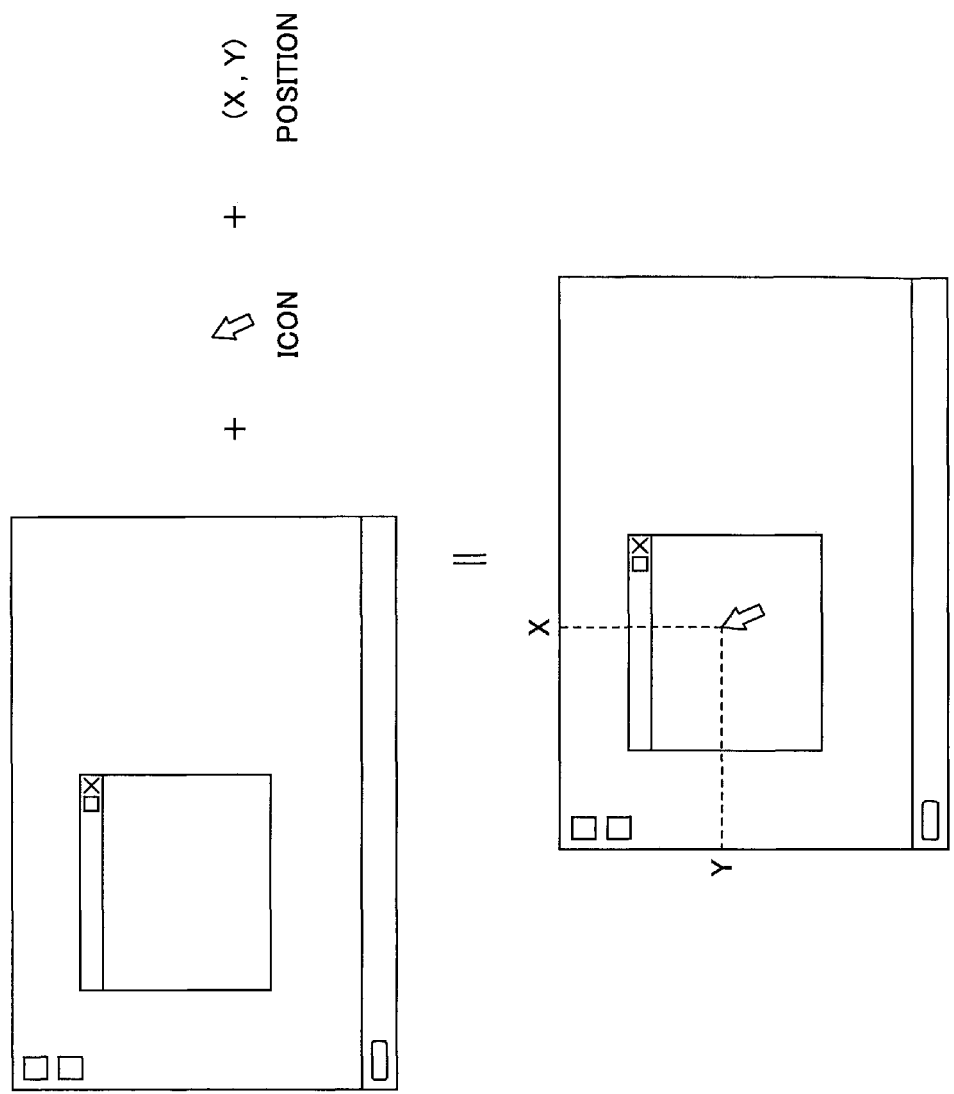
FIG. 31 is a diagram showing an example in which a mouse cursor icon is incorporated in display data.

The case where the whole area is designated as the display data will be described with reference to FIG. 31. FIG. 31 is a diagram showing an example in which the mouse cursor icon is incorporated in the display data. As shown in FIG. 31, the display data indicate the whole screen displayed on the display 216aa of the external input device 40aa. The mouse cursor may move in the whole desktop screen.

The cursor information acquiring unit 4511 acquires the mouse cursor icon and the coordinate data of the mouse cursor. The coordinate data are expressed by an orthogonal coordinate system and indicate a two-dimensional position of the mouse cursor on a pixel-by-pixel basis with the origin at the upper left corner of the screen.

Therefore, the display data generating unit 4513 may incorporate the mouse cursor in the display data by placing the mouse cursor pointer at the position of the display data indicated by the coordinate data. Incorporating the mouse cursor may include placing the mouse cursor icon in the display data and generating the display data (in which the pixel values of the overlapping pixels are included).

Figure 32:
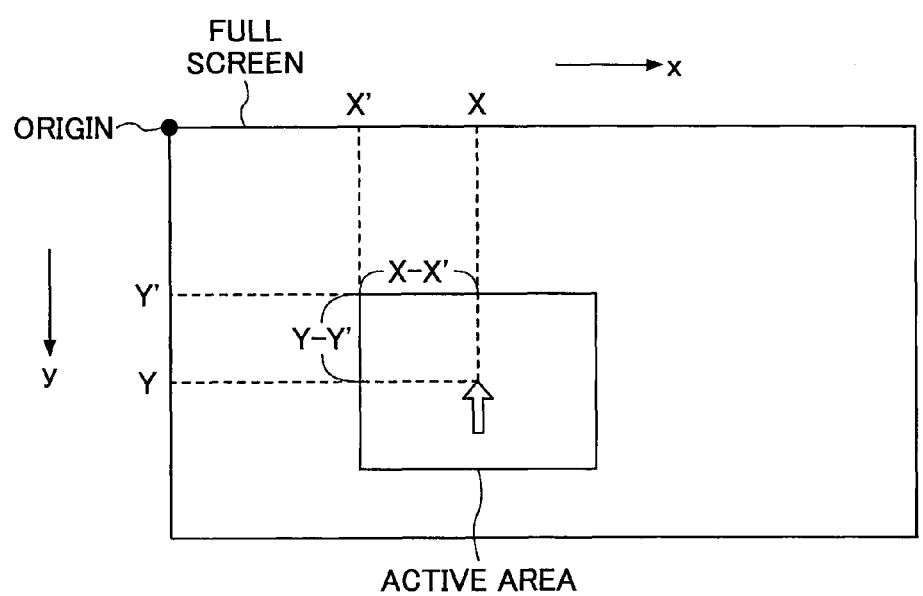
FIG. 32 is a diagram for explaining incorporation of a mouse cursor icon in display data.

The case where the active area is designated as the display data will be described with reference to FIG. 32. FIG. 32 is a diagram showing an example in which the mouse cursor icon is incorporated in the display data. As shown in FIG. 32, the coordinates (X, Y) of the mouse cursor are coordinates when the upper left corner of the desktop screen is regarded as the origin, and the active area is an area of the desktop screen. For this reason, if the mouse cursor icon is incorporated in the display data of the active area at coordinates (X, Y), the icon is located at a position on the basis of the coordinates (X', Y') of the upper left corner of the active area, and the position of the mouse cursor icon in the display data will change.

To avoid the problem, when the active area is designated as the display data, the cursor information acquiring unit 4511 is configured to compensate the coordinate data of the mouse cursor as follows.

$$X=X-X'$$

$$Y=Y-Y'$$

After the compensation of the coordinates is performed in this manner, the relative position of the mouse cursor icon to the display data is maintained and the mouse cursor icon may be suitably incorporated in the display data.

Figure 33:
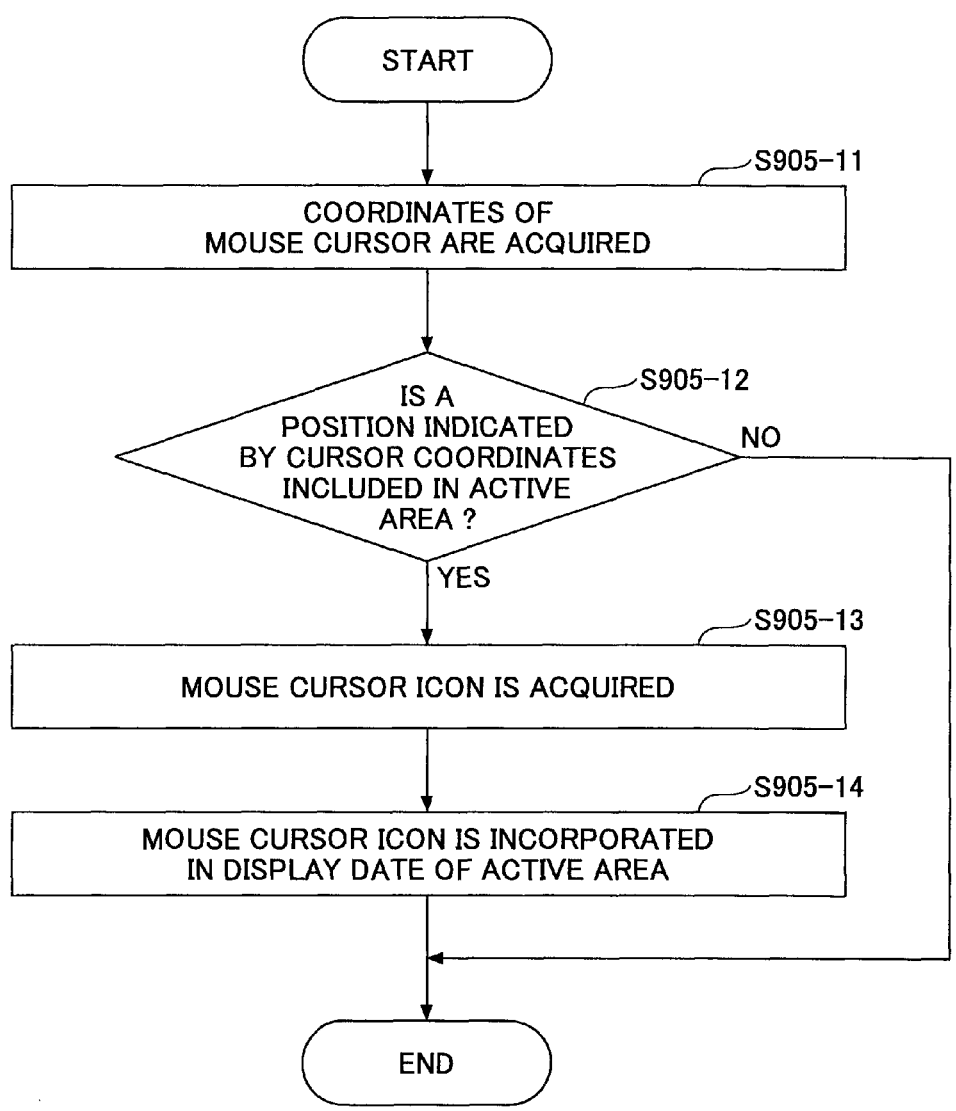
FIG. 33 is a flowchart for explaining a process in which a display data acquiring unit incorporates a mouse cursor icon in display data.

FIG. 33 is a flowchart for explaining a process in which the display data acquiring unit 451 incorporates the mouse cursor icon in the display data. The process of FIG. 33 is performed at step S905 in the process of FIG. 22 after the process of acquisition of the display data in Embodiment 1 or Embodiment 2 is performed. In FIG. 33, it is assumed that the display data of the active area are selected.

In the process of FIG. 33, first, the cursor information acquiring unit 4511 acquires the coordinate data of the mouse cursor (S905-11). When the display data of the whole area are selected, the mouse cursor icon may be incorporated in the display data after this step.

The cursor information acquiring unit 4511 determines whether a position indicated by the coordinate data acquired at step S905-11 is included in the active area (S905-12).

When the mouse cursor position is not included in the active area (NO in S905-12), it is not necessary to incorporate the mouse cursor icon. The process of FIG. 33 is terminated without incorporating the mouse cursor icon in the display data of the active area by the display data generating unit 4513.

When the mouse cursor position is included in the active area (YES in S905-12), the display data generating unit 4513 acquires the mouse cursor icon (S905-13).

Subsequently, the display data generating unit 4513 incorporates the mouse cursor icon acquired at step S905-13 in the display data of the active area (S905-14), and the process of FIG. 33 is terminated. The display data generating unit 4513 accesses the coordinate data (X, Y) of the mouse cursor pointer and the coordinate (X', Y') of the upper left corner of the active area. On the basis of the origin at the upper left corner of the display data in which only the image of the active area is incorporated, the mouse cursor icon is incorporated in the display data at the position of ((X−X'), (Y−Y')).

As described above, even in the case where the display data of the active area are shared, the mouse cursor can be correctly displayed on the display 120 of the terminal 10db by changing the position of the mouse cursor icon from that in the case where the display data of the whole area are shared.

In the process of FIG. 33, the display data of the active area are selected. Alternatively, the compensation process may be performed when the display data of the active area are selected, and when the display data of the whole area are selected, the coordinates (X', Y') of the upper left corner of the active area may be set to X'=0 and Y'=0.

Embodiment 4

As described above, in Embodiment 1, the terminal 10aa in which, when the user selects the specific area on the external input device 40 by the mouse, the display data of the active area are shared with the terminal 10db used by a communication partner of a videoconference has been explained.

Similarly, in Embodiment 2, the terminal 10aa in which, when the user selects the radio button 303 in the viewing-area selection menu 310 of the external input device 40, the display data of the active area are shared with the terminal 10db used by the communication partner of the videoconference has been explained.

Although the active area can be easily changed by operation of the user, there may be a case where an area which is not suitable as a shared object is designated as the active area.

Figure 34A:
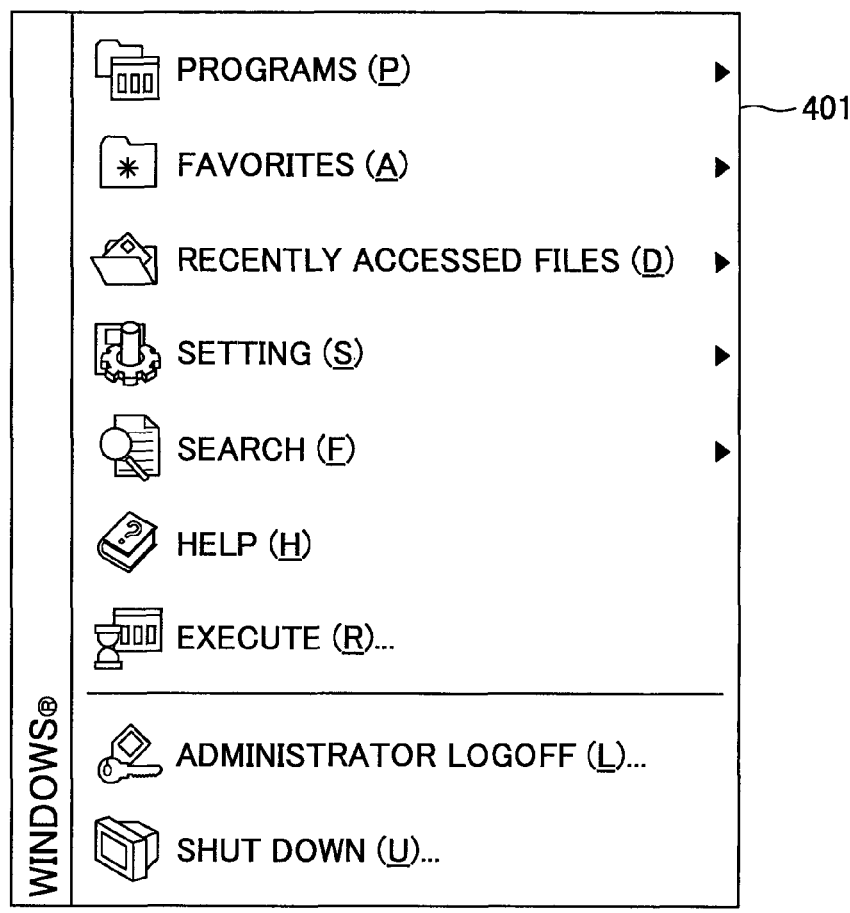
FIGS. 34A, 34B and 34C are diagrams showing examples of areas (windows) which are not to be shared in Windows®.
Figure 34B:
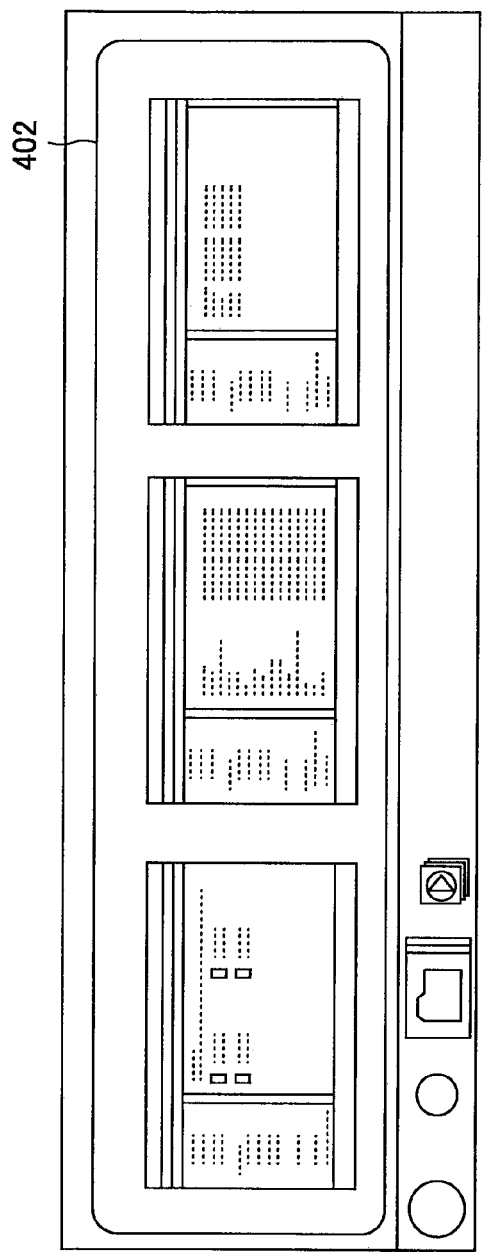
Figure 34C:
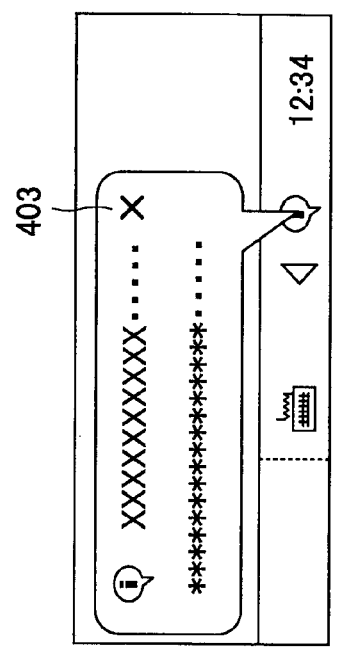

FIGS. 34A, 34B and 34C are diagrams showing examples of areas (windows) which are not be shared in Windows®. FIG. 34A shows an area called BaseBar 401 which is displayed when a start button is clicked. The user can select arbitrary one of items in the displayed menu.

In Windows®, this area is also treated as a window. Therefore, the BaseBar area is designated as an active area. For this reason, the display data of the BaseBar area are shared by the terminals 10aa and 10db. However, the display data of the BaseBar area have little information which is to be shared, and therefore the display data of such an area should not be shared.

FIG. 34B shows an example of a thumbnail indication area 402 of a file management application which is displayed when the icon of the application is pointed to by the mouse. In the example of FIG. 34B, three thumbnail screens generated by the file management application are displayed. The thumbnail indication area 402 in which the three thumbnails are displayed may become the active area. When the user selects one of the thumbnails, the screen generated by the file management application is displayed on the display 216 as the active area. Thus, the thumbnail indication area is recognized as the active area when the user of the external input device 40aa points to the icon of the task bar by the mouse. Although the thumbnail indication area is shared by the terminals 10aa and 10db, the thumbnail indication area has little information which is to be shared, and therefore the display data of such an area should not be shared.

FIG. 34C shows an example of a pop-up area 403 which is generated by a tool tip function. Similar to the thumbnail indication area of FIG. 34B, when the user points to the icon in which the tool tip function is embedded, the pop-up area 403 is displayed. The pop-up area may become the active area. Although the pop-up area is shared by the terminals 10aa and 10db, the pop-up area has little information which is to be shared, and therefore the display data of such an area should not be shared.

In all the examples of FIGS. 34A-34C, the display data of active areas may be shared against the user's intention.

In Embodiment 4, the external input device 40aa in which, even if a predetermined area is designated as an active area, the display data of the predetermined area displayed on the display 216aa are not acquired will be described. The external input device 40aa does not acquire the display data of the predetermined area even if the predetermined area is designated as the active area, and the terminals 10aa and 10db do not share the display data.

Figure 35:
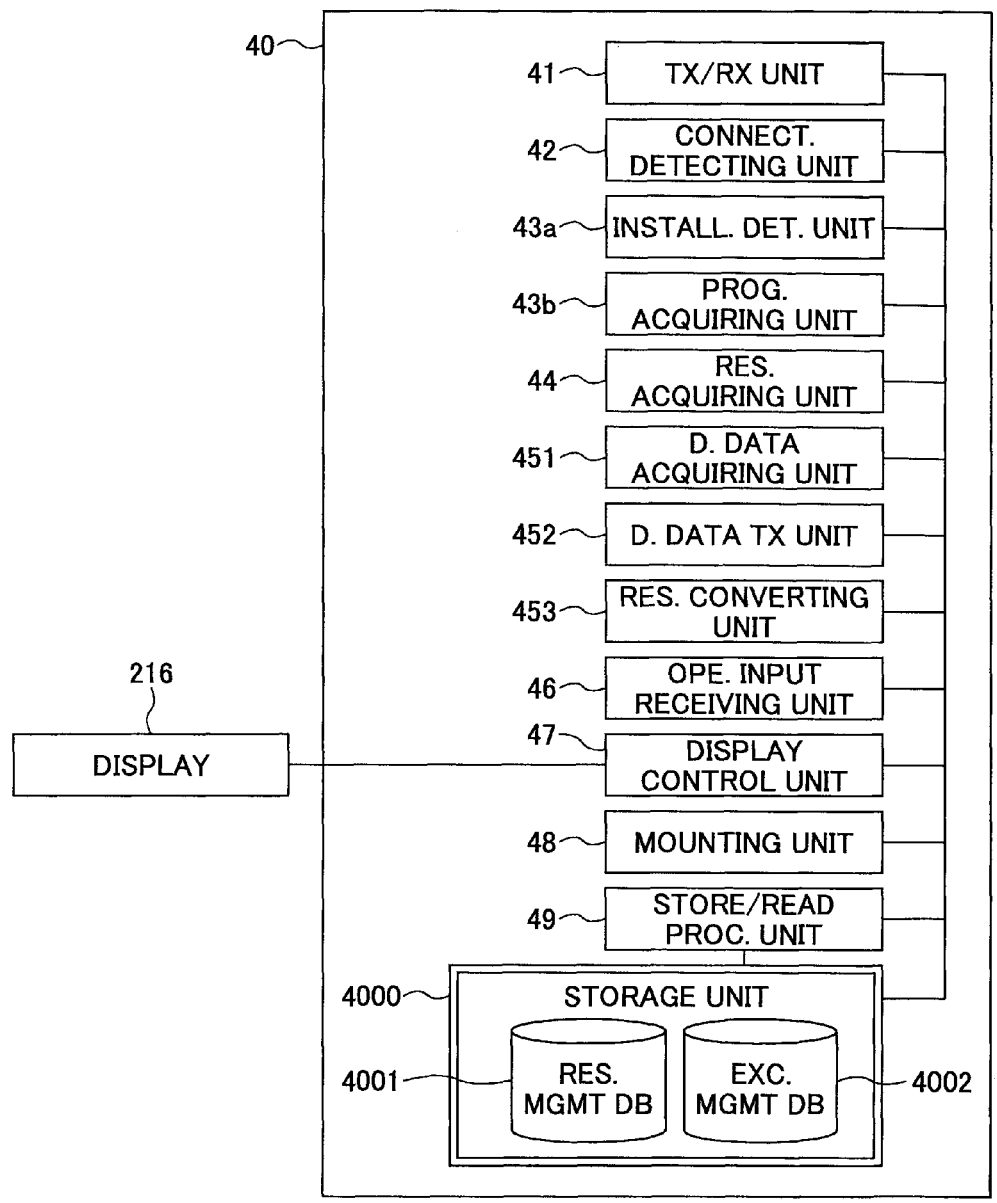
FIG. 35 is a block diagram showing the functional configuration of an external input device.
Figure 36:
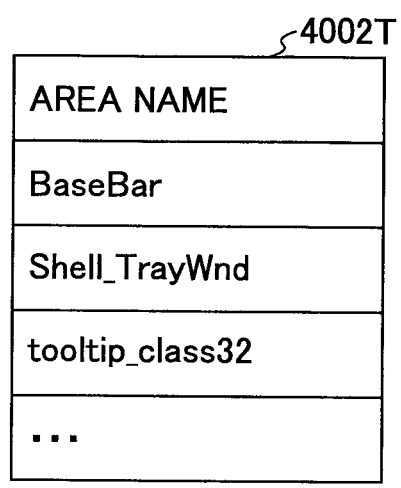
FIG. 36 is a diagram showing an example of an exception management table.

FIG. 35 is a block diagram showing the functional configuration of the external input device 40, and FIG. 36 is a diagram showing an example of an exception management table 4002T.

An exception management DB 4002 is implemented by the storage unit 4000 and the exception management table 4002T as shown in FIG. 36 is stored in this exception management DB 4002. In the exception management table 4002T, area names (window names) of predetermined areas the display data of which are not acquired even when the predetermined areas are designated as the active area are registered. The exception management table 4002T is stored in the storage unit 1000 of the terminal 10 and installed in the external input device 40 together with a display data acquisition program 1451.

When the Windows® API is utilized, an active area is notified as a class name from the OS. In addition, the area names of the areas shown in FIGS. 34A-34C are also uniquely determined by the OS. Thus, a software developer may predetermine the areas the display data of which are not to be acquired even if the predetermined areas are designated as the active are, and register the predetermined areas in the exception management table 4002T. For example, the area name of the area 401 of FIG. 34A is BaseBar, the area name of the area 402 of FIG. 34B is Shell_TrayWnd, and the area name of the area 403 of FIG. 34C is tooltip_class32.

Alternatively, identification information to uniquely identify the area may be registered in the exception management table 4002T instead of the area name. For example, each area has not only an area name but also a number (which may include numeric values and signs) which is assigned by the manufacturer of the OS. Thus, each area may also be identified by this number as the identification information.

Figure 37:
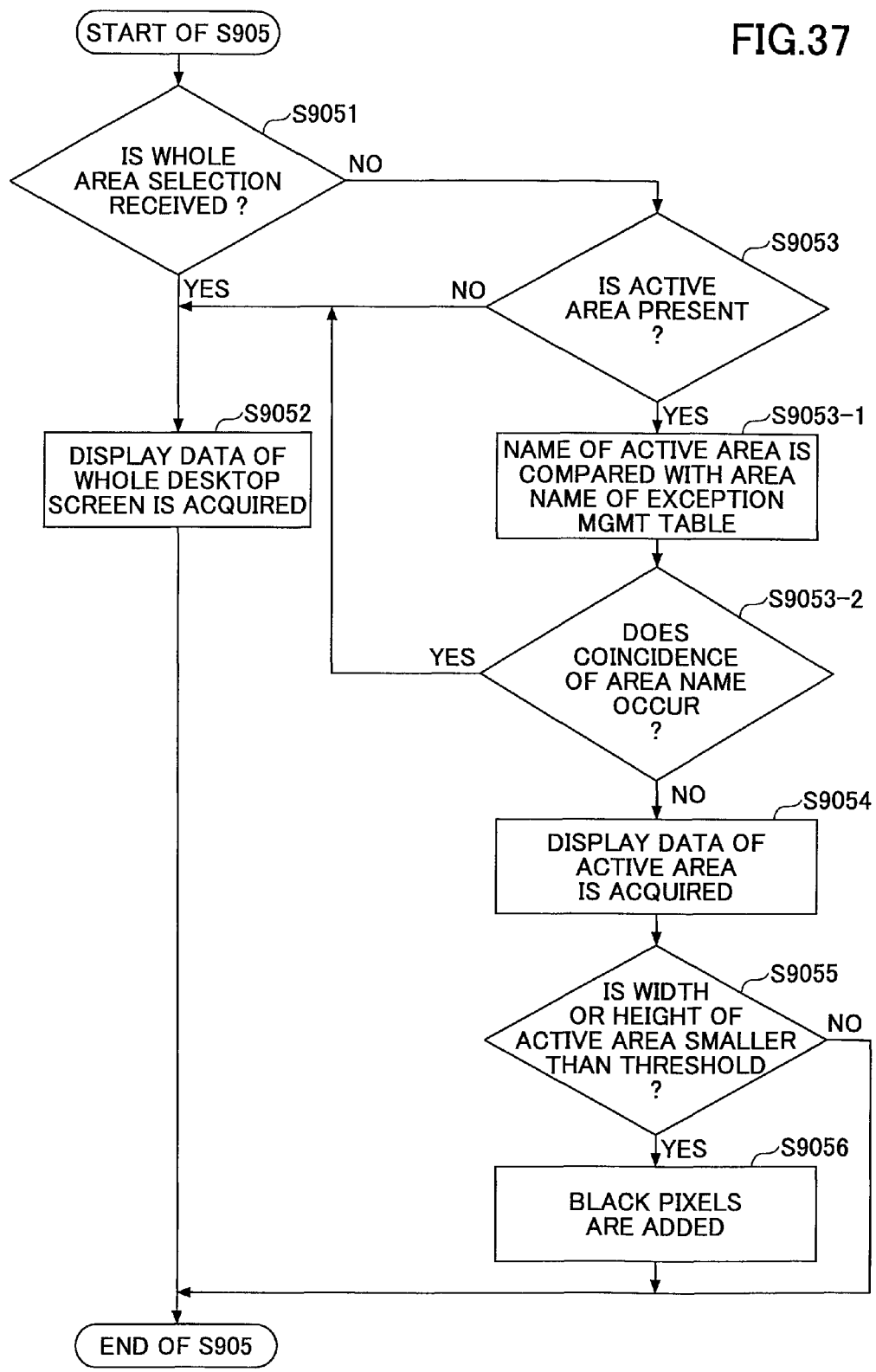
FIG. 37 is a flowchart for explaining a process in which a display data acquiring unit acquires a whole area display data or a specific area display data.

FIG. 37 is a flowchart for explaining a process in which the display data acquiring unit 451 acquires a whole area display data or a specific area display data. The process of FIG. 37 is similar to that of FIG. 23, and only primary steps in the process of FIG. 37 which differ from corresponding steps in the process of FIG. 23 will be described. It is assumed that in the process of FIG. 37, the user aa has already clicked the share setting input button 301 shown in FIG. 21B.

First, the operation input receiving unit 46 determines whether selection of the whole area is received (S9051). When the selection of the whole area is received (YES in S9051), the display data acquiring unit 451 acquires the display data of the whole desktop screen displayed on the display 216 (S9052), and the process of FIG. 37 is terminated.

When the selection of the whole area is not received (NO in S9051), the display data acquiring unit 451 determines whether an active area is present (S9053). When the active area is present (YES in S9053), the display data acquiring unit 451 acquires the area name of the active area from the OS and compares the acquired area name with each of the area names registered in the exception management table 4002T (S9053-1). When coincidence does not occur, the acquired area name is compared with all the area names of the exception management table 4002T. When coincidence occurs, the comparison is stopped.

When the area name of the active area is registered in the exception management table 4002T (YES in S9053-2), the display data acquiring unit 451 acquires the display data of the whole desktop screen displayed on the display 216 (S9052), and the process of FIG. 37 is terminated. Thus, even if the area, such as BaseBar 401 shown in FIG. 34A, is changed to the active area, the display data of the whole area may be displayed without displaying the display data of the active area. Alternatively, instead of displaying the display data of the whole area, the display data of the area, whose area name is not registered in the exception management table 4002T, which was active immediately before may be acquired.

When the area name of the active area is not registered in the exception management table 4002T (NO in S9053-2), the display data of the area which is active among the display data currently displayed on the display 216 by the display control unit are acquired (S9054). Namely, in this case, the display data of the active area are acquired similar to Embodiment 1. Subsequent steps are the same as those corresponding steps of Embodiment 1, and continuously the process of FIG. 22 is performed.

The process of FIG. 37 provides a modification of the process of FIG. 23 of Embodiment 1. Also, the processing of steps S9053-1 and S9053-2 in the process of FIG. 37 may be similarly to the process of FIG. 29 of Embodiment 2. Thus, regardless of how the user selects the active area, it is possible to prevent the display data of the areas registered in the exception management table 4002T from being shared.

Also in Embodiment 4, the icon of the mouse cursor may be incorporated in the display data of the active area similar to Embodiment 3.

In the display data acquisition program 1451 installed in the external input device 40, a predetermined menu is prepared to stop the comparison of the acquired area name of the active area with the area names registered in the exception management table 4002T. If the user desires to share the display data of the area registered in the exception management table 4002T, the setting of the sharing may be selected from the predetermined menu. Thus, the user may arbitrarily select permission or inhibition of sharing of the display data of the area the area name of which is registered in the exception management table 4002T.

As described above, according to Embodiment 4, it is possible to prevent acquisition of the display data of the area which are not to be acquired. Thus, it is possible to reduce problems, such as frequent changes of the display data by operations of the user.

Embodiment 5

In Embodiments 1, 2 and 4, the display data of the active area and the whole area which are arbitrarily selected by the user may be shared by the terminals. However, when the external input device receives the active area or the whole area from the viewing-area selection menu 310 (FIG. 28A) displayed on the desktop screen as in Embodiment 2, a problem may arise. Specifically, the user may select one of the radio buttons 302,303 of the viewing-area selection menu 310 when the viewing-area selection menu 310 is incorporated as one application window. The viewing-area selection menu 310 may become an active area and the display data thereof may be shared by the terminals. As a result, such a situation that the participants of the videoconference viewing the display data on the display 120 have a sense of incongruity in regards to the display data may arise.

In Embodiment 5, the transmission system in which, when the viewing-area selection menu 310 incorporated as a window changes to an active area by user's operation, the sharing of the display data of the viewing-area selection menu 310 is inhibited will be described. Specifically, when one of the radio buttons 302,303 of the viewing-area selection menu 310 is selected, the display data acquiring unit 451 is configured to access the exception management DB 4002 and not to acquire the display data even if the window of the viewing-area selection menu 310 is active. Thus, when one of the radio buttons 302,303 is selected, it is possible to prevent the display data of the viewing-area selection menu 310 from being shared.

Figure 38:
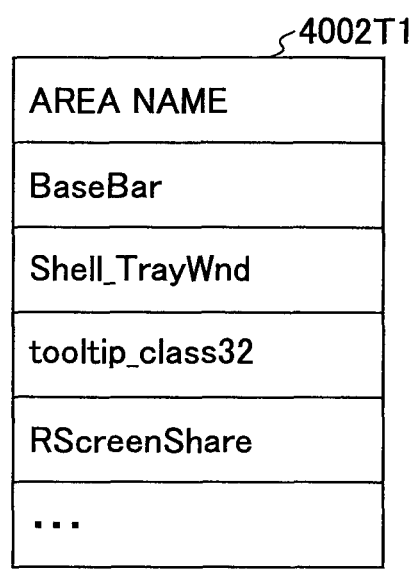
FIG. 38 is a diagram showing an example of an exception management table.

FIG. 38 is a diagram showing an exception management table 4002T1 of Embodiment 5. The functional configuration of the external input device 40 may be the same as that of FIG. 35 of Embodiment 4. The area names (window names) of the areas the display data of which are not to be acquired even if the areas become active are registered in the exception management table 4002T1. In this embodiment, an area name "RScreenShare" is additionally registered in the exception management table 4002T1. "RScreenShare" is the area name of the viewing-area selection menu 310 incorporated as a window. Thus, the display data acquiring unit 451 can prevent sharing of the display data when the viewing-area selection menu 310 incorporated as a window becomes active.

Figure 39:
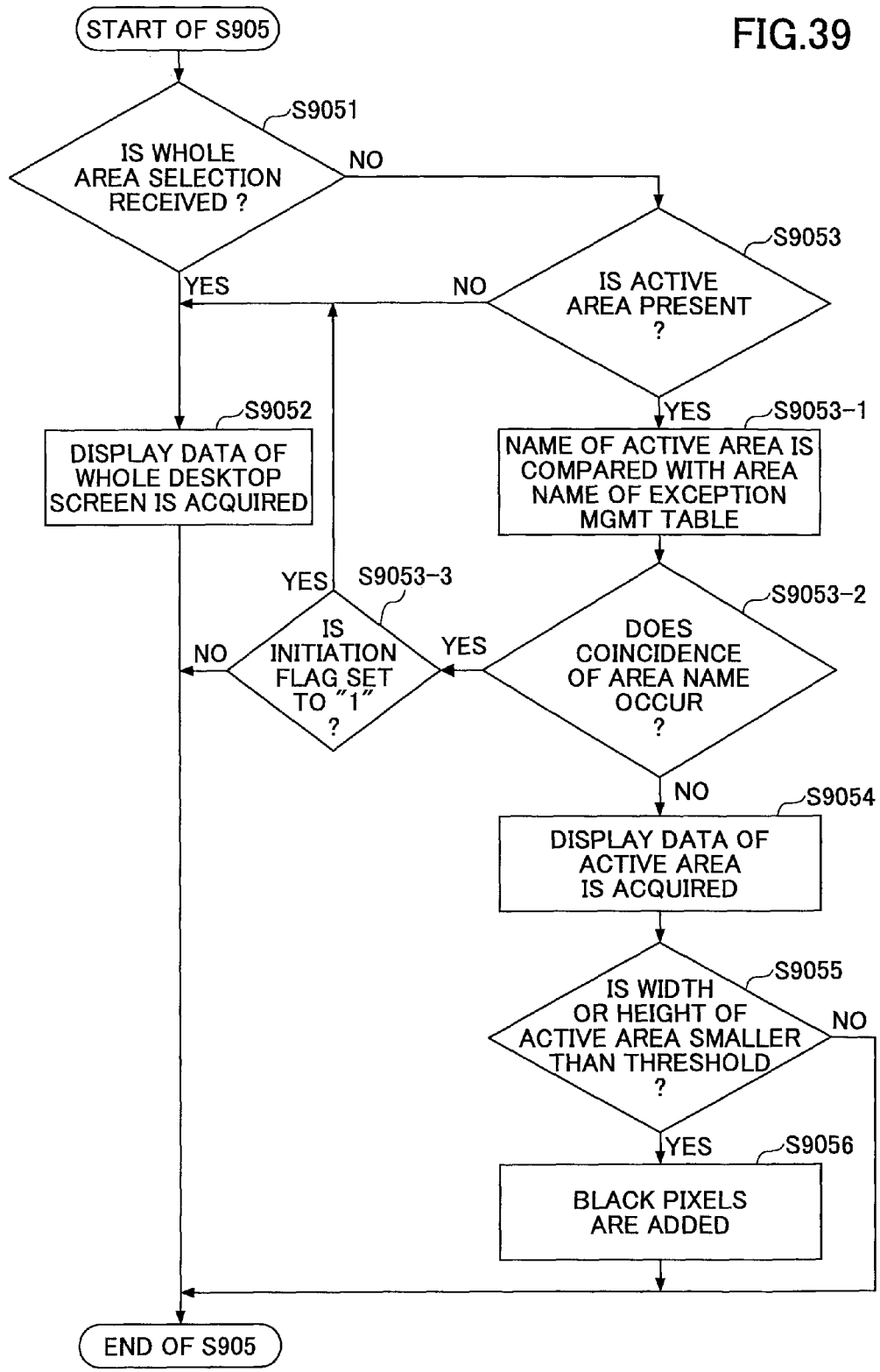
FIG. 39 is a flowchart for explaining a process in which the display data acquiring unit acquires a whole area display data or a specific area display data.
Figure 40:
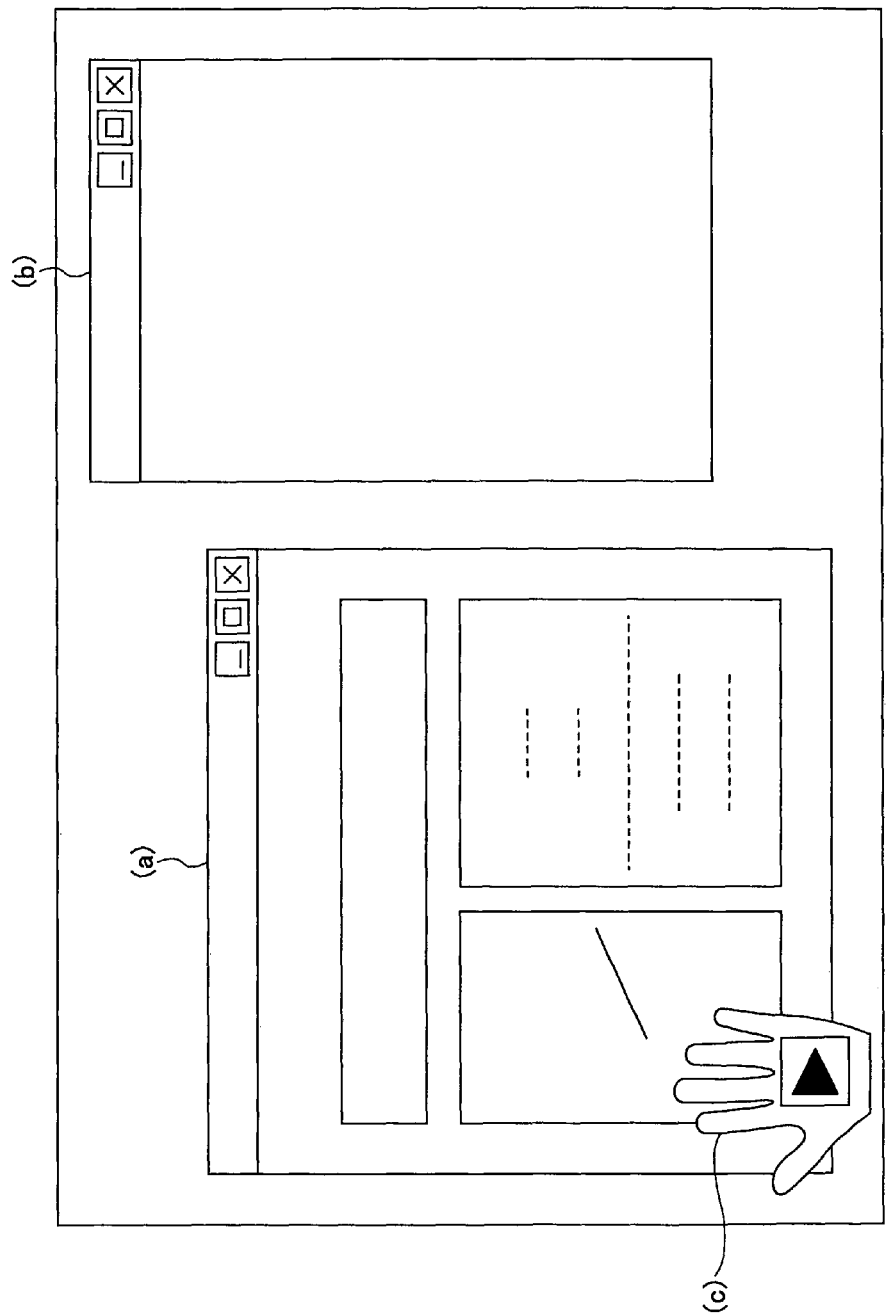
FIG. 40 is a diagram showing an example of a screen displayed on an external input device according to the related art.

FIG. 39 is a flowchart for explaining a process in which the display data acquiring unit 451 acquires a whole area display data or a specific area display data. The process of FIG. 39 is similar to that of FIG. 37, and only primary steps in the process of FIG. 39 which differ from corresponding steps in the process of FIG. 37 will be described.

The user aa depresses or clicks the share setting input button 301 "start sharing" as shown in FIG. 28A. As a result, the window of the viewing-area selection menu 310 becomes active. At the time of depression, either of the radio buttons 302 and 303 may be selected. There are the case where "whole area (full screen)" is selected and the case where "active area" is selected.

The processing of steps S9051, S9052, S9053, and S9053-1 in FIG. 39 is the same as that of corresponding steps in FIG. 37, and the explanation thereof is omitted.

In the process of FIG. 39, when the area name of the active area is registered in the exception management table 4002T1 (YES in S9053-2) and an initiation flag is not equal to "1" (NO in S9053-3), the display data acquiring unit 451 does not acquire the display data of the whole desktop screen. The initiation flag is a flag which is set to "1" when the programs for the external input devices are started and reset to "0" when the whole area display data are acquired. The initiation flag is provided for controlling the behavior of the programs immediately after starting of the programs for the external input devices. In the process of FIG. 37 (Embodiment 4), when the area name of the active area coincides with the area name registered in the exception management table, the display data of the whole area (full screen) are shared. In this embodiment, however, the display data of the whole area are not shared. Exceptionally, in this embodiment, the display data of the whole area are shared immediately after starting of the programs for the external input devices.

When the area name of the active area is not registered in the exception management table 4002T1 (NO in S9053-2), the display data of the area which is active among the display data currently displayed on the display 216 by the display control unit are acquired (S9054). Namely, the display data of the active area are acquired similar to Embodiment 4.

Therefore, the external input device 40 of this embodiment operates as follows.

First, immediately after the programs for the external input devices are started, the viewing-area selection menu 310 of FIG. 28A is in an initial state where the radio button 302 is selected.

(i) When the share setting input button 301 is pressed while the "whole area (full screen)" of the radio button 302 is selected, the result of the determination at S9051 is YES, and the display data acquiring unit 451 starts sharing of the whole area display data.

(ii) When the share setting input button 301 is pressed while the "active area" of the radio button 303 is selected by the user, the window of the viewing-area selection menu 310 becomes active. Sharing of the display data of the viewing-area selection menu 310 is not appropriate and the active area is not present, and the programs for the external input devices may share the display data of the whole area. To avoid the problem, the initiation flag is utilized.

When the radio button 303 is selected, it is determined at step S9053 that the active area (the viewing-area selection menu 310) is present, and the result of the determination at step S9053-2 is YES. Immediately after the programs for the external input devices are started, it is determined at step S9053-3 that the initiation flag is equal to "1", and the display data acquiring unit 451 acquires the display data of the whole area at step S9052. After the display data of the whole area are acquired, the initiation flag is reset to "0".

Namely, immediately after the sharing of the display data is started, sharing of the display data of the whole area (full screen) is started even if either of the radio buttons 302 and 303 is selected. Thereafter, if the user activates the area which is not registered in the exception management table 4002T1, the display data of the area which is activated by the user are shared.

(iii) When the share setting input button 301 is pressed while the display data of the "whole area (full screen)" are shared and the "whole area (full screen)" of the radio button 302 is selected, the result of the determination at step S9051 is YES. Thus, the display data acquiring unit 451 continuously performs the sharing of the display data of the whole area.

When the share setting input button 301 is pressed while the display data of the "whole area (full screen)" are shared and the "active area" of the radio button 303 is selected, the result of the determination at step S9053-2 is YES and the result of the determination at step S9053-3 is NO. Thus, the display data acquiring unit 451 continuously performs the sharing of the display data of the whole area.

Namely, even if either of the radio buttons 302 and 303 are selected, the sharing of the display data of the whole area is continued. The display data acquiring unit 451 shares the display data of the active area in the state where the display data of the "whole area (full screen)" is shared, only in a case where the user selects (or activates) the area of the area name which is not registered in the exception management table 4002T1.

(iv) When the share setting input button 301 is pressed while the display data of the "active area" are shared and the "whole area (full screen)" of the radio button 302 is selected, the result of the determination at step S9051 is YES. Thus, the display data acquiring unit 451 starts sharing of the display data of the whole area.

When the share setting input button 301 is pressed while the display data of the "active area" are shared and the "active area" of the radio button 303 is selected, the result of the determination at step S9053-2 is YES and the result of the determination at step S9053-3 is No. Thus, the display data acquiring unit 451 continues sharing of the display data of the active area which was active before the viewing-area selection menu 310 becomes active.

Namely, even if either of the radio buttons 302 and 303 are selected, the viewing-area selection menu 310 becomes active. In this case, when the "active area" of the radio button 303 is selected, sharing of the display data of the area which was active immediately before is continued, and when the "whole area (full screen)" of the radio button 302 is selected, sharing of the display data of the whole area is started.

According to the external input device 40 of this embodiment, the previous state of sharing of the display data is held even if the window including the viewing-area selection menu 310 which are not suitable for sharing of the display data is selected. One of the sharing of the whole area display data and the sharing of the active area display data may be switched to the other without giving sense of incongruity to the participants of the videoconference.

As described in the foregoing, according to the invention, it is possible to provide a transmission system in which a user on a transmission terminal may select arbitrarily one of sharing of whole area display data and sharing of specific area display data such that the selected display data are shared with a communication partner of a videoconference on the other transmission terminal.

The transmission system according to the invention is not limited to the above-described embodiments and various variations and modifications may be made without departing from the scope of the invention.

The present application is based on and claims the benefit of priority of Japanese Patent Application No. 2012-250979, filed on Nov. 15, 2012, Japanese Patent Application No. 2013-064085, filed on Mar. 26, 2013, and Japanese Patent Application No. 2013-135200, filed on Jun. 27, 2013, the entire contents of which are hereby incorporated by reference.

The invention claimed is:

1. A non-transitory computer-readable recording medium storing a program representing a sequence of instructions, the program which when executed by a computer, causes the computer to perform a process, the computer connected to a first transmission terminal which is connected to a first display device, and connected to a second transmission terminal via a network, the process comprising:

displaying an active area of an active program component on a screen of a second display device connected to the computer;

receiving, based on a single input by a user at one location within the screen of the second display device, selection of either whole display data displayed in a whole area on the screen of the second display device or area display data displayed in the active area of the active program component on the screen as an operation target of the user;

acquiring the whole display data or the area display data indicated by the received selection, wherein the acquiring step comprises acquiring the whole display data when the selection of the area display data of the active area of the active program component as the operation target of the user is received and an area name of the active area of the active program component as the operation target of the user is identical to that registered in an area name management table;

receiving, from the first transmission terminal, first resolution information indicating a first resolution of the first display device;

determining a resolution of the acquired display data based on the received first resolution information and second resolution information indicating a second resolution of the second display device; and transmitting the acquired display data together with the determined resolution to the first transmission terminal.

2. The non-transitory computer-readable recording medium according to claim 1, wherein an operating system is executed on the computer to treat the whole area and the active area as separate program components and manage at least position information of the program components, and the receiving the selection comprises:

receiving, from the operating system, a position on the screen where an event occurs associated with a pointing device;

receiving, when the received position overlaps the whole area different from the active area of the active program component, selection of the whole display data; and receiving, when the received position does not overlap the whole area, selection of the area display data as the operation target of the user.

3. The non-transitory computer-readable recording medium according to claim 1, wherein the receiving the selection comprises:

displaying, on the second display device, a selection menu used to receive the selection of either the whole area or the active area of the program component as the operation target of the user on the screen;

receiving selection of the whole display data when the whole area in the selection menu is selected; and receiving selection of the area display data when the active area of the active program component as the operation target of the user in the selection menu is selected.

4. The non-transitory computer-readable recording medium according to claim 1, wherein the process further comprises:

generating, when the area display data as the operation target of the user are received and a resolution of the received display data is less than a threshold, the display data having a resolution greater than the threshold by adding arbitrary pixel values to the received display data.

5. The non-transitory computer-readable recording medium according to claim 1, wherein the area name management table includes at least area names of areas registered therein, the area names of the areas used in the receiving the selection of either the whole display data or the area display data the operation target of the user.

6. The non-transitory computer-readable recording medium according to claim 1, wherein the process further comprises:

displaying on the second display device a display data transmission permission menu used to receive permission or inhibition of sharing of the acquired display data by the first and second transmission terminals;

starting the transmission of the acquired display data with the determined resolution to the first transmission terminal when the permission is received from the display data transmission permission menu; and stopping the transmission of the determined display data with the determined resolution to the first transmission terminal when the second transmission terminal starts transmission of display data or when the inhibition is received from the display data transmission permission menu.

7. The non-transitory computer-readable recording medium according to claim 1, wherein the acquiring the display data comprises:

acquiring cursor information containing coordinate data of a cursor that is moved on the screen of the second display device and interlocked with a pointing device;

incorporating, when selection of the whole display data is received, an image of the cursor in the display data at a position indicated by the coordinate data; and incorporating, when selection of the area display data is received, the image of the cursor in the area display data at a position indicated by the coordinate data of the cursor which are compensated by coordinate data of the active area of the active program component on the screen.

8. The non-transitory computer-readable recording medium according to claim 7, wherein the cursor information contains the coordinate data and image data of the cursor, and the acquiring the cursor information comprises acquiring the coordinate data and the image data of the cursor.

9. The non-transitory computer-readable recording medium according to claim 7, wherein the cursor is a mouse cursor.

10. A non-transitory computer-readable recording medium storing a program representing a sequence of instructions, the program which when executed by a computer, causes the computer to perform a process, the computer connected to a first transmission terminal which is connected to a first display device, and connected to a second transmission terminal via a network, the process comprising:

displaying an active area of an active program component on a screen of a second display device connected to the computer;

receiving, based on a single input by a user at one location within the screen of the second display device, selection of either whole display data displayed in a whole area on the screen of the second display device or area display data displayed in the active area of the active program component on the screen as an operation target of the user;

acquiring the whole display data or the area display data indicated by the received selection;

receiving, from the first transmission terminal, first resolution information indicating a first resolution of the first display device;

determining a resolution of the acquired display data based on the received first resolution information and second resolution information indicating a second resolution of the second display device; and transmitting the acquired display data together with the determined resolution to the first transmission terminal, wherein the acquiring the display data comprises continuing acquisition of the whole display data when the selection of the area display data of the active area of the active program component as the operation target of the user is received and an area name of the area of the program component as the operation target of the user is identical to that registered in an area name management table.

11. A transmission system, comprising:

a first transmission terminal which is connected to a first display device and connected to a second transmission terminal via a network; and an external input device which is connected to the first transmission terminal and transmits display data to the first transmission terminal, the first transmission terminal comprising:

- a resolution acquisition unit configured to acquire a first resolution that is usable by the first display device; and
- a resolution information transmitter configured to transmit first resolution information indicating the first resolution to the external input device, the external input device comprising:

- a display controller configured to display an active area of an active program component on a screen of a second display device connected to the external input device;
- an operation input receiving unit configured to receive, based on a single input by a user at one location within the screen of the second display device, selection of either whole display data displayed in a whole area on the screen of the second display device or area display data displayed in the active area of the active program component on the screen as an operation target of the user;
- a display data acquiring unit configured to acquire the whole display data or the area display data of the program component indicated by the received selection, wherein the display data acquiring unit is further configured to acquire the whole display data when the selection of the area display data of the active area of the active program component as the operation target of the user is received and an area name of the active area of the active program component as the operation target of the user is identical to that registered in an area name management table;
- a resolution information receiving unit configured to receive the first resolution information from the first transmission terminal;
- a resolution converting unit configured to determine a resolution of the acquired display data based on the received first resolution information and second resolution information indicating a second resolution of the second display device; and
- a display data transmitter configured to transmit the acquired display data together with the resolution determined by the resolution converting unit to the first transmission terminal.

12. The transmission system according to claim 11, wherein an operating system is executed on the external input device to treat the whole area and the active area of the active program component as separate program components and manage at least position information of the program components, and the operation input receiving unit is configured to receive a position on the screen where an event occurs associated with a pointing device from the operating system, receive, when the received position overlaps the program component of the whole area different from the program component of the active area, selection of the whole display data of the whole area, and receive, when the received position does not overlap the program component of the whole area, selection of the area display data of the active area of the active program component as the operation target of the user.

13. The transmission system according to claim 11, wherein the operation input receiving unit is configured to display on the second display device a selection menu used to receive the selection of either the whole area or the active area of the active program component as the operation target of the user on the screen, receive selection of the whole display data of the whole area when the whole area in the selection menu is selected, and receive selection of the area display data of the active area of the active program component when the active area of the active program component as the operation target of the user in the selection menu is selected.

* * * * *